(12) United States Patent
Ohtsu et al.

(10) Patent No.: US 6,185,517 B1
(45) Date of Patent: Feb. 6, 2001

(54) ELECTROMAGNETIC FIELD INTENSITY COMPUTING DEVICE

(75) Inventors: Shinichi Ohtsu; Makoto Mukai, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/017,927

(22) Filed: Feb. 3, 1998

Related U.S. Application Data

(62) Division of application No. 08/635,406, filed on Apr. 26, 1996, now abandoned.

(30) Foreign Application Priority Data

| Apr. 28, 1995 | (JP) | 7-104932 |
| Apr. 28, 1995 | (JP) | 7-104933 |
| Apr. 28, 1995 | (JP) | 7-104934 |
| Apr. 28, 1995 | (JP) | 7-104935 |

(51) Int. Cl.$^7$ ................................................ G06G 7/48
(52) U.S. Cl. ................................................ 703/4; 703/5
(58) Field of Search ........................ 395/500.25, 500.26; 703/4, 5

(56) References Cited

U.S. PATENT DOCUMENTS

| 5,140,338 | 8/1992 | Schmier et al. | 343/909 |
| 5,650,935 | 7/1997 | Nishino et al. | 364/481 |

OTHER PUBLICATIONS

Costa et al.: On the computation of electromagnetic field components from a transmission line: theory and application; IEEE Symp. on Elect. Compat.; pp. 651–656, Aug. 1990.*

Logan et al., The evolution of MININEC (method of moments computer program for antenna analysis; IEEE Symp. Elect. Comp.; pp. 66–68, Aug. 1988.*

Hejase et al.; A quasi–static technique for evaluation of pigtail connnections; IEEE Trans. Comp.,; pp. 180–183, May 1989.*

Han; Radiated emission from shielded cables by pigtail effect; IEEE Trans. Elect. Comp.; pp. 345–348, Aug. 1992.*

Sabath et al., "Influence of Finite Ground Planes on the Transmission Line Current Distribution," IEEE Transactions on Magnetics, vol. 32, No. 3, May 1996, pp. 1501–1504.

Berrie et al., "A Model for the Scattering Current Distribution on Bent, Lossy, Loaded Thin Wires," AP–S International Symposium, pp. 1372–1375.

Valle et al., "Combining the Moment Method with Geometrical Modeling by Nurbs Surfaces and Bezier Patches," IEEE Translations on Antennas and Propagation, vol. 42, No. 3, pp. 373–381.

Chuang et al., "Nearing Field Effect in the Evaluation of Site Attenuation," Electromagnetic Compatibility, International Symposium, pp. 10–15.

* cited by examiner

*Primary Examiner*—Kevin J. Teska
*Assistant Examiner*—Hugh Jones
(74) *Attorney, Agent, or Firm*—Staas & Halsey

(57) ABSTRACT

An electromagnetic field intensity computing apparatus for computing electromagnetic field intensity of an electric circuit device in a moment method obtains according to the electric current distribution an electric current of a ground layer and models a transmission line, ground layer, dielectric portion, etc. to be analyzed. When a plate to be analyzed is divided into a plurality of patches, the regularity in given structure data is automatically extracted to compute the mutual impedance among a portion of patches and apply the computation result to other portions. When elements to be analyzed meet the conditions that the electric length of the elements is short and the elements are distant from each other, the mutual impedance can be computed in an approximation obtained under various conditions. Furthermore, approximating a portion near a pigtail portion of a coaxial cable using a polygon allows a vertical electric current to be properly connected to each unit.

5 Claims, 37 Drawing Sheets

| AMOUNT OF ELECTRIC WAVE RADIATION | = | (DEPENDENT ON) ELECTRIC CURRENT DISTRIBUTION |

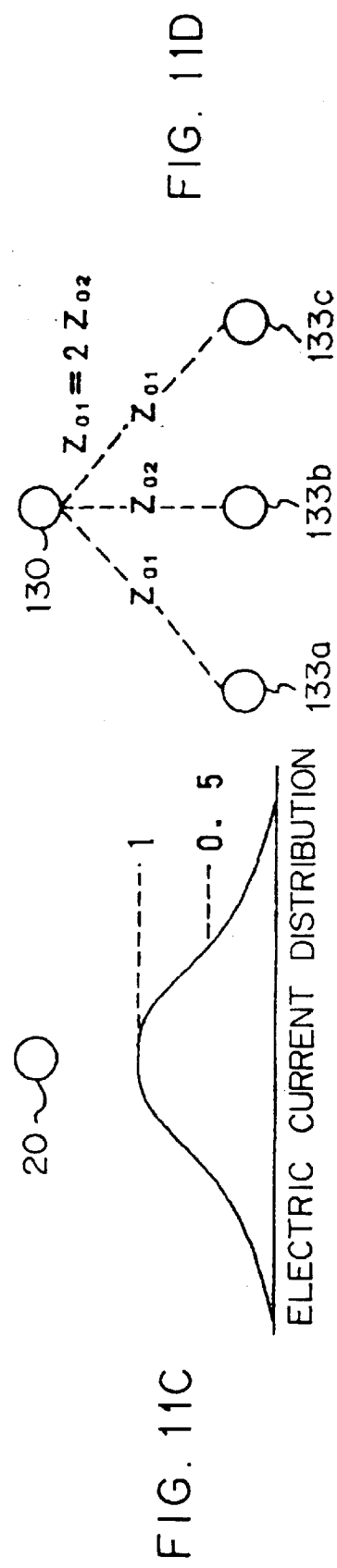
FIG. 11A
FIG. 11B
FIG. 11C
FIG. 11D

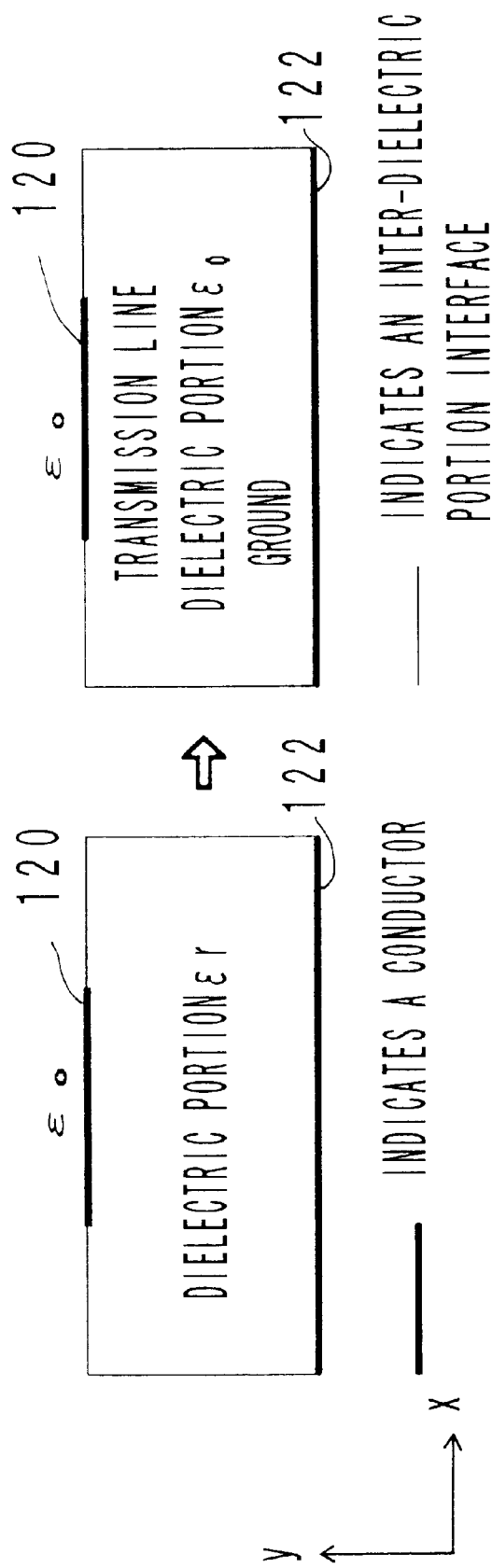

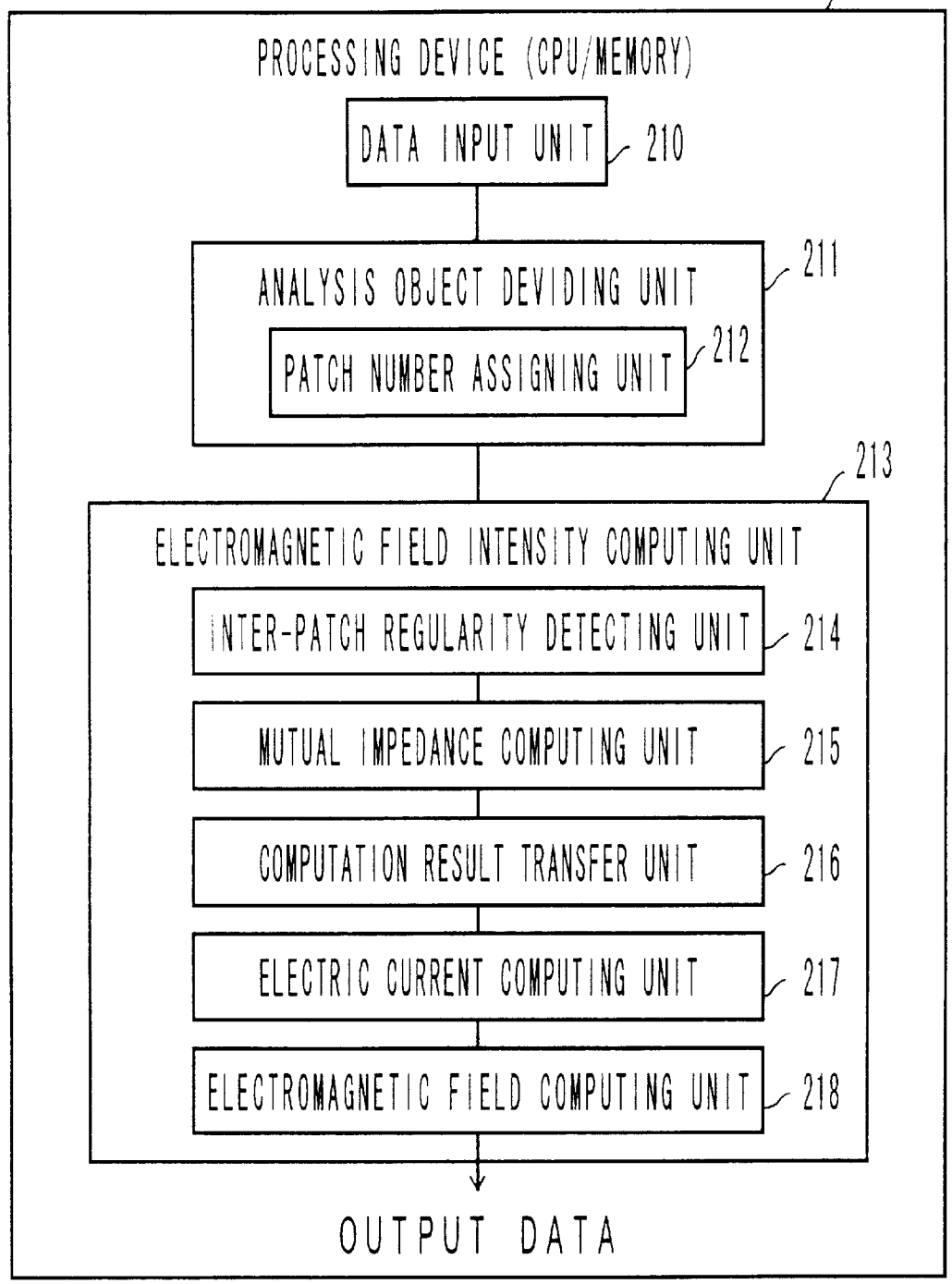
F I G. 1 5

( DETECTING REGULARITY OF PATCHES OF n COLUMNS BY m ROWS )

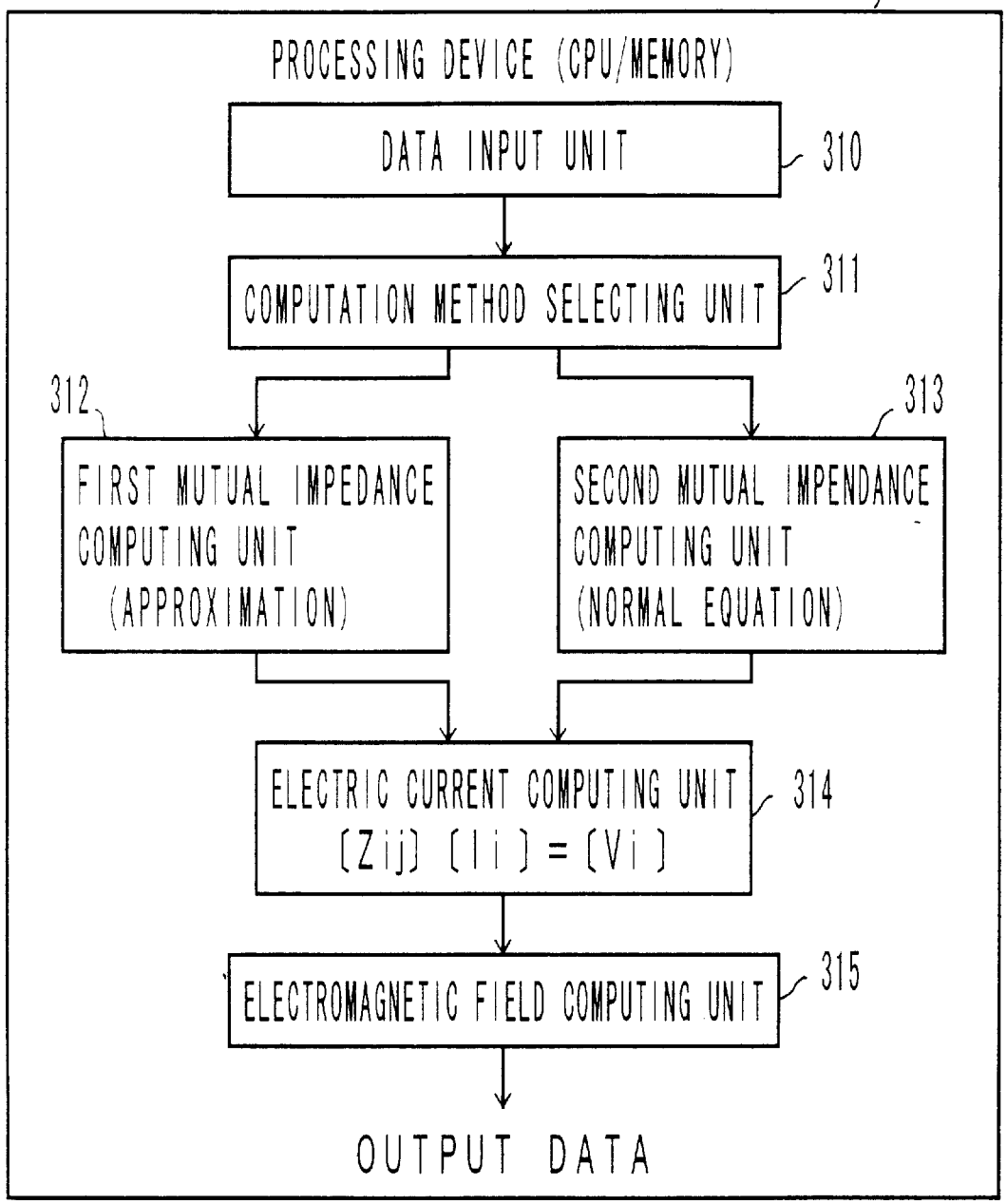
F I G. 24

NORMAL CONVENTIONAL COMPUTATION
(TIME REQUIRED FOR COMPUTATION = 6 SECONDS)

| DISTANCE r (m) | REAL NUMBER | IMAGINARY NUMBER |
|---|---|---|
| r=0.0001 | 7.9011456932676080e-008 | -2.0735003516907450e+005 |
| r=0.001 | 7.9009211617631080e-008 | -4.6978363894854490e+002 |
| r=0.003 | 7.9002667519034730e-008 | -1.7630026372396970e+001 |
| r=0.005 | 7.9014725429260580e-008 | -3.8121308658610360e+000 |
| r=0.01 | 7.8949575785818740e-008 | -4.7672365110884130e-001 |
| r=0.03 | 7.9282592935214780e-008 | -1.7655766775780640e-002 |
| r=0.05 | 8.4540239697616930e-008 | -3.8120494748181070e-003 |
| r=0.1 | 8.8982245693405280e-008 | -4.7582408365087760e-004 |
| r=0.3 | 9.2460716416553620e-008 | -1.7368894853365811e-005 |
| r=0.5 | 2.3799783122058220e-007 | -4.2086108986062557e-006 |
| r=1 | 6.7796623426374940e-007 | -3.9314887914088100e-006 |
| r=10 | 5.5107306387511270e-006 | -1.0542248229938880e-006 |

PRECISION LOWERED BY LOST DIGITS →

FIG. 29

HIGH-PRECISION CONVENTIONAL COMPUTATION
(TIME REQUIRED FOR COMPUTATION = 380 SECONDS)

| DISTANCE r (m) | REAL NUMBER | IMAGINARY NUMBER |
|---|---|---|
| r=0.0001 | 7.901149245981287e-008 | -2.073500351690746e+005 |
| r=0.001 | 7.901147114353080e-008 | -4.697836940555 9e+002 |
| r=0.003 | 7.901143561639401e-008 | -1.763002836921374e+001 |
| r=0.005 | 7.901132903498365e-008 | -3.812130867350788e+000 |
| r=0.01 | 7.901088007677804e-008 | -4.767236511943338e-001 |
| r=0.03 | 7.900585075049094e-008 | -1.765599392774675e-002 |
| r=0.05 | 7.899587473048086e-008 | -3.812530218510801e-003 |
| r=0.1 | 7.894901443705749e-008 | -4.758641832722788e-004 |
| r=0.3 | 7.845032001796428e-008 | -1.735362241106488e-005 |
| r=0.5 | 7.745795471691963e-008 | -3.639785803581913e-006 |
| r=1 | 7.289536796406537e-008 | -4.094922445574412e-007 |
| r=10 | 3.077795122929938e-009 | 1.835954144269181e-008 |

APPROXIMATION COMPUTATION ACCORDING TO THE PRESENT INVENTION
(TIME REQUIRED FOR COMPUTATION = 4 SECONDS)

| DISTANCE r (m) | REAL NUMBER | IMAGINARY NUMBER |
|---|---|---|
| r=0.0001 | 7.9011456932676086e-008 | -2.0735003516907456e+005 |
| r=0.001  | 7.9011478248958166e-008 | -4.7325799628940886e+002 |
| r=0.003  | 7.9011435616394016e-008 | -1.7644695008082646e+001 |
| r=0.005  | 7.9011350351265726e-008 | -3.8132738653039276e+000 |
| r=0.01   | 7.9010860076778046e-008 | -4.7675940118842766e-001 |
| r=0.03   | 7.9005872066773016e-008 | -1.7656141086717986e-002 |
| r=0.05   | 7.8995874730480866e-008 | -3.8125416624552606e-003 |
| r=0.1    | 7.8949049964194276e-008 | -4.7586454081738346e-004 |
| r=0.3    | 7.8450305807109546e-008 | -1.7353623888993756e-005 |
| r=0.5    | 7.7457961822346996e-008 | -3.6397857172687516e-006 |
| r=1      | 7.2895382174920096e-008 | -4.0949224455744126e-007 |
| r=10     | 3.0777891901758506e-009 | 1.8359543219048656e-008 |

→ BY APPROXIMATION

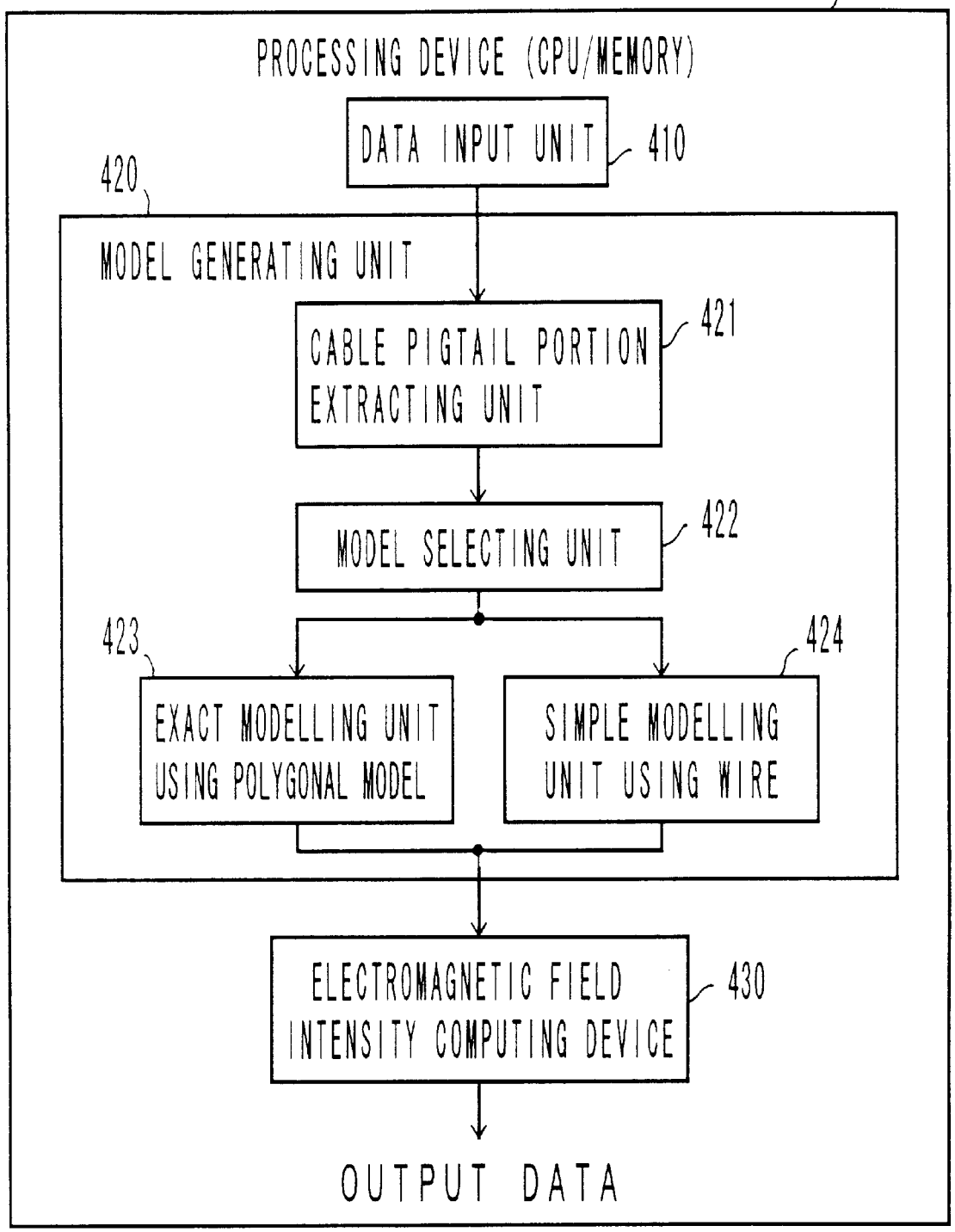
F I G. 3 2

(CONNECTION BETWEEN LINE AND COAXIAL CABLE)

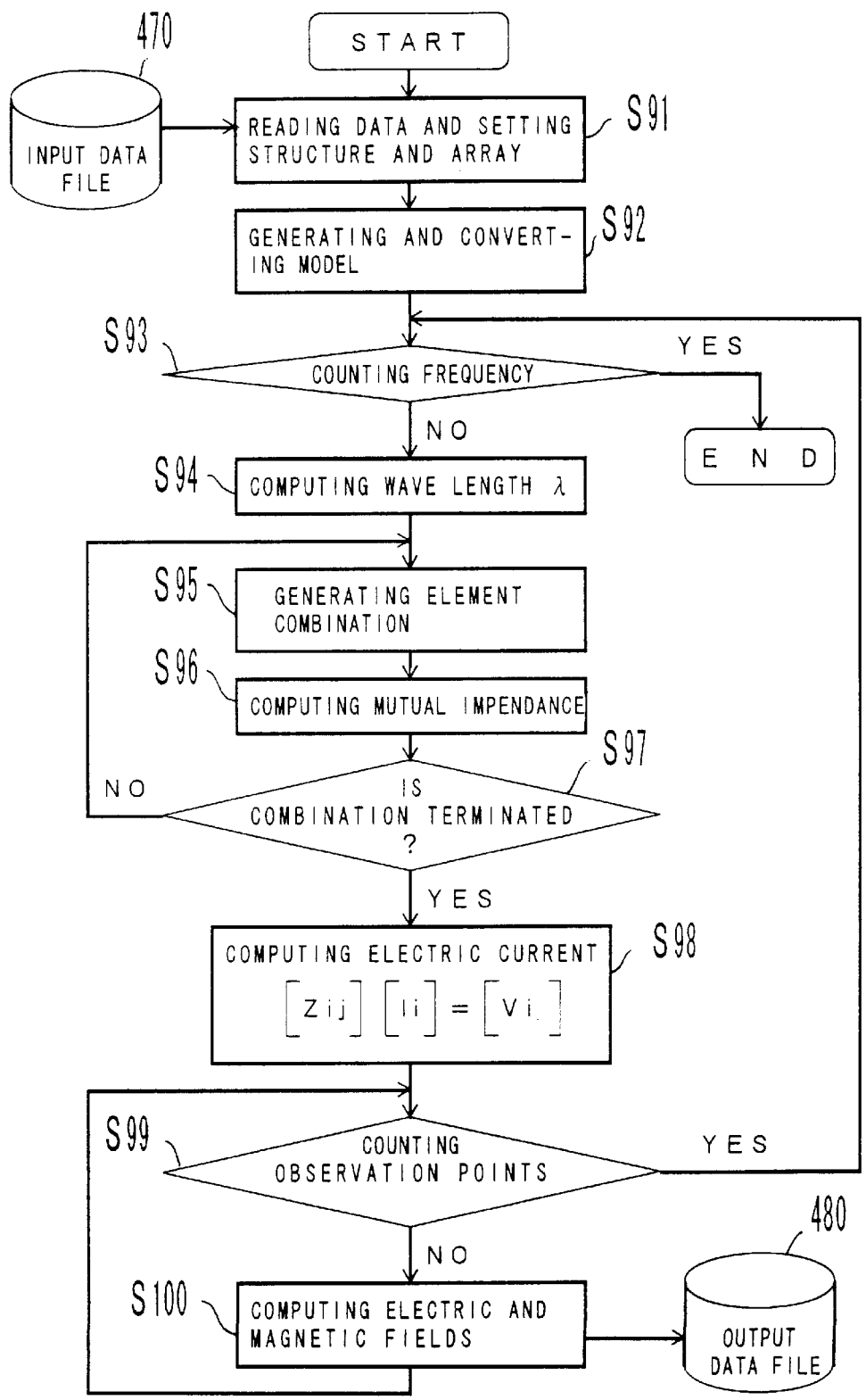
F I G. 36

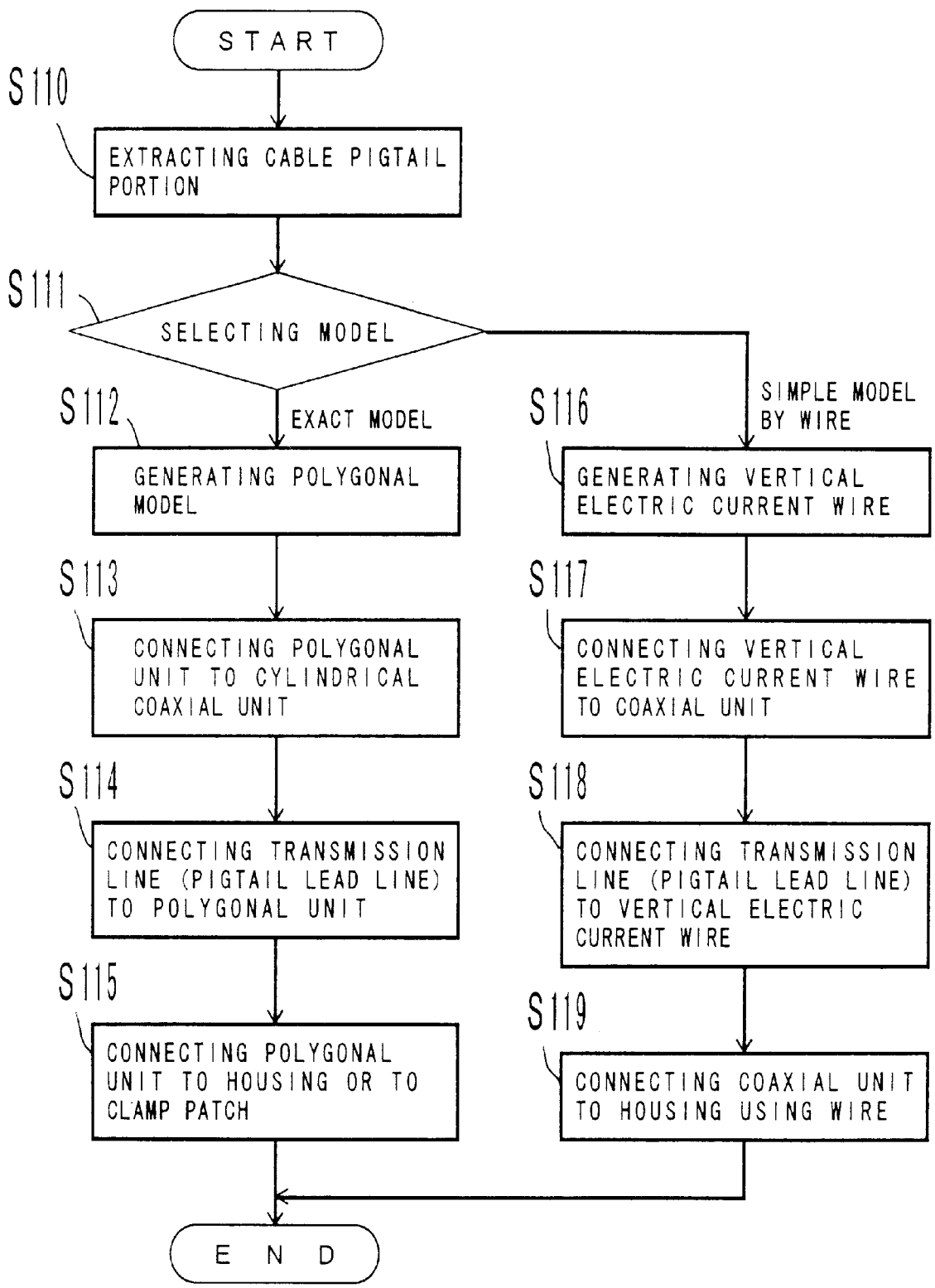
F I G. 37

ELECTROMAGNETIC FIELD INTENSITY COMPUTING DEVICE

This application is a division of U.S. application Ser. No. 08/635,406, filed Apr. 26, 1996 now abandoned.

BACKGROUND OF THE INVENTION

1. Field of the Invention

The present invention relates to an electromagnetic field intensity computing apparatus for computing the intensity of the electromagnetic field of an electric circuit device based on the moment method.

2. Description of the Related Art

Since an unnecessary electric wave emitted by an electric circuit device interferes with TV, radio, or other electric waves, various strict restrictions have been put in place in many countries. For example, Japan has issued the VCCI Standard, the U.S. has issued the FCC Standard, and Germany has issued the VDE Standard.

To meet such electric wave restrictions, various actions should be taken using shielding technologies, filtering technologies, etc. Accordingly, it is necessary to quantitatively simulate these actions to determine the extent to which extent the electric wave can be reduced. Since the simulation of the electromagnetic analysis requires a long process time using a computer, it is necessary to prepare a high-speed and high-precision computing apparatus to compute the intensity of the electromagnetic field of an electric circuit device.

In a method of computing the electromagnetic field intensity, the electromagnetic field intensity of an object can be easily computed by a well-known logic equation, given a current flowing through each portion of the object. The current value can be logically obtained by solving the Maxwell equations (electromagnetic wave equations) under given conditions. However, no exact solution has been obtained by equations under complicated boundary conditions on an object of an optional shape.

Therefore, any solution for obtaining the current used by the electromagnetic field intensity computing apparatus refers to, more or less, an approximation. A typical approximate computation can be a small loop antenna approximation, a distributed constant line approximation, or a moment method.

In the small loop antenna approximation method, the wiring connecting the wave source circuit and the load circuit is treated as a loop antenna. In this approximation, the current through the loop is assumed to be flat and computed by the method of computing the concentrated constant circuit.

FIGS. 1A and 1B illustrate the small loop antenna approximation.

FIG. 1A shows a circuit model comprising a driver 10 that is a wave source circuit; a receiver 11 that is a load circuit; a wiring 14 connecting the driver 10 to the receiver 11, and a dielectric portion 12 inserted between the grounding wire layer 13 and wiring 14.

In FIG. 1A, the distance between the driver 10 and receiver 11 is l and the distance between the wiring 14 and the grounding wire layer 13 is h.

FIG. 1B is a diagram showing the equalizing circuit of the circuit model shown in FIG. 1A.

In FIG. 1B, the driver 10 is represented by an equalizing circuit comprising a power source V, resistor $R_1$, and capacitor $C_1$. The receiver 11 can be represented by an equalizing circuit comprising a capacitor $C_2$.

A line current I flows as a loop as shown in FIG. 1B. The area of the loop is represented by S (=lh). The straight line below the line current I shown at the upper portion in FIG. 1B indicates that the line current I is constant (flat) regardless of the position of the line.

The line current I can be computed through a concentrated constant circuit comprising the equalizing circuit of the driver 10 and receiver 11 by the following equation (1).

$$I = \frac{C_2}{C_1 + C_2} \frac{1}{R + j\omega C_1 \frac{C_2}{C_1 + C_2}} \quad (1)$$

$\omega = 2\pi f$: angular frequency $f$: frequency

Then, using the line current I computed by the above equation (1), a radial electromagnetic field E is computed by the following approximation (2).

$$E = ASI\frac{f^2}{r} \quad (2)$$

$A - 1.32 \times 10^{15}$: constant $r$: distance up to the observation point

As described above, the computation according to the small loop antenna approximation involves a very simple equation, and the computation can be performed at a high speed.

However, since the line current I is assumed to be constant on the line, the current distribution on the line varies when the frequency f refers to a high frequency, thereby considerably lowering the precision.

Thus, the computation using the small loop antenna approximation is the simplest method of all the above listed approximations, but in practice it is not used at all because it is inferior in precision if the size of the loop cannot be ignored when compared with the wave length of the electromagnetic wave.

The distributed constant circuit approximation refers to a method of considering the current distribution to improve the precision.

The distributed constant circuit approximation refers to a method of obtaining a current value by applying the equation of the distributed constant line to an object to be represented as a one-dimensional structure by an approximation.

The computation can be easily done in this method. The computation time and storage capacity are increased in proportion to the number of analysis elements. Furthermore, the analysis is made including the reflection and resonance of a line, etc. Therefore, in the distributed constant circuit approximation, a high-speed and high-precision analysis can be made on an object to which a one-dimensional approximation can be applied.

FIGS. 2A and 2B show the above described distributed constant line approximation.

The circuit model shown in FIG. 2A is the same as that shown in FIG. 1A, and the detailed description is omitted here.

FIG. 2B shows the equalizing circuit of the circuit shown in FIG. 2A.

In FIG. 2B, the equalizing circuit of the driver 10 and receiver 11 is the same as that shown in FIG. 1B.

When the frequency f becomes high and the wave length λ becomes shorter than the line length l in FIG. 2A, a standing wave current flows through the line and the distribution of the current varies with the line position. In FIG. 2B, for instance, the value of the line current I is larger on the driver 10 side while the value of the line current I is smaller on the receiver 11 side. The value of the line current I at a certain point is represented by I(x) while the voltage at a certain point is represented by V(x), where x indicates a variable representing the distance from the receiver 11, that is, the origin (x=0). The driver 10 refers to (x=L).

In FIG. 2B, "Zo" indicates a characteristic impedance in a distributed constant line. "$Z_L$" indicates a characteristic impedance at the receiver 11. 'β' indicates a wave number and is represented by (β=ω/c=2π/λ). The wave length λ is represented by (λ=c/f). The 'c' indicates the velocity of light.

The current distribution I(x) of the line can be obtained by the following equation (3).

$$I(x) = \frac{V_{(L)}}{Z_o} \times \frac{Z_o \cos\beta x + jZ_L \sin\beta x}{Z_L \cos\beta L + jZ_o \sin\beta L} \quad (3)$$

As described above, the computation done using the distributed constant line approximation allows a high-speed and high-precision analysis to be made on an object to be processed as a one-dimensional structure by an approximation.

However, some objects that cannot be processed as one-dimensional structures by an approximation are not analyzed.

The moment method is one of the solutions of an integral equation derived from the Maxwell electromagnetic wave equations, and can process a 3-dimensional object. In this method, an object is divided into small elements to compute an electric current.

Thus, since a 3-dimensional object can be processed by the moment method, an electromagnetic field intensity computing apparatus for computing the electromagnetic field intensity of an electric circuit device does computation mainly by the moment method.

In the computation by the moment method, a metal portion to be analyzed is divided into a mesh form to obtain a mutual impedance Zij among the divided metal portions. Then, the following moment equation, which governs the mutual impedance Zij, wave source Vi, and electric current Ii flowing through the divided metal portions, is solved to obtain a current value $$[Zij][Ii]=[Vi] \quad (4)$$

Using the computation result, the electromagnetic field intensity can be obtained. The "[ ]" in equation (4) indicates a matrix.

The following reference 1 describes the above mentioned moment method.

H. N. Wang, J. H. Richmond and M. C. Giilreath: "Sinusoidal reaction formulation for radiation and scattering from conducting surface", IEEE TRANSACTIONS ANTENNAS PROPAGATION, vol. AP-23, 1975

As described above, a current value cannot be obtained in the distributed constant line approximation when an object cannot be processed as a one-dimensional structure. Therefore, the entire device including the printed board and the housing cannot be analyzed.

In the moment method, the entire electric circuit device including the printed board and the housing can be analyzed.

However, the method has the following problems (1) through (5).

(1) When the size of the device to be analyzed becomes large, the amount of computation also becomes large. Therefore, the analysis cannot be made within a practical period of time using a current computer.

(2) The conventional electromagnetic field intensity computing apparatus uses the moment method with dielectric portions on the printed board in the electric circuit device divided into a mesh form to obtain simultaneous equations using, and with the equalizing current and magnetic current flowing on the surface set as unknown values.

Therefore, a greater number of patches forming a mesh requires a longer time in solving the simultaneous equations in the moment method and also requires a large memory capacity.

(3) A long time is required in computing the immittance matrix elements among the divided surface patches in a mesh form.

(4) The above mentioned mutual impedance Zij has been computed using a double-precision real number to perform a high-speed operation. However, this computation cannot output an exact value of the mutual impedance Zij.

In detail, in the computation using the double-precision real numbers, lower-order significant numbers are lost when performing multiplication. Therefore, computing the mutual impedance Zij in this method may result in the loss of digits when the electric length (length in emitted magnetic wave length units) of the metallic mesh becomes short. As a result, the mutual impedance Zij cannot be obtained exactly.

(5) The cable pigtail portion (terminating unit of a cable) applicable to the moment method has not been appropriately developed to analyze the electromagnetic radiation from the cable pigtail.

To solve the above listed problem (1), in the Japanese Patent Application Number 6-27109, the Applicant of the present invention has suggested a method of computing current distribution by dividing an electric circuit device to be analyzed into a portion to which the distributed constant line approximation can be applied and a portion to which the approximation cannot be applied, and by computing the current distribution in the distributed constant line approximation for the applicable portion and computing the current distribution in the moment method for the inapplicable portion.

To solve the problem (2), in the Japanese Patent Application Number 6-95363, the Applicant of the present invention has suggested a computing method in which a capacitance model of a transmission line is designed and a dielectric portion is converted into a capacitor having the capacity ΔC=$C_0$ (ε eff−1) per unit length. In this method, $C_0$ indicates the capacity per unit length, in a vacuum, of the metallic pattern having the dielectric portion inserted. "ε eff" indicates an effective dielectric constant.

The method (Japanese Patent Application Number 6-27109) obtained by combining the above described distributed constant line approximation with the moment method, and the method (Japanese Patent Application Number 6-95363) for the capacitance model of a transmission line have been only effective in a circuit of an electric current through a transmission line.

As a method of reducing the computation time for immittance matrix elements among the surface patches, the method disclosed by the following reference 2 has been conventionally used.

E. H. Newman and D. M. Pozar:
"Considerations for Efficient Wire/Surface Modelling" IEEE TRANSACTIONS ON ANTENNAS AND PROPAGATION vol. AP-28, No.1, JANUARY 1980 (reference 2)

In the above mentioned reference 2, if relative positions are equal to each other between the surface patches on a plate to be analyzed, then the mutual impedances are also equal to each other. Thus, the mutual impedance is computed between the patches having unique relative positions. The result is used for the matrix elements having similar relative positions.

However, in the method described by the reference 2, only the relative positions of the patches on a single board are referred to, but this method does not disclose the reduction of the amount of computation by analyzing the relative positional relationships among the patches on a plurality of plates.

Since the plate to be analyzed can be in various forms, the method of extracting the patches having equal relative positional relationships on one or more plates and then automatically detecting from among them the patches having unique relative positional relationships has not been developed yet. Therefore, much time and labor have been required to check the relative positional relationships among the patches and extract the relative positions.

To solve the problem (4), in the Japanese Patent Application Number 6-95362, the Applicant of the present invention has suggested a computing method in which a normal computing unit and high-precision computing unit are provided to compute the mutual impedance to obtain the electromagnetic field intensity. The high-precision computing unit is used when it is anticipated by checking the wave length, element length, and distance that there is a possibility to lose digits.

The above described high-precision computation can be done using real numbers of multiple-precision and using multiple-length integers. In either computation, since the number of digits increases, the computation time is greatly extended.

Finally, the above described problem (5) is explained in detail.

An object to be analyzed by the electromagnetic field intensity computing apparatus can be a housing, a printed substrate and a cable of an electric circuit device. The electric wave radiation from the cable is mainly caused by the pigtail, that is, the terminal processing unit of a cable.

FIGS. 3A through 3C show the radiation mechanism from the pigtail.

In FIG. 3A, 20 is a coaxial cable, and 21 is a housing of the electric circuit device.

When the read wire of a pigtail portion is long and the pigtail portion is not shielded, a common mode current $I_3$ is induced when the electromagnetic field generated by line currents $I_1$ and $I_2$ as shown in FIG. 3A is radiated onto the shielded portion of the coaxial cable 20.

In this case, the line current $I_1$ is almost equal to the line current $I_2 (I_1 \approx I_2)$, and the differential mode offsets the electric wave radiation. However, the common code current $I_3$ is not offset. Accordingly, the common code current $I_3$ causes a serious electric wave.

In the case shown in FIG. 3A, the conventional method of computing the electromagnetic field intensity is the method shown in FIG. 3B. In this method, the value of the electric wave radiation is computed by equivalently computing the voltage V generated on the lead line of the pigtail portion and designing an antenna to be inserted between the housing 21 and the coaxial cable 20.

The equivalent circuit is shown in FIG. 3C. In FIG. 3C, Zin indicates an impedance in the coaxial cable 20. Z1 indicates the impedance in a pigtail lead line. Ra indicates the radiation resistor from the coaxial cable 20. An antenna structure is generated using the housing 21 of the electric circuit device as a ground to generate an electric wave.

FIGS. 4A and 4B show the problems in calculating the electromagnetic field intensity of the pigtail portion.

As shown in FIG. 4A, when a load Z0 is connected to the tip of the coaxial cable 20 of a device, the device has a pigtail portion also at a load unit. This may cause further electromagnetic wave radiation. In this case, no housing is provided at the tip of the coaxial cable 20. Therefore, no antenna model can be produced.

Thus, the electric current flowing through the lead line may be analyzed by the moment method without producing an antenna model. At this time, the following problems (a) through (c) should be solved.
(a) How is the shield of the thick and cylindrical coaxial cable 20 connected to a thin pigtail lead line 22?
(b) How is the coaxial cable 20 connected to the housing 21 if the coaxial cable 20 is directly connect ed to the housing?
(c) The electric current through the shield of the coaxial cable 20 normally flows in parallel with the cable, but flows toward a pigtail lead line 22 when the current approaches the pigtail, and changes its flow from the parallel to vertical direction as shown in FIG. 41. How is the current represented and processed?

As described above, the electromagnetic field intensity computing apparatus for computing the electromagnetic field intensity of an electric circuit device according to the moment method conventionally has the above listed problems (1) through (5). To solve the problems, the Applicant of the present invention has suggested the above described solution.

However, the suggested solution has been insufficient to precisely compute the electromagnetic field intensity at a high speed.

SUMMARY OF THE INVENTION

The present invention aims at providing an electromagnetic field intensity computing apparatus for precisely calculating the electromagnetic field intensity of the electric circuit device at a high speed according to the moment method. It also aims at precisely calculating the electromagnetic field intensity by producing a model of a cable terminal unit.

The first electromagnetic field intensity computing apparatus comprises a data input unit for receiving the structure information about the electric circuit device to be analyzed; a ground electric current distribution computing unit for obtaining the ground electric current distribution of the ground layer according to the structure information about the electric circuit device received from the data input unit; a model generating unit for generating a model of a transmission line and a ground layer or a dielectric portion according to the ground electric current distribution obtained by the ground electric current distribution computing unit; and an electromagnetic field intensity computing unit for computing the electromagnetic field intensity of the electric circuit device by the moment method according to the information about the model generated by the model generating unit.

With the above described configuration, the first electromagnetic field intensity computing apparatus obtains the electric current distribution in the ground layer and generates a model to be analyzed according to the ground electric current distribution so that a precise model can be generated and analyzed and the electromagnetic field intensity can be computed precisely.

The second electromagnetic field intensity computing apparatus comprises a data input unit for receiving the structure information about the electric circuit device to be analyzed; an analysis-object dividing unit for assigning a series of patch numbers to patches obtained by dividing at least one plate to be analyzed into smaller elements, that is, the patches; and an electromagnetic field intensity computing unit for computing the mutual impedance between patches having unique relative positions to each other among the patches assigned patch numbers by the analysis-object dividing unit, obtaining for the other patches the mutual impedances between the patches according to the computed mutual impedance, and then computing the electromagnetic field intensity of the electric circuit device by the moment method according to the obtained mutual impedances.

With the above described configuration, the second electromagnetic field intensity computing apparatus automatically extracts the regularity in given structure data and applies the computation results of the mutual impedances of a portion of patches to other portions, thereby considerably reducing the amount of computation when computing the electromagnetic field intensity at a high speed.

The third electromagnetic field intensity computing apparatus comprises a data input unit for receiving the structure information about the electric circuit device to be analyzed; a mutual impedance computing unit for computing the mutual impedance by a predetermined approximation equation obtained according to the characteristics of the object whose mutual impedance is computed and whose elements have short electric length and are relatively distant from each other; an electric current computing unit for producing simultaneous equations for the moment method using the mutual impedance computed by the mutual impedance computing unit, and for computing the value of the electric current flowing through each element; and an electromagnetic field intensity computing unit for computing the electromagnetic field intensity according to the electric current value computed by the electric current computing unit.

With the above described configuration, the third electromagnetic field intensity computing apparatus can use more simple equations than the conventional method and therefore can do computation at a high speed by obtaining an approximation equation according to the characteristics of an object whose mutual impedance is computed and whose elements have short electric lengths and are relatively distant from each other when the elements of the analysis-object meet the conditions that the elements have short electric lengths and are distant from each other. Since the computation includes no exponential integral in the above described approximation equation, there is a smaller possibility of losing digits, thereby successfully preventing the computation from being deteriorated in precision.

The fourth electromagnetic field intensity computing apparatus comprises a data input unit for receiving the structure information about the electric circuit device to be analyzed; a cable pigtail portion extracting unit for extracting the pigtail portion at the end of the coaxial cable according to the structure information about the electric circuit device received from the data input unit; a polygon modelling unit for approximating a coaxial cable shield near the end of the cable using a polygonal cylinder according to the structure information about the pigtail portion extracted by the cable pigtail portion extracting unit, connecting the pigtail lead unit to the approximated polygon, and generating a model obtained by connecting the polygon to the housing of the electric circuit device; and an electromagnetic field intensity computing unit for computing the electromagnetic field intensity of the electric circuit device by the moment method according to the information modelled by the modelling unit.

With the above described configuration, the fourth electromagnetic field intensity computing apparatus approximates the portion near the cylindrical coaxial cable pigtail portion into a polygon to realize the vertical flow of the electric current for connection to each unit, thereby performing precise computation.

BRIEF DESCRIPTION OF THE DRAWINGS

FIGS. 11A through 11D show the procedure of converting a 3-wire route shown in FIG. 10C into wires 133a through 133c;

FIGS. 12A and 12B show the two-dimensional analysis method (1);

FIG. 15 is a block diagram showing the configuration of an electromagnetic field intensity computing apparatus 200;

FIG. 24 is a block diagram showing the configuration of the electromagnetic field intensity computing apparatus 300 according to the third embodiment;

FIG. 29 shows the computation result of a normal conventional computation using a double-precision real number;

FIG. 30 shows the computation result of a high-precision computation using a multiple-length integer with a fixed decimal point;

FIG. 31 shows the computation result of an approximation equation according to the third embodiment;

FIG. 32 is a block diagram showing the configuration of an electromagnetic field intensity computing apparatus 400 according to the fourth embodiment;

FIG. 36 is a flowchart showing the process performed by the electromagnetic field intensity computing apparatus 400 according to the fourth embodiment; and FIG. 37 is a flowchart showing in detail the model generating and modifying processes in step S92 of the flowchart shown in FIG. 36.

DESCRIPTION OF THE PREFERRED EMBODIMENT

The embodiment of the present invention is described by referring to the attached drawings.

FIGS. 5 through 14 show the first embodiment of the present invention.

As described above, the conventional method has been effective for a circuit of an electric current, etc., through a transmission line.

However, when the inventor considers the radiation characteristics of electric waves, the electric wave radiation pattern greatly changes depending on the distribution of the return current of the transmission line flowing through the ground.

In reverse, if the ground current distribution can be exactly represented, then the precision in radiation characteristics can be considerably improved.

Figure 1A:
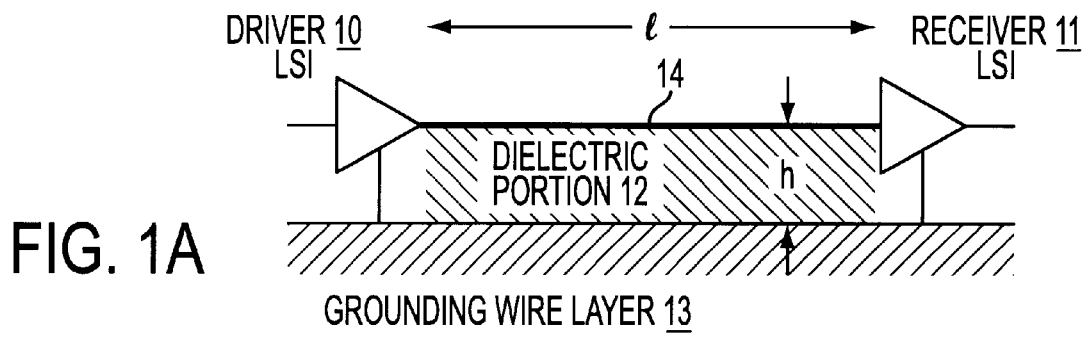
FIGS. 1A and 1B show the small loop antenna approximation.
Figure 1B:
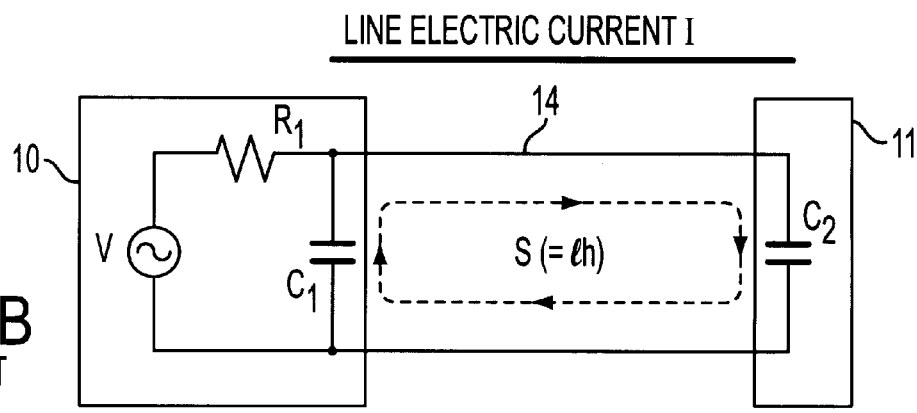
Figure 2A:
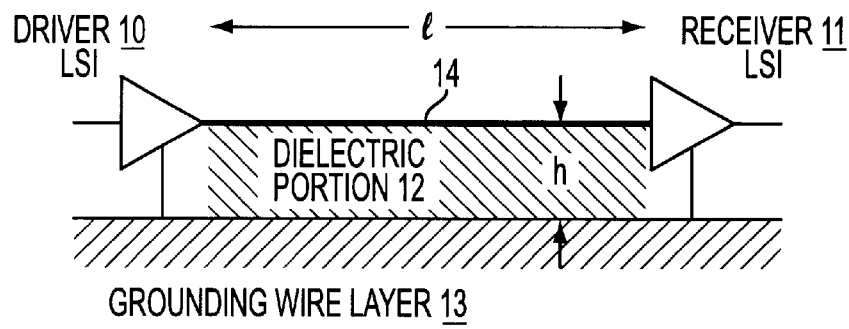
FIGS. 2A and 2B show the distributed constant line approximation.
Figure 2B:
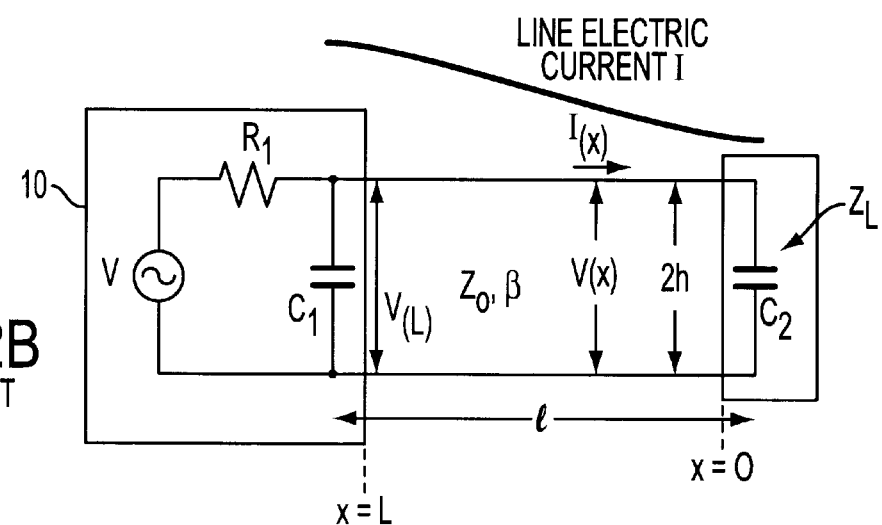
Figure 3A:
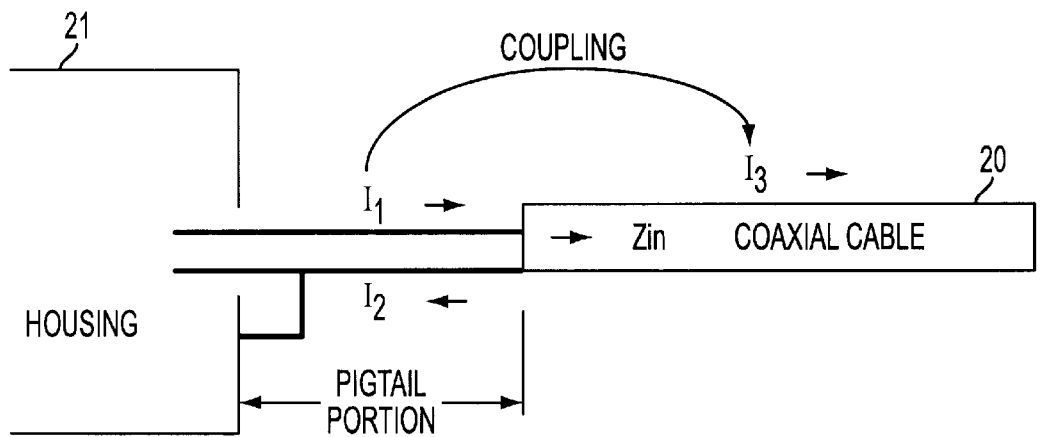
FIGS. 3A through 3C show the mechanism of the radiation from the pigtail portion.
Figure 3B:
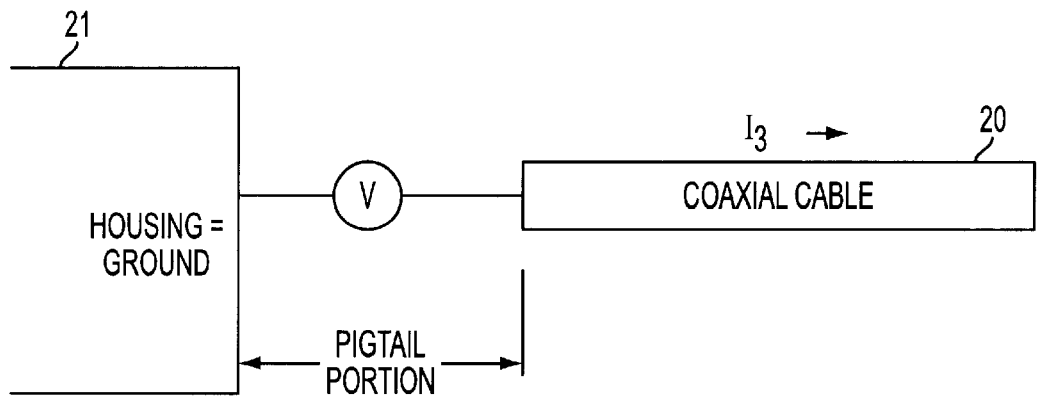
Figure 3C:
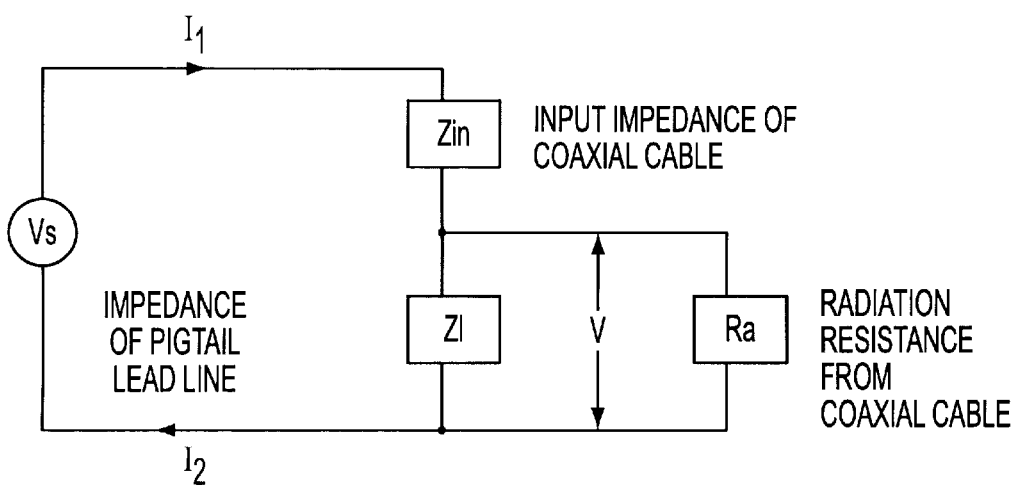
Figure 4A:
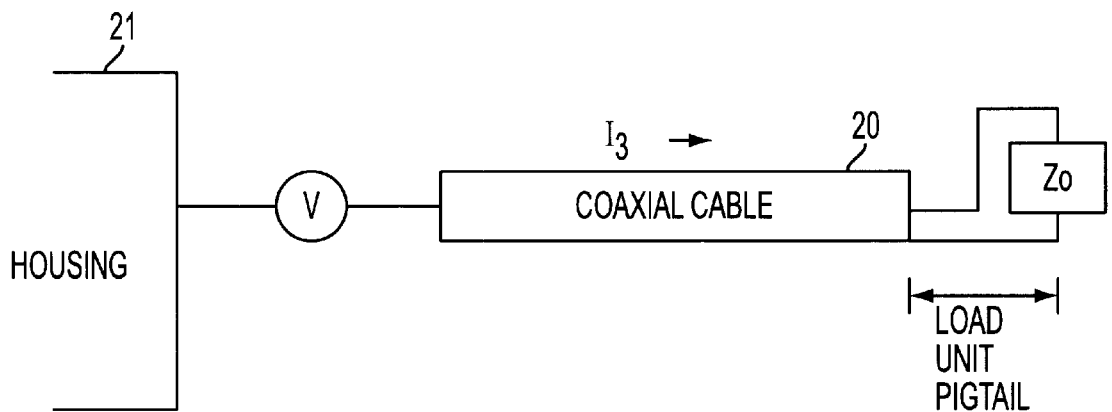
FIGS. 4A and 4B show the problems in calculating the electromagnetic field intensity of the pigtail portion.
Figure 4B:
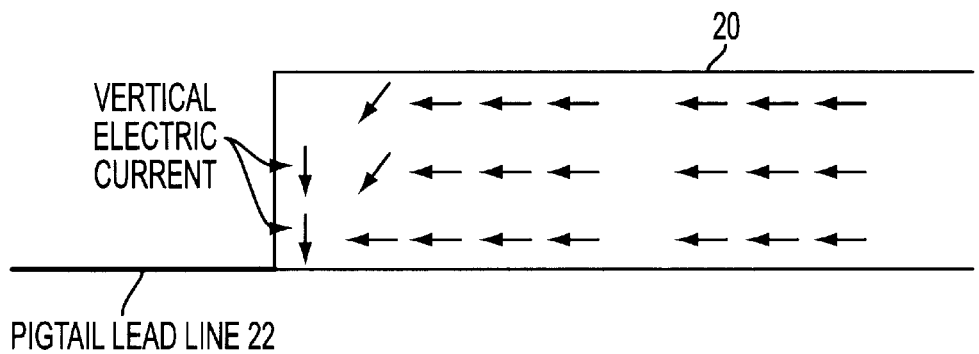
Figure 5:
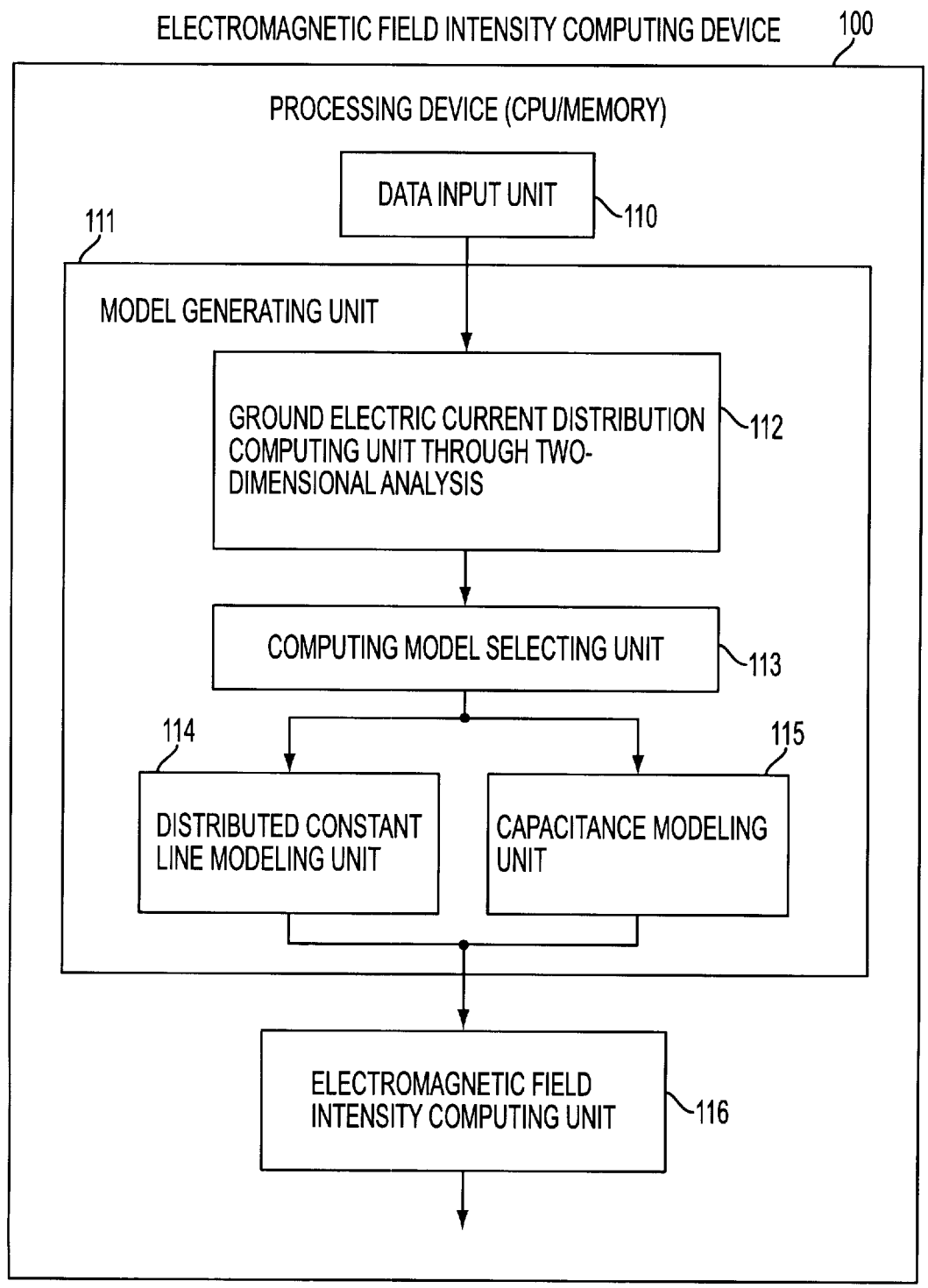
FIG. 5 is a block diagram showing the configuration of the electromagnetic field intensity computing apparatus according to the first embodiment of the present invention.

FIG. 5 is a block diagram showing the configuration of the electromagnetic field intensity computing apparatus 100 according to the first embodiment.

In FIG. 5, the electromagnetic field intensity computing apparatus 100 computes the electromagnetic field intensity of the electric circuit device to be analyzed in the moment method. For example, the electromagnetic field intensity computing apparatus 100 can be a CPU, memory, etc., as hardware.

The electromagnetic field intensity computing apparatus 100 comprises a data input unit 110; a model generating unit 111; and an electromagnetic field intensity computing unit 116. The model generating unit 111 comprises a ground electric current distribution computing unit 112 through a two-dimensional analysis; a computation model selecting unit 113; a distributed constant line modelling unit 114; and a capacitance modelling unit 115.

The data input unit 110 inputs the structure information about the electric circuit device to be analyzed.

The model generating unit 111 generates a model according to the structure information about the electric circuit device received from the data input unit 110.

The model generating unit 111 comprises the ground electric current distribution computing unit 112, computation model selecting unit 113, distributed constant line modelling unit 114, and capacitance modelling unit 115.

The ground electric current distribution computing unit 112 obtains, through two-dimensional analysis other than the moment method, the ground electric current distribution in the ground layer according to the structure information about the electric circuit device to be modelled.

The computation model selecting unit 113 makes a selection according to the input data or at the instruction of an external unit, for example, from the operator, etc., as to whether a model is generated by the distributed constant line modelling unit 114 or the capacitance modelling unit 115.

The distributed constant line modelling unit 114 represents a transmission line and a ground layer using a plurality of wires or surface patches, obtains a total value of the return current flowing through the ground layer by the distributed constant line approximation, and generates a model in a way that the current value obtained by the distributed constant line approximation is assigned to each wire or surface patch according to the current distribution obtained by the two-dimensional analysis.

The capacitance modelling unit 115 represents a ground layer with a plurality of wires or surface patches, adjusts the characteristic impedance between each wire or surface patch and a transmission line so that the ground electric current distribution computed by the ground electric current distribution computing unit 112 through the two-dimensional analysis can be obtained, and generates a model by converting a dielectric portion therebetween into a capacitor having an equal capacity.

The electromagnetic field intensity computing unit 116 calculates the electromagnetic field intensity of the electric circuit device by the distributed constant line approximation or moment method according to the information modelled by the distributed constant line modelling unit 114 or capacitance modelling unit 115.

Described below is the operation of the electromagnetic field intensity computing apparatus 100 with the above described configuration.

First, the ground electric current distribution computing unit 112 obtains the ground electric current distribution through two-dimensional analysis other than the moment method.

The two-dimensional analysis is described later (FIGS. 12, 13, and 14) in the outline of the method, and the detailed description is omitted here.

Then, using the ground electric current distribution obtained through the above described two-dimensional analysis, the moment method is followed. Since the two-dimensional analysis can normally be performed within a short time, the precision in radiation characteristics can be improved without a large-scale increase in analysis time.

Then, the distributed constant line modelling unit 114 or the capacitance modelling unit 115 performs a modelling process.

When a model is generated by the distributed constant line modelling unit 114, the sum of the return current flowing through the ground layer is obtained by the distributed constant line approximation. The ground electric current distribution is represented by a value obtained through the above described two-dimensional analysis.

The ground electric current distribution is represented by a plurality of wires. Each wire is assigned the value of the ground electric current distribution obtained through the distributed constant line approximation and the two-dimensional analysis. It also can be represented by a surface patch instead of wire.

When a transmission line is modelled by the capacitance modelling unit 115, the characteristic impedance is adjusted between each wire and the transmission line so that the ground electric current distribution obtained through the above described two-dimensional analysis can be obtained. The characteristic impedance can be set to a desired value by changing the distance between each wire and the transmission line, and the diameter of each wire. In this case, surface patches can replace the wire.

After performing the modelling process by the distributed constant line modelling unit 114 or the capacitance modelling unit 115, the electromagnetic field intensity computing unit 116 computes the electromagnetic field intensity.

Described below are the surface patches.

In the moment method, the surface of a metallic conductor is divided into a plurality of rectangular or triangular patches that are referred to as surface patches. When a model is generated using the surface patches, the size of the surface patches changes with the ground electric current distribution obtained through the two-dimensional analysis. To obtain the optimum patch size with precision, the size of the patches is reduced at a portion where changes are made frequently, while it is enlarged at a portion where changes are made moderately.

FIGS. 6A, 6B, and 7A through 7D show examples of modelling processes performed by the model generating unit 111 shown in FIG. 5.

Figure 6A:
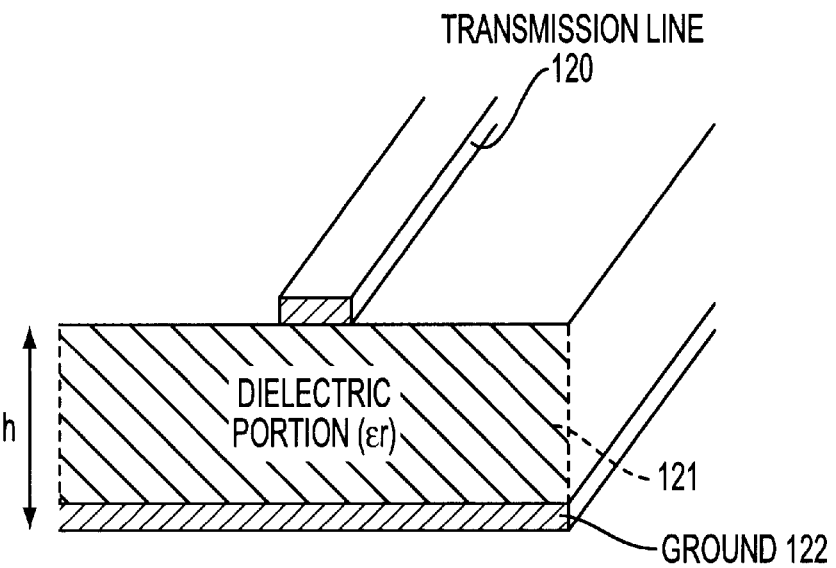
FIGS. 6A and 6B show examples (1) of models generated by the model generating unit 111 shown in FIG. 5.

According to the present embodiment, a metallic element is modelled. In this example, a ground 122 is distant by h from a transmission line 120 as shown in FIG. 6A. When a capacitance is modelled, a dielectric portion 121 having the dielectric constant εr exists between the ground 122 and transmission line 120.

When the electromagnetic field intensity is computed, the horizontal electric current of the ground 122 is regarded as distribution. Accordingly, using the two-dimensional vertical section as shown in FIG. 6B, the horizontal current distribution of the ground 122 is computed by the two-dimensional analysis.

Figure 6B:
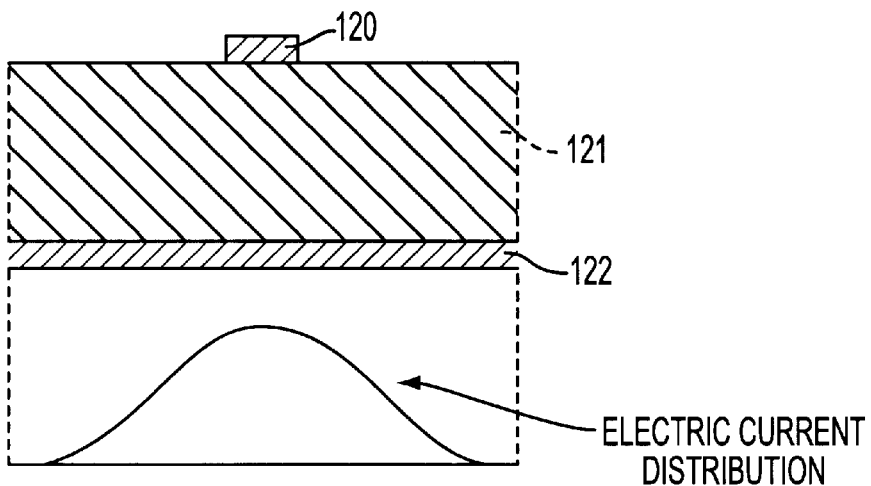

FIG. 6B shows a larger current value near the transmission line 120 in a current distribution as an example of the horizontal current distribution of the ground 122.

The ground electric current distribution can be computed through two-dimensional analysis using various methods excluding the moment method. There are several methods as two-dimensional analysis. The detailed explanation is given later by referring to FIGS. 12A through 14, and therefore is omitted here. The explanation relates to computation within a short time.

Figure 7A:
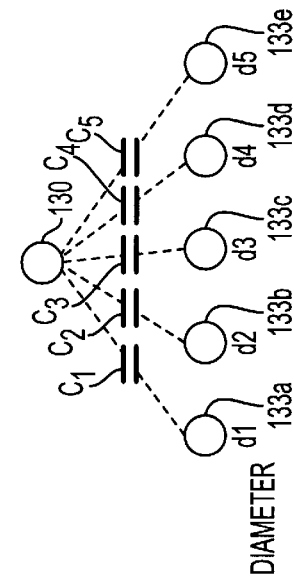
FIGS. 7A through 7D show examples (2) of models generated by the model generating unit 111 shown in FIG. 5.
Figure 7C:
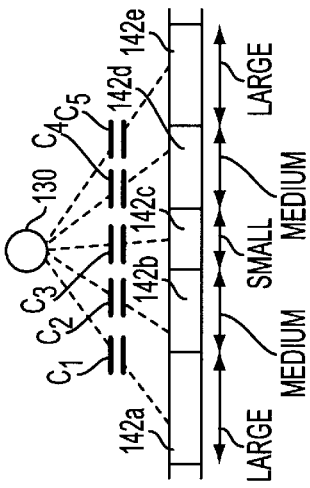
Figure 7B:
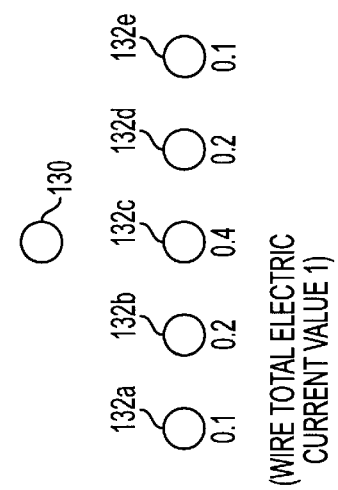
Figure 7D:
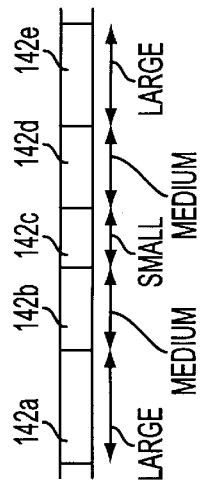

FIGS. 7A and 7B show examples of modelling the objects to be modelled shown in FIGS. 6A and 6B into distributed constant line approximation models. FIGS. 7C and 7D show examples of capacitance models.

According to the present embodiment, distributed constant line models and capacitance models are generated.

As shown in FIG. 7A, the distributed constant line models can be line models 130 which are wire-modelled from the transmission lines 120 and wires 132a through 132e which are approximated from the ground 122 to a plurality of wires. The number of wires can be optionally determined. A greater number of wires results in higher precision, but a longer computation time.

If the electric current of 1 flows through the transmission line 120, the electric current value is distributed to each wire in a way that a total electric current of 1 flows through the wires 132a through 132e. At this time, the electric current value is assigned to each of the wires 132a through 132e according to the ground electric current distribution shown in FIG. 6B.

In the example shown in FIG. 7A, the electric current value 0.4 is assigned to the wire 132c closest to the transmission line 120. Likewise, the electric current value 0.2 is assigned to the wires 132b and 132d. The electric current value 0.1 is assigned to the wires 132a and 132e farthest from the transmission line 120.

As shown in FIG. 7B, the ground 122 can be processed as surface patches 142a through 142e, and not approximated to the wires.

The electric current flowing through each of the surface patches 142a through 142e is, as with the case shown in FIG. 7A, assigned such that the total electric current value is 1.

When the moment method is used, it is also effective to change the patch size depending on the electric current distribution. In FIG. 7B, the size of the surface patch 142a closest to the transmission line 120 is set to "small". The size of the surface patches 142b and 142d second closest to the transmission line 120 is set to "medium". Then, the size of the farthest surface patches 142a and 142e is set to "large".

When a capacitance model of a transmission line is generated, the ground layer 122 is modelled into each of the wires 133a through 133e as shown in FIG. 7C. In FIG. 7A, each wire is assigned an electric current value. In FIG. 7C, the characteristic impedance is adjusted by changing the distance between each wire and the transmission line 120 and the diameter d1 through d5 of each of the wires 133a through 133e.

A dielectric portion 121 between the transmission line 120 and ground 122 is converted into capacitors $C_1$ through $C_5$ having equal capacity to simplify the simultaneous equations of the moment method.

As shown in FIG. 7D, the ground layer can be computed as the surface patches 142a through 142e instead of being converted into each of the wires 133a through 133e.

Figure 8:
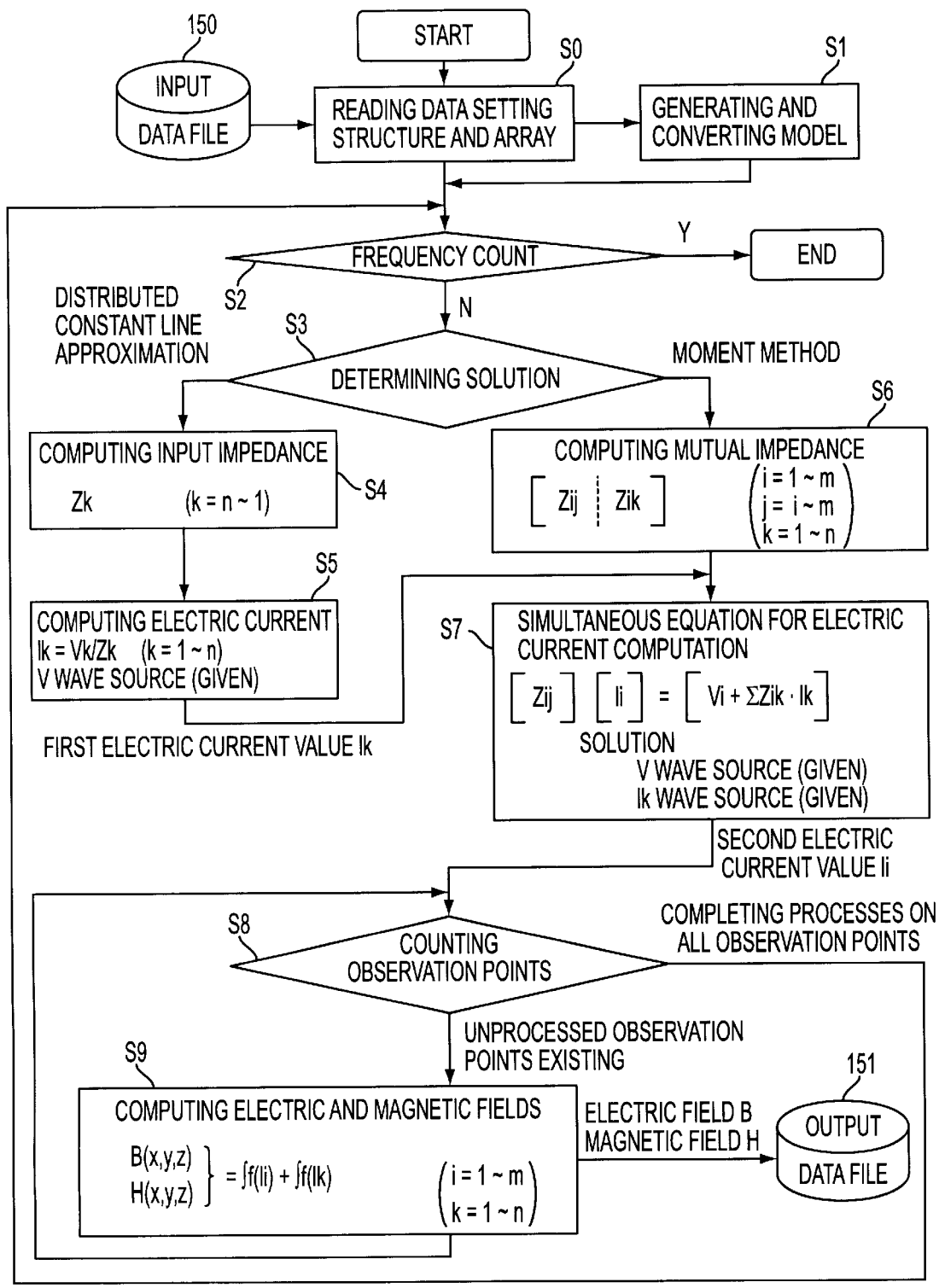
FIG. 8 is a flowchart showing the entire process of the electromagnetic field intensity computing apparatus according to the first embodiment.

FIG. 8 is the flowchart showing the process performed by the electromagnetic field intensity computing apparatus according to the first embodiment.

In FIG. 8, an input data file 150 is used to manage the structure information, etc., about the electric circuit device to be analyzed. An output data file 151 stores the data of the electromagnetic field intensity obtained as a computation result.

The processes are described by referring to FIG. 8.

When the electromagnetic field intensity computing apparatus 100 is activated, it reads the structure information about the electric circuit device from the input data file 150, and sets metallic elements and other data (frequency, etc.) as a structure and an array (step S0).

According to the input structure information about the electric circuit device, a model is generated and converted for a portion to be analyzed to compute the electromagnetic radiation (step S1). The detailed processes in step S1 are described in detail by referring to FIG. 9.

When a model is generated or converted in step S1, it is determined whether or not the process for all entered frequencies has been completed by counting the processed frequencies (step S2). When the process has been completed (yes in step S2), all processes of computing the electromagnetic field intensity terminate. When an unprocessed frequency is detected (no in step S2), the frequency to be processed next is selected from among unprocessed frequencies.

Then, it is determined whether the object to be analyzed is a portion of a device (hereinafter referred to as simply "a device") to which the distributed constant line approximation is applied, or a device to which the moment method is applied according to the indications in the structure information read in step S0 or the modelling information generated in step S1 (step S3). When the distributed constant line approximation is applied, control is passed to step S4. When the moment method is applied, control is passed to step S6.

The determination can be made according to the indicators or directly according to the shape of an analysis object and dimensional information, etc.

If it is determined that the distributed constant line approximation is applied in step S3, then the input impedance Zk (k=1~n) of each wire is computed (step S4). The computation of the input impedance Zk (=Zin) is performed by the distributed constant line approximation as follows.

$$Zin = Z_0(ZL \cosh\gamma L + Z_0 \sinh\gamma L)/(Z_0 \cosh\gamma L + ZL \sinh\gamma L)$$

where $Z_0$ indicates line characteristics impedance, $\gamma$ indicates a propagation constant, L indicates a line length, and ZL indicates a load impedance in the down stream.

The input impedance Zin of the line in the up stream of the line is computed by using as a new ZL the computed input impedance Zin of the line in the down stream.

For example, if the line is branched into the two impedances Z1in and Z2in, then an impedance is computed according to Ohm's Law as follows.

$$Zin = (Z1in * Z2in)/(Z1in + Z2in)$$

Then, using the wave source of the uppermost stream and the computed input impedance Zk, the electric current Ik (=Vk/Zk)(k=1~n) of each line is computed in order from the up stream for n lines regarded as a device to which the distributed constant line approximation is applied in step S3.

The computation of the electric current Ik is performed as follows in the distributed constant line approximation.

$$IB = (VA \cosh\gamma L + Z_0\, IA \sinh\gamma L)/ZBin$$

where $Z_0$ indicates the line characteristic impedances, $\gamma$ indicates a propagation constant, L indicates a line length, ZAin indicates the impedance in the up stream of the line, ZBin indicates the impedance in the down stream of the line, IA indicates the electric current in the up stream of the line, IB indicates the electric current in the down stream of the line, and $VA(=ZAin \times IA)$ indicates the wave source in the up stream of the line.

In the computation in steps S4 and S5, the computation result (computed in step S1) of the distributed constant line model shown in FIG. 7A can be used.

For the device to which it is determined in step S3 that the moment method is applied, the mutual impedance Zij (i=1~m, j=i~m) among m devices determined in step S3 to be the devices to which the moment method is applied is computed using a Green function (step S6). The mutual impedance Zik (i=1~m, k=i~n) is computed between m devices to which it is determined in step S3 that the moment method is applied and n lines to which it is determined in step S3 that the distributed constant line approximation is applied.

Then, solving the integral equation in the moment method using the value computed in steps 5 and 6 the electric current Ii (i=1~m) of the device to which a Moment method is applied (step S7) is calculated. That is, the electric current Ii (i=1~m) of the device to which the moment method is applied is computed by solving the integral equation by the moment method using the electric current Ik computed in step S5 for the device to which the distributed constant line approximation is applied, the mutual impedances Zij and Zik computed in step S6, and the voltage value Vi (i=1~m) that is the wave source of the moment method specified by the structure information.

In the above described computation process, the mutual impedance Zik is used only in a matrix operation with the electric current Ik computed in step S5. The electric current Ik is used only in computing the wave source induced in the device to which the moment method is applied.

That is, when the moment method is applied to the entire electric circuit device to be analyzed in the conventional method, integral equations are solved according to the moment method using a mutual impedance of "(n+m)×(n+m)". On the other hand, the present invention solves integral equations according to the moment method using only the mutual impedance Zin of "m×m". Therefore, the integral equations can be solved at a high speed. Since the mutual impedance is a symmetrical matrix, the amount of computation can be actually reduced by half.

Thus, the electric current Ik of the device to which the distributed constant line approximation is applied is computed in step S5. When the electric current Ii of the device to which the moment method is applied is computed in step S7, it is determined by counting the process observation points whether or not the processes associated with all entered observation points have been completed (step S8).

If the processes are not completed, the electromagnetic field intensity provided for the observation points by the electric current Ik computed in step S5 and the electric current Ii computed in step S7 is computed using the electric currents Ik and Ii, and the computation result is stored in the output data file 151 (step S9). Then, control is returned to the process in step S8, and the processes in steps S8 and S9 are repeatedly performed until the processes associated with all the observation points have been completed.

If the computation of the electromagnetic field has been completed for all observation points, then control is returned to the process in step S2, and the processes are likewise repeated for the next frequency.

The computation of the electromagnetic field in step S9 is well-known as described below.

Depending on the distribution of the electric current flowing through an object, the electric field E at any observation point can be obtained by the following equations.

$$E = -j\omega \overline{A} + \frac{1}{j\omega k^2} \overline{A}$$

where, $$\overline{A} = \frac{\mu}{4\pi} \int_s J_s \frac{e^{-jkr}}{r} ds: \text{vector potential}$$

$$k = \frac{2\pi}{\lambda} = \frac{2\pi f}{c} (=\beta): \text{wave number}$$

where $J_S$ indicates the electric current distribution, S indicates the area of the electric current distribution, and r indicates the distance between the electric current distribution and the observation point.

The magnetic field H at any observation point can also be obtained using a vector potential by the following equation.

$$H = \frac{1}{\mu} rot \overline{A}$$

Described below in detail is the model generating and converting process in step S1 shown in FIG. 8.

Figure 9:
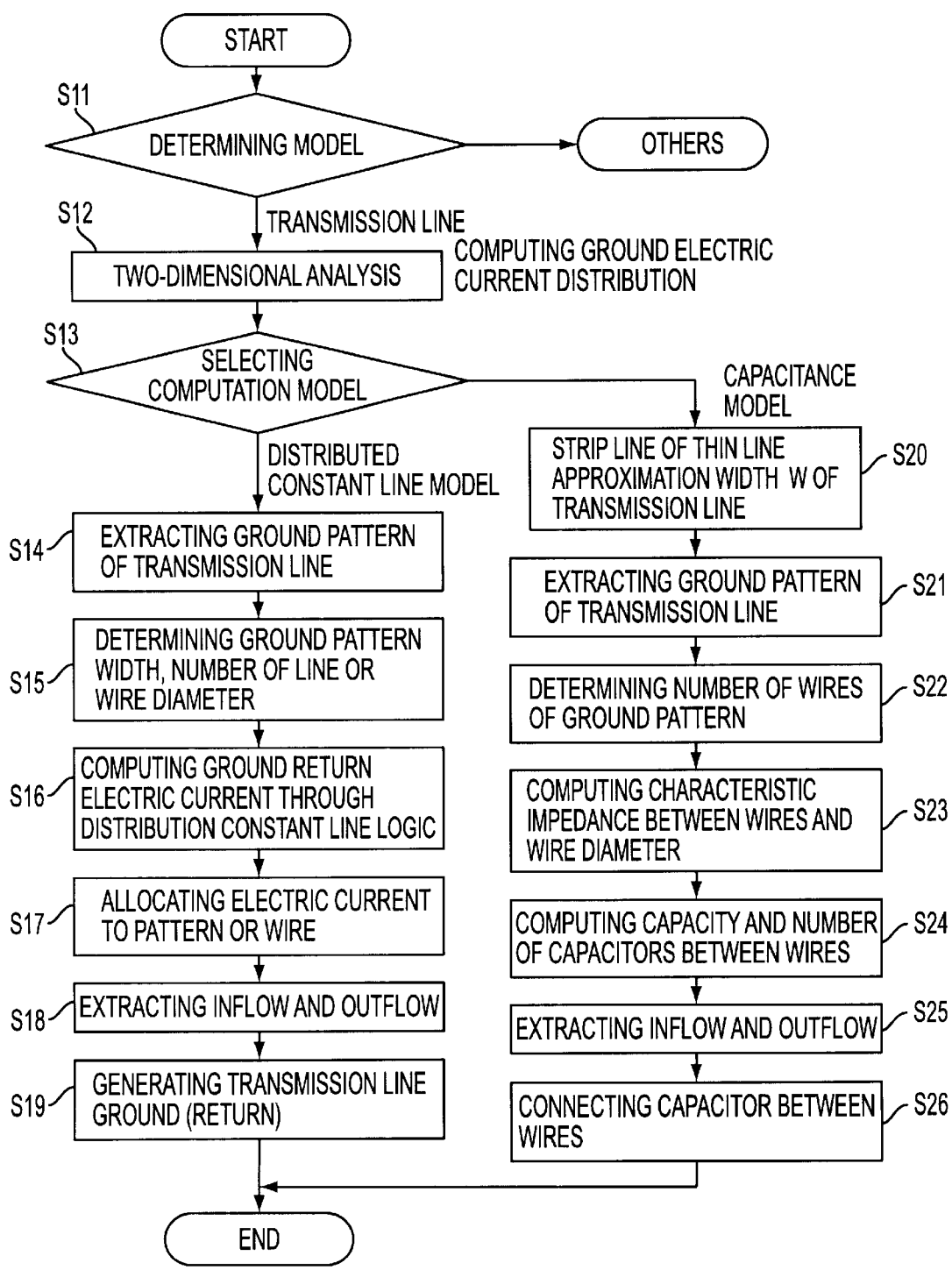
FIG. 9 is a flowchart showing in detail the model generating and modifying processes performed in step S1 in FIG. 8.

FIG. 9 is a flowchart showing in detail the model generating and converting process performed in step S1 shown in FIG. 8.

In FIG. 9, the portions as shown in FIG. 6A (transmission line, ground, etc.) are extracted from the objects to be analyzed (step S11). If a device is not a model as shown in FIG. 6A, it is not to be processed in the following modelling process.

Then, the ground electric current distribution as shown in FIG. 6B is computed for the extracted transmission line and the ground through the two-dimensional analysis (step S12).

Next, a distributed constant line model or a capacitance model is selected (step S13). If a distributed constant line model is used, control is ]passed to step S14. If a capacitance model is used, control is passed to step S20.

If the distributed constant line model is used, the ground pattern of a transmission line is extracted from input structure information (step S14). Then, the width and number of the ground patterns, or the size and number of the wires used when a ground pattern is converted into a line pattern are determined (step S15). Then, a total electric current value is computed for the ground return electric current according to the distributed constant line logic (step S16). The ground return electric current computed in step S16 is allocated to the ground pattern or each wire (step S17). The allocation is performed based on the format of the ground electric current distribution obtained in step S12. Then, the electric current input portion and electric current output portion are extracted (step S18), and a transmission line ground (return) unit is generated (step S19).

When a capacitance model is used, a thin line approximation is performed for a transmission line (step S20). That is, the strip line of the width w is represented by the wire of diameter d. Then, the ground pattern of the transmission line is extracted (step S21), and the number of wires into which the ground pattern is converted is determined (step S22). Upon determination of the number of wires, the characteristic impedance between wires and the diameters of the wires are computed (step S23). According to the dielectric constant between the transmission line and ground, the capacity and number of capacitors for wires are computed (step S24). Then, the electric current input portion and electric current output portion are extracted (step S25), Between the wires, a model to which the capacitor computed in step S24 is generated (step S26).

An example of converting a transmission line into a capacitance model is described further in detail by referring to FIGS. 10A through 10C and FIGS. 11A through 11D.

Figure 10A:
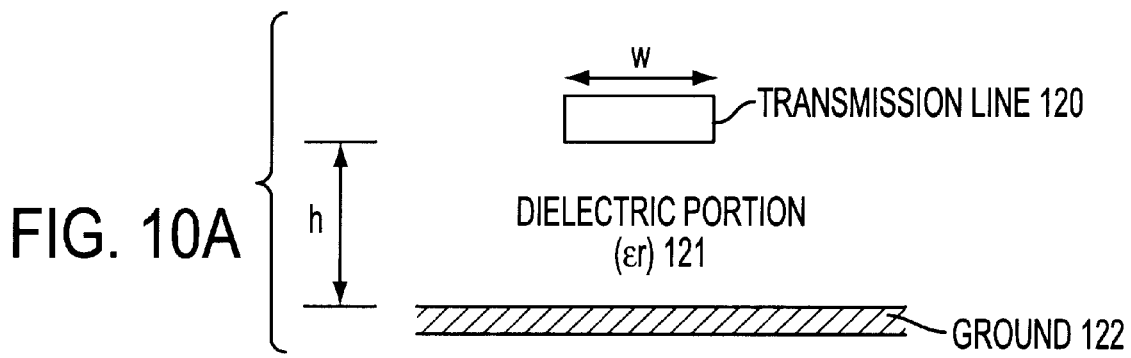
FIGS. 10A through 10C show examples of converting a transmission line into a capacitance model.

As an example of an object to be converted into a capacitance model, the dielectric portion ($\epsilon r$) 121 is inserted between the transmission line 120 of the strip line of width w and the ground 122 as shown in FIG. 10A. The distance between the transmission line 120 and ground 122 is h.

Figure 10B:
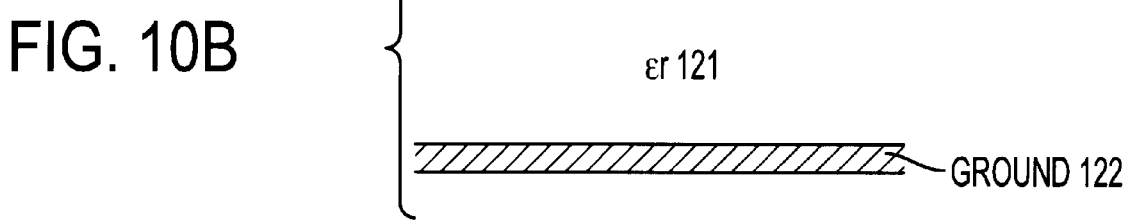

First performed is a conversion into an equalizing circuit as shown in FIG. 10B and as described below.

The strip line (transmission line 120) of width w is converted into the line wire 130 of diameter d.

The characteristic impedance $Z_0$ of a transmission line is computed as follows.

$$Z_0 = 60 \times \ln(8h/w + w/4h)$$

The characteristic impedance $Z_0$ used when the strip line (transmission line 120) of width w is converted into the line wire 130 of diameter d is computed as follows.

$$Z_0 = 60 \times \ln(8h/w + w/4h)$$

$$= 60 \times \ln[2h/d + (4h^2/d^2 - 1)^{1/2}] \quad (5)$$

(where the effective dielectric constant is not taken into account).

The following equation is derived from equation (5).

$$(4h^2/d^2 - 1)^{1/2} = -2h/d + (8h/w + w/4h) \quad (6)$$

Both sides of equation (6) are squared as follows.

$$d = [4h(8h/w + w/4h)]/[(8h/w + w/4h)^2 + 1] \quad (7)$$

Figure 10C:
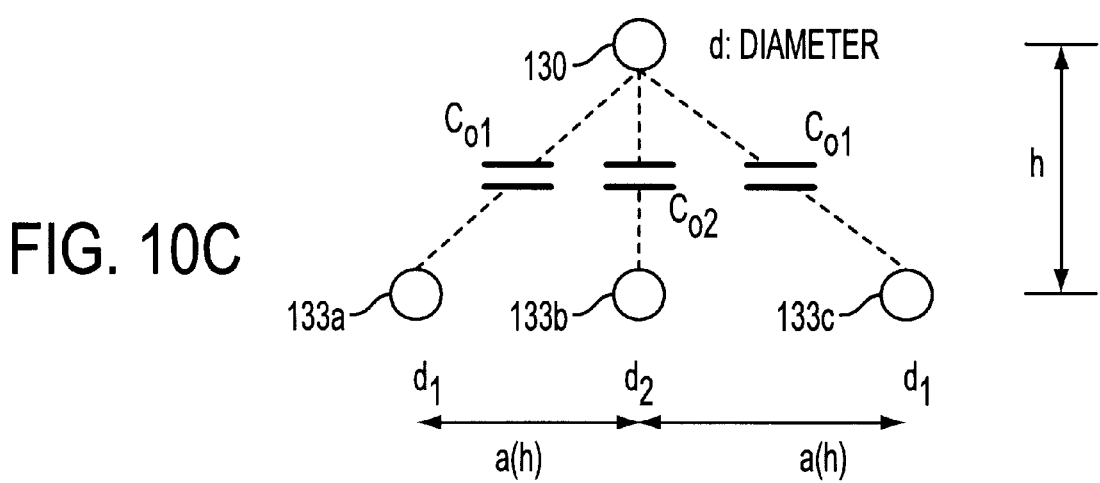

As described above, the conversion into an equalizing circuit as shown in FIG. 10B is followed by the conversion into the second equalizing circuit as shown in FIG. 10C.

The conversion is performed as follows.

The number of wires 130 converted from the ground 122 can be optionally determined, but three wires are used in the following description for simple explanation.

First, the distance a(h) between the wires 133a, 133b, and 133c is computed from the following equation.

$$k = (1 + a^2)^{1/2} \quad (8)$$

where k indicates a wave number.

The effective dielectric constant $\epsilon e$ of the transmission line is computed from the following equation.

$$\epsilon e = (\epsilon r + 1)/2 + (\epsilon r - 1)/[2(1 + 10h/w)^{1/2}] \quad (9)$$

Then, the procedure of converting into a 3-wire wires 133a through 133c as shown in FIG. 10C is described below by referring to FIGS. 11A through 11D.

[Procedure 1] As shown in FIGS. 11A and 11B, the parallel impedances of the 3-wire characteristic impedances $Z_{01}$, $Z_{02}$, and $Z_{01}$ are made equal to the characteristic impedance $Z_0$.

The ratio of the characteristic impedance $Z_{01}$ to the characteristic impedance $Z_{02}$ is obtained according to the ground electric current distribution. At this time, the result of the electric current distribution obtained through the two-dimensional analysis as shown in FIG. 11C is used. From the electric current shown in FIG. 11C, the ratio of the characteristic impedance between lines shown in FIG. 11D is $Z_{01}:Z_{02}=0.5:1$. That is, $Z_{01}=2\,Z_{02}$. Since the parallel impedance is equal to the characteristic impedance $Z_0$, the following equation is represented.

$$1/[1/Z_{01}+1/Z_{01}+1/Z_{02}]=Z_0$$

Accordingly, $Z_{02}=2\,Z_0$, and $Z_{01}=4Z_0$.

[Procedure 3] The characteristic impedance between lines is set to the value obtained in procedure 2 by adjusting the diameters $d_1$ and $d_2$. The computation is performed without the effective dielectric constant $\epsilon e$.

(a) The characteristic impedance $Z_{01}$ of the wire 133a is computed as follows.

$$Z_{01}=60\times ln[x_1+(x_1^2-1)^{1/2}] \tag{10}$$

where $$x_1=(4h^2-d^2-d_1^2)/2dd_1 \tag{11}$$

Using equation (10);

$$x_1=[\exp(Z_{01}/30)+1]/[2\exp(Z_{01}/60)]$$

Using equation (11);

$$d_1^2+2x_1dd_1+d^2-4h^2=0$$

$$d_1=-x_1d\pm(x_1^2d^2+4h^2-d^2)^{1/2}$$

(b) The characteristic impedance $Z_{02}$ of the wire 133b is computed as follows.

$$Z_{02}=60\times ln[x_2+(x_2^2-1)^{1/2}] \tag{12}$$

where $$x_2=(4h^2-d^2-d_2^2)/2dd_2 \tag{13}$$

Accordingly, the computation is performed by equations (12) and (13) as by equations (10) and (11).

$$x_2=[\exp(Z_{02}/30)+1]/[2\exp(Z_{02}/60)]$$

$$d_2=-x_2d\pm(x_2^2d^2+4h^2-d^2)^{1/2}$$

(c) the characteristic impedance of the wire 133c is equal to $Z_{01}$.

[Procedure 4] Then, the capacitance of each of the wires 133a through 133c is computed.

$$C_{01}=(1/c)[(\epsilon e-1)/Z_{01}]$$

$$C_{02}=(1/c)[(\epsilon e-1)/Z_{02}]$$

(where c indicates the velocity of light).

In the above listed procedures 1 through 4, the dielectric portion 121 is converted into a capacitor having an equivalent capacity as a capacitance model, thereby simplifying the simultaneous equations of the moment method.

The two-dimensional analysis is described below by referring to FIGS. 12A through 14.

The two-dimensional analysis is performed to obtain the electric current distribution on the surface of the conductor of a distributed constant line (transmission line).

FIG. 12A shows an example of a model of an analysis object shown in FIG. 6A. A method of obtaining the electric current distribution using this model is described below.

First, a model is represented as a dielectric portion $\epsilon 0$ replacing a dielectric portion $\epsilon r$ as shown in FIG. 12B instead of the model shown in FIG. 12A. Thus, a multiple-layer dielectric portion can be recognized as a material of even quality when the conductor surface and the inter-dielectric interface (indicated by thin lines in FIG. 12A) are replaced with a string of an equivalent bound charge on the section of the transmission line. A conductor refers to both a transmission line and ground according to the present embodiment.

Then, the voltage on the surface of the conductor is obtained in the model shown in FIG. 12B.

The conductor and inter-conductor interface shown in FIG. 12B are divided into small flat sections to assign a string of equivalent bound charges of pulse functions (unknown number) to each of the small sections.

That is, $$f i(p)=1; \text{(i-th small section)}$$

$$f i(p)=0; \text{(others)}$$

Figure 13A:
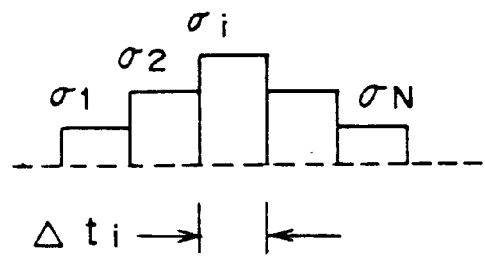
FIG. 13 shows the two-dimensional analysis method (2)

These values are assigned to the ground shown in FIG. 12B. As shown in FIG. 13A, $\Delta ti$ indicates the width of the i-th small section, and $\sigma i$ (i=1~N) indicates the total charge density of the i-th small section.

Thus, the electric current flows through the bottom of the ground. This is represented equivalently by a bound charge.

The voltage of the body of the conductor is represented by the following equation (14) using the above described equivalent bound charge.

$$V(\rho) = \frac{1}{2\pi\varepsilon_o}\int_t \sigma_T(\rho')\ln\frac{K}{|\rho-\rho'|}dt \tag{14}$$

where $\rho$ indicates a vector;

t indicates the inter dielectric portion interface (shown in FIG. 12B).

$\sigma_T(\rho')$ indicates the sum of the boundary bound charge and free bound charge at the boundary between the conductor and dielectric portion (total charge density).

K indicates a constant.

Figure 13B:
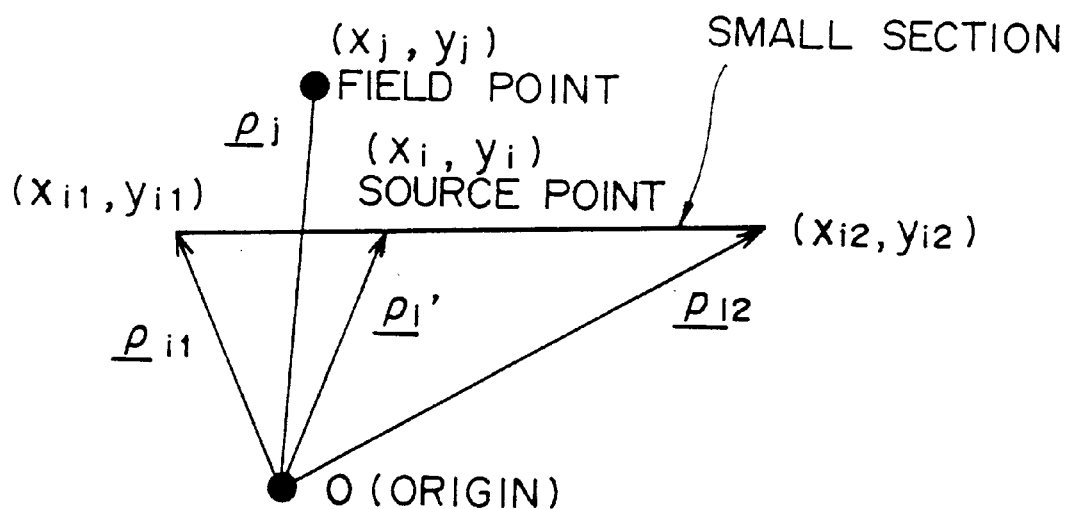

The vector $\rho$ in equation (14) is defined as shown in FIG. 13B.

In FIG. 13, $(x_{i1}, y_{i1})$ and $(x_{i2}, y_{i2})$ are coordinates at both ends of a small section. The vector from the origin 0 to each of the coordinates is represented as vector $\rho_{i1}$ and $\rho_{i2}$ respectively. The source point $(x_i, y_i)$ is a point in the small section evenly provided with equivalent bound charge. The field point $(x_j, y_j)$ is an electric or magnetic field observation point when the electric charge is applied to the source point. It is represented by vector $\rho_j$. Using the pulse function, the total charge density $\sigma_T$ is expressed by the following equation (15).

$$\sigma_T = \sum \frac{q_i}{\Delta t_i}f_i(\rho) = \sum \sigma_{Ti}f_i(\rho) \tag{15}$$

where $\rho_{Ti}$ and $q_i$ respectively indicate the total charge density and total charge of the i-th small section.

Using the above listed equations (14) and (15), the voltage Vj of the i-th small section on the ground or the transmission line is represented as follows.

$$V_j = V(\rho_j) = \sum_{i=1}^{N} \frac{\sigma_{Ti}}{2\pi\varepsilon_0} \int_{ti} \ln \frac{K}{|\rho_j - \rho_i|} dt_i, \quad j = 1, 2, \ldots N_s \quad (16)$$

$$V_j = Z_{j1}\sigma_{T1} + Z_{j2}\sigma_{T2} \ldots + Z_{ji}\sigma_{Tj} \ldots + Z_{jNs}\sigma_{TNs}$$

where N=Ns+Nd indicates a total number of small sections;

Ns indicates a total number of small sections on the conductor surface; and

Nd indicates a total number of small sections of the inter-dielectric-portion interface.

$$Z_{ji} = \frac{1}{2\pi\varepsilon_0} \int_{ti} \ln \frac{K}{|\rho_j - \rho_i|} dt_i$$

Described below is the method of obtaining the electric field of the inter-dielectric-portion interface.

Figure 14:
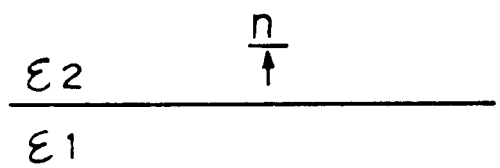
FIG. 14 shows the two-dimensional analysis method (3)

First, the dielectric portions $\varepsilon 1$ and $\varepsilon 2$ of the inter-dielectric-portion interface and the vector n are defined as shown in FIG. 14. The bound charge of the interface is expressed by equation (17).

$$\sigma_b = \frac{\varepsilon_{r1} - \varepsilon_{r2}}{\varepsilon_{r1}} \varepsilon_0 E_2 \cdot \underline{n} \quad (17)$$

With the bound charge distribution, the electric field of the interface of the dielectric portion is represented by the following equation.

$$E_j \cdot \underline{n} = E(\rho_j) \cdot \underline{n} = \sum_{\substack{i=1 \\ i \neq j}}^{N} \frac{\sigma_{Ti}}{2\pi\varepsilon_0} \int_{ti} \frac{\rho_j - \rho_i}{|\rho_j - \rho_i|^2} \cdot \underline{n} \, dt_i + \frac{\sigma_{Ti}}{2\varepsilon_0} \quad (18)$$

Since the bound charge is equal to $\sigma_{Tj}$, the following equation is obtained from equations (17) and (18).

$$\frac{\varepsilon_{r1} + \varepsilon_{r2}}{2\varepsilon_0} \sigma_{Tj} - (\varepsilon_{r1} - \varepsilon_{r2}) \sum_{\substack{i=1 \\ i \neq j}}^{N} \frac{\sigma_{Ti}}{2\pi\varepsilon_0} \int_{ti} \frac{\rho_j - \rho_i}{|\rho_j - \rho_i|^2} \cdot \underline{n} \, dt_i = 0$$

$$j = N_S + 1, \ldots, N$$

This equation can be developed as follows.

$$Z_{j1\sigma T1} + Z_{j2\sigma T2} \ldots + Z_{jj\sigma Tj} + Z_{jN\sigma TN} = 0, \, j = N_S + 1, \ldots, N \quad (19)$$

where $$Z_{jj} = \frac{\varepsilon_{r1} + \varepsilon_{r2}}{2\varepsilon_0}, \quad Z_{ji} = \frac{-\varepsilon_{r1} + \varepsilon_{r2}}{2\pi\varepsilon_0} \int_{ti} \frac{\rho_j - \rho_i}{|\rho_j - \rho_i|^2} \cdot \underline{n} \, dt_i$$

By equations (16) and (19), the following equation can be obtained to calculate the total charge density.

$$\begin{bmatrix} Z_{11} & \cdots & Z_{1N} \\ Z_{21} & \cdots & Z_{2N} \\ \vdots & & \vdots \\ Z_{N1} & \cdots & Z_{NN} \end{bmatrix} \begin{bmatrix} \sigma_{T1} \\ \sigma_{T2} \\ \vdots \\ \sigma_{TN} \end{bmatrix} = \begin{bmatrix} V_1 \\ V_2 \\ \vdots \\ V_{NS} \\ 0 \\ 0 \\ 0 \end{bmatrix} \begin{matrix} \} \text{—Ns voltages of a small section of the conductor} \\ \\ \} \text{—Nd Boundary condition of the dielectric portion} \end{matrix} \quad (20)$$

The bound charge actually represented on the surface of the conductor of a transmission line is a free charge $\sigma_{fj}$, and the free charge is calculated by the following equation using the total charge density obtained by equation (20).

$$\sigma_{fj} = \frac{\varepsilon_{r1} + \varepsilon_{r2}}{2} \sigma_{Tj} + \quad (21)$$

$$(\varepsilon_{r2} - \varepsilon_{r1}) \sum_{\substack{i=1 \\ i \neq j}}^{N} \frac{\sigma_{Ti}}{2\pi} \int_{ti} \frac{\rho_j - \rho_i}{|\rho_j - \rho_i|^2} \cdot \underline{n} \, dt_i \quad j = 1, \ldots, N_s$$

The free charge is proportional to the electric current flowing through the transmission line. Therefore, a precise calculation can be realized in the moment method using the free charge distribution obtained by equation (21).

The following references are useful in relation to the two-dimensional analysis.

J. VENKATARAMAN, S. M. RAO, A. R. DJORDJEVIC, T. K. SARKAR, Y. HAIHENG, "ANALYSIS OF ARBITRARILY ORIENTED MICROSTRIP TRANSMISSION LINES IN ARBITRARILY SHAPED DIELECTRIC MEDIA OVER A FINITE GROUND PLANE," IEEE TRANSACTION ON MICROWAVE THEORY AND TECHNIQUES, VOL. MTT-33, NO. 10, PP. 952–958, OCTOBER 1985

As described above, the precision of the electric wave radiation characteristics can be further improved by exactly representing the ground electric current distribution in computing the electromagnetic field intensity through the distributed constant line approximation and moment method according to the first embodiment of the present invention.

The embodiment of the present invention is described below by referring to FIGS. 15 through 23.

First, FIG. 15 is a block diagram showing the configuration of the electromagnetic field intensity computing apparatus 200.

The electromagnetic field intensity computing apparatus 200 shown in FIG. 15 comprises a data input unit 210, an analysis object dividing unit 211, and an electromagnetic field intensity computing unit 213.

Furthermore, the analysis object dividing unit 211 comprises the patch number assigning unit 212, and the electromagnetic field intensity computing unit 213 comprises an inter-patch regularity detecting unit 214, a mutual impedance computing unit 215, a computation result transfer unit 216, an electric current computing unit 217, and an electromagnetic field computing unit 218.

The data input unit 210 inputs the structure information about the electric circuit device to be analyzed.

The analysis object dividing unit 211 divides an electromagnetic field intensity analysis object into small elements referred to as patches.

The patch number assigning unit 212 assigns patch numbers in ascending order to the patches belonging to at least one plate in analysis objects when analysis object plates are divided into patches. A second patch number assigning unit can be provided for the inter-patch regularity detecting unit 214 in the electromagnetic field intensity computing unit 213 to reassign once-assigned patch numbers in ascending order.

The electromagnetic field intensity computing unit 213 computes the electromagnetic field intensity according to the moment method.

The inter-patch regularity detecting unit 214 detects the regularity among the patches according to the patch numbers assigned by the patch number assigning unit 212.

The mutual impedance computing unit 215 extracts a set of patches whose relative positions are unique among the patches according to the regularity of the patches detected by the inter-patch regularity detecting unit 214, and computes the mutual impedance only among the set of the patches. The mutual impedance computing unit 215 further comprises a unit for determining an independent plate, two plates at a superposed position, or two adjacent plates, extracting a set of patches whose relative positions are unique in the independent plate, two plates at the superposed position, or two adjacent plates according to the patch numbers after the determination, and computing the mutual impedance only among the set of the patches whose detected relative positions are unique.

The computation result transfer unit 216 transfers the computation result of the mutual impedance obtained by the mutual impedance computing unit 215 to the mutual impedance storage area for the patches at the same relative positions and sets simultaneous equations of the moment method.

The electric current computing unit 217 solves the simultaneous equations of the moment method set by the computation result transfer unit 216 and computes the electric current flowing through each element.

The electromagnetic field computing unit 218 computes the electromagnetic field intensity according to the electric current value computed by the electric current computing unit 217.

The patch number assigning unit 212 can be designed to add a dummy patch to a plate partly lacking regularity and to assign a patch number in ascending order as a plate having apparent regularity. The computation result transfer unit 216 can be designed to transfer the computation result of the mutual impedance corresponding to the portion, excluding the dummy patch portion, and not to transfer the computation result of the mutual impedance corresponding to the dummy patch portion.

In most cases, the grounding layer of a multi-layer printed plate, the top plate, bottom plate, side plate, etc., of a personal computer housing, etc., of the electric circuit device to be analyzed can be modelled as a regular array of rectangular patches. Therefore, if the regularity of given structure data is automatically extracted and a portion of the computation results can be transferred to other portions, then the amount of computation can be considerably reduced. The larger the plate is, the more the amount of computation can be reduced.

When a housing is modelled, considering computation time, it is not practical to exactly model the details of the structure. Dividing a housing into smaller patches after converting them into regular shapes of patches as long as the characteristics of the housing are not lost obtains a higher-precision result within a shorter computation time.

From the above described viewpoint, the electromagnetic field intensity computing apparatus according to the second embodiment reduces the amount of computation by actively providing the regularity for the three-dimensional structure of a device to be analyzed. To attain this, when the patch number assigning unit 212 divides a plate into patches, it assigns patch numbers to the patches belonging to each plate in ascending order. Thus, the structure data can be generated with regularity. The inter-patch regularity detecting unit 214 recognizes the regularity, and the mutual impedance computing unit 215 computes the immittance value only for a set of a number of patches whose relative positions are unique, changes the order and symbol of the value if required, and transfers it to others.

Figure 16A:
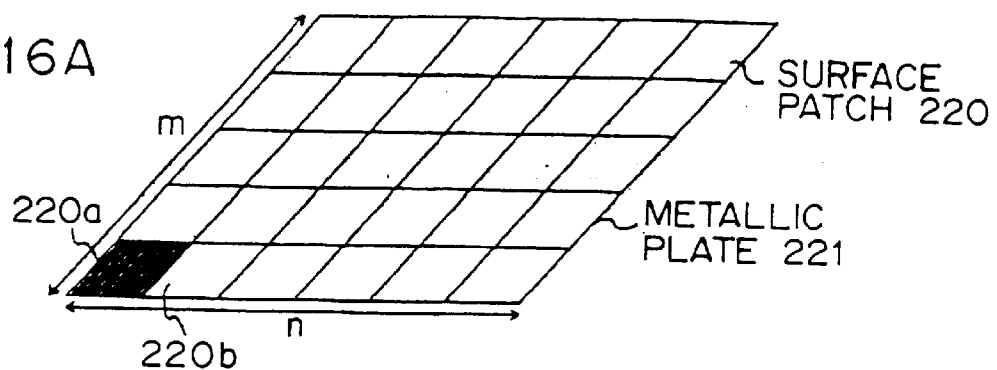
FIGS. 16A through 16D show the reduction of the amount of computation according to the second embodiment.
Figure 16B:
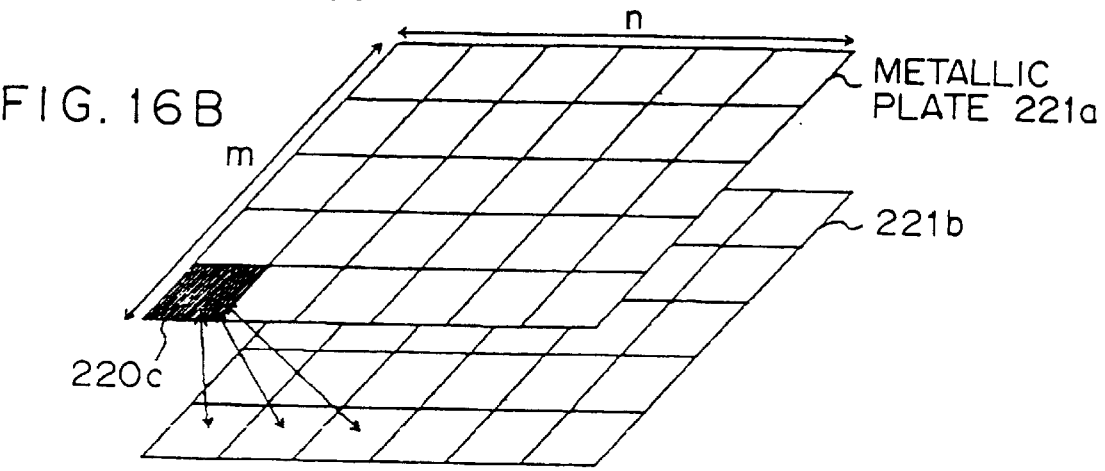

FIGS. 16A through 16B show the reduction of the amount of computation according to the second embodiment.

According to the second embodiment, the immittance value of only a set of patches whose relative positions are unique among an independent plate, two plates at a superposed position, or two adjacent plates is computed and transferred to others.

FIG. 16A shows an example of the case where the mutual impedance of all patches is obtained for one plate. Assuming that a metallic plate 221 is divided into surface patches 220 of "m rows×n columns", the number of 2-patch sets of all patches is computed as follows.

$$(m \times n) \times (m \times n) = m^2 n^2$$

According to the second embodiment, the mutual impedance is computed, by detecting the regularity, only for the sets of the patches whose relative positions are unique, not for all of the above described sets. For example, if the mutual impedance between the surface patch 220a and the m×n patches (including the patch) is computed, the result can be used as the mutual impedance among the patches having the same relative positions. For example, the mutual impedance between the surface patch 220b and other patches (including the patch, that is, including the self-impedance) can be obtained by changing, if necessary, the order and symbol of the value of the mutual impedance between the surface patch 220a and other patches. Therefore, the amount of computation is m×n, and it is reduced to one mn-th (=mn/m²n²). If the surface patch 220 is square, then the amount of computation is further reduced by half, thereby reducing it to one 2 mn-th of the original amount.

FIG. 16B shows an example of obtaining the mutual impedance among all patches of two plates at a superposed position. "To superpose" refers to contact between two metallic plates or separation in space. Assume that the metallic plates 221a and 221b are divided into surface patches of m rows×n columns. The number of sets of all patches between one patch in the metallic plate 221a and one patch in the metallic plate 221b is obtained by the following equation.

$$(m \times n) \times (m \times n) = m^2 n^2$$

When the mutual impedance is computed between the surface patch 220c in the metallic plate 221a and each patch in the metallic plate 221b, the result can be applied to the mutual impedance between another patch in the metallic plate 221a and a patch in the metallic plate 221b having the same relative position.

Therefore, the amount of computation is reduced to m×n, that is, one mn-th (=mn/m²n²). If the surface patch 220 is square, then the amount of computation is further reduced by half, thereby reducing it to one 2 mn-th of the original amount.

Figure 16C:
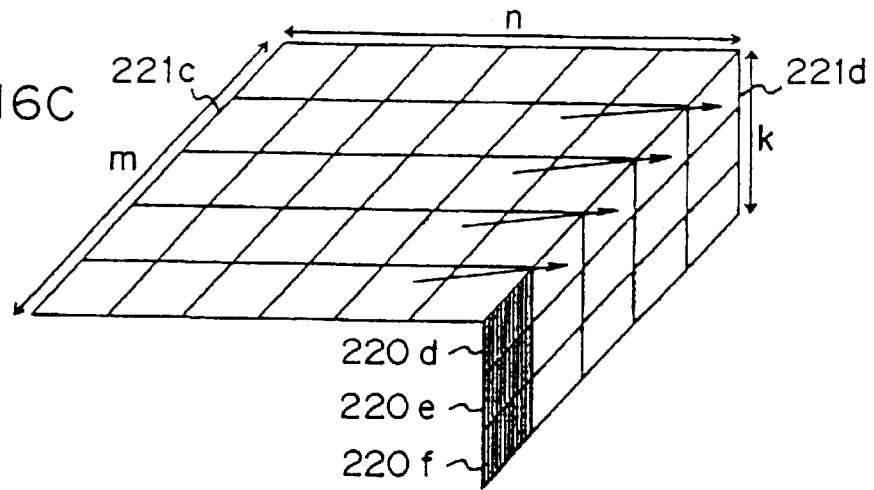
Figure 16D:
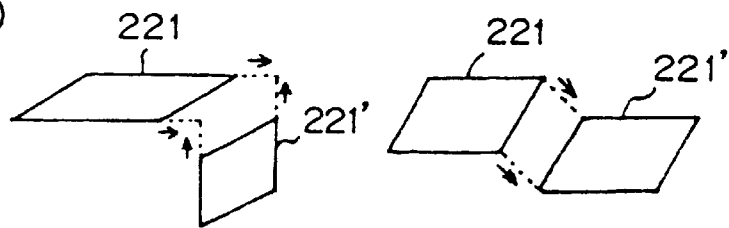

FIG. 16C shows an example of obtaining the mutual impedance among all patches between two adjacent plates. The "adjacency" includes not only the direct connection between the sides of two metallic plates but also the connection by moving in an appropriate method as with the metallic plates 221 and 221' shown in FIG. 16C.

The metallic plate 221c shown in FIG. 16C is divided into surface patches of m rows×n columns. The adjacent metallic plate 221d is divided into the surface patches of m rows×k columns. The number of sets of all patches between one patch in the metallic plate 221c and one patch in the metallic plate 221d is obtained by the following equation.

$$(m \times n) \times (m \times k) = m^2 nk$$

When the mutual impedance is computed between each of the surface patches 220d, 220e, and 220f in the metallic plate 221d and each patch in the metallic plate 221c, a set of one patch in the metallic plate 221c and one patch in the metallic plate 221d necessarily indicate equal relative positions. Therefore, the mutual impedance computed for the surface patches 220d through 220f can be applied, and the amount of computation can be reduced from $m^2 nk$ to mnk. The amount of computation is one m-th ($mnk/m^2 nk$) of the original amount.

As an example of equal relative positions, the four combinations indicated by the right-pointing arrows shown in FIG. 16C are equal in relative position. The mutual impedance should be computed for only one of the four combinations.

Figure 17A:
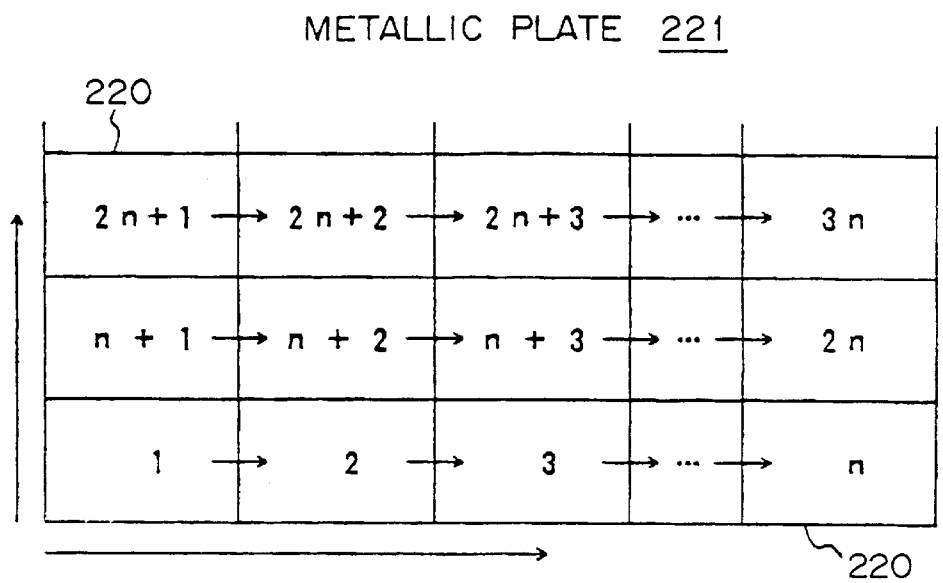
FIGS. 17A and 17B show the method of assigning patch numbers by a patch number assigning unit 212 shown in FIG. 15.
Figure 17B:
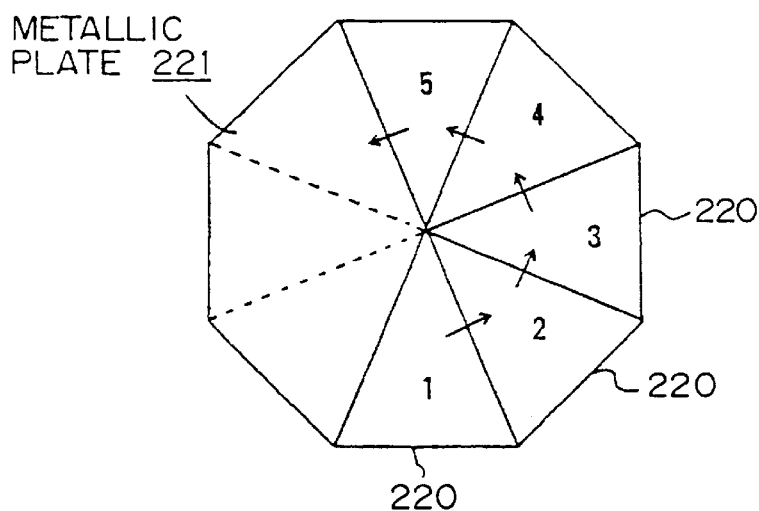

FIGS. 17A and 17B show the patch number assigning method by the patch number assigning unit 212 shown in FIG. 15.

When the metallic plate 221 is divided into the rectangular or square surface patches 220, the patch numbers are assigned in series in ascending order as shown in FIG. 17A to provide regularity for the structure data according to the second embodiment. That is, the patch numbers are assigned in ascending order from the leftmost patch of the metallic plate 221 toward the right. When the rightmost patch is assigned its number, then the patch numbers are likewise assigned in order from the patch right above the above described leftmost patch.

When the surface patch 220 is triangular, the structure data is provided with regularity by serially assigning the patch numbers to the data in ascending order as shown in FIG. 17B.

Figure 18:
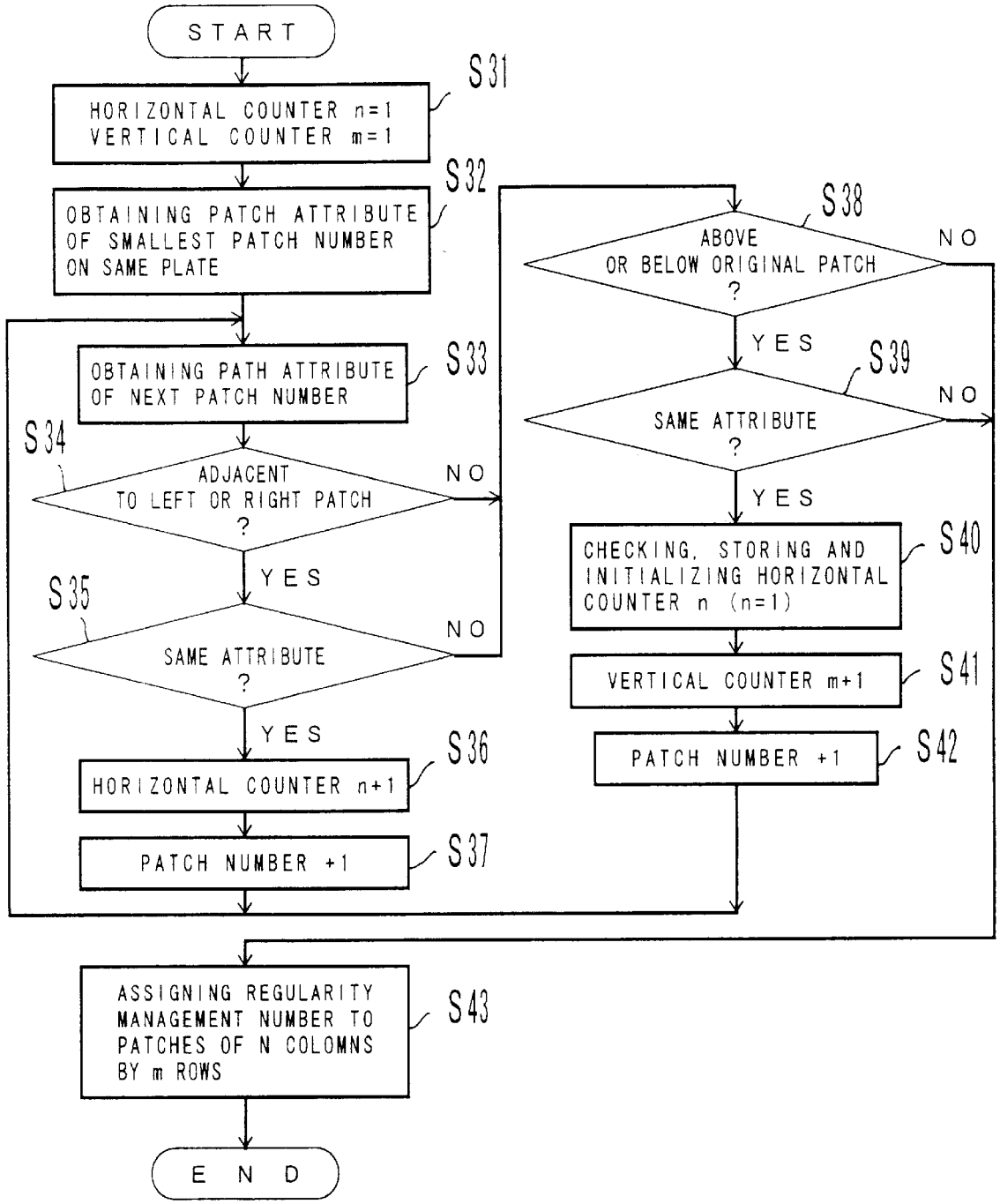
FIG. 18 is a flowchart showing the regularity detecting process according to the second embodiment.

FIG. 18 is a flowchart showing the regularity detecting process according to the second embodiment. The FIGS. 19A through 19D show the regularity detection corresponding to the flowchart shown in FIG. 18.

The process of detecting the regularity of the structure data to be analyzed as shown in FIG. 18 is performed by the inter-patch regularity detecting unit 214 shown in FIG. 15. The regularity detecting process can be performed when the analysis object is divided by the analysis object dividing unit 211.

The regularity detecting process is described below by referring to FIGS. 18, and 19A through 19D.

In step S31 shown in FIG. 18, each of the horizontal counter n and vertical counter m for extracting the regularity by sequentially scanning the vertical and horizontal adjacent patches is initialized to 1. The horizontal counter n and vertical counter m are not shown in the attached drawings.

Then, the patch attribute of the patch assigned the smallest patch number in the same plate is obtained (step S32). In the following descriptions, the thus assigned patch number is referred to as the number of the "current patch". The above described patch attribute is patch information, for example, a patch shape, material, etc., relating to what has an influence on the electromagnetic field intensity. In the example shown in FIG. 19B, the patch attribute of the patch 220-1 assigned the patch number 1 is read.

The patch attribute of the patch assigned the next patch number (for example, 2) (step S33). In the following descriptions, the patch is referred to as the "next patch".

Then, it is determined whether or not the current patch is horizontally adjacent to the next patch. (step S34). If it is not (no in step S34), control is passed to step S38. If it is (yes in step S34), then it is determined whether or not the current patch has the same patch attribute as the next patch (step S35). That is, it is determined whether or not they have the same attribute, for example, the same shape, material, etc. If they do not (no in step S35), then control is passed to step S38.

If they have the same patch attribute (yes in step S35), then 1 is added to the horizontal counter n (step S36). Then, adding 1 to the current patch number (adding 1 to 1 in the present example) (step S37) returns control to the process in step S33 with the next patch set as the current patch. Then, the above described processes are repeated.

Figure 19A:
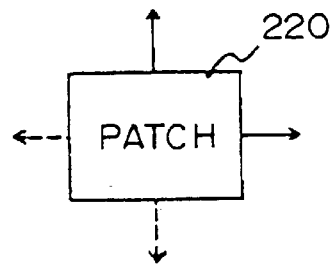
FIGS. 19A through 19D show the detection of regularity by referring to the flowchart shown in FIG. 18.
Figure 19B:
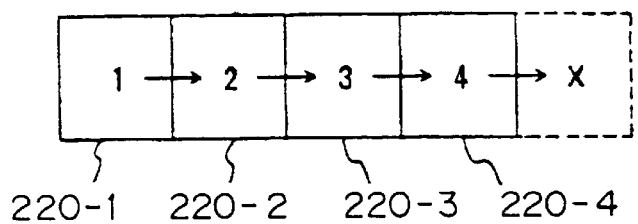

Thus, the patches 220-1 through 220-4 are sequentially checked in order of patch numbers as shown in FIG. 19B. Since the patch assigned the number 220-4 has no adjacent patch (the next patch is not adjacent to the current patch), control is passed from step S34 to step S38. If the same attribute is not detected, control is passed from step S35 to step S38.

In the process in step S38, it is determined whether or not the next patch is vertically adjacent to the leftmost patch of the current patch.

If it is not (no in step S38), then control is passed to step S43.

If it is (yes in step S38), it is determined whether or not they have the same attribute (step S39).

If they do not (no in step S39), then control is passed to step S43.

If they do (yes in step S39), then it is checked whether or not the value of the horizontal counter n is accepted, and the value is stored (step S40). Then the value is initialized again to n=1. For example, when the value n stored in the previous horizontal scanning is smaller than the value n obtained in the current scanning, the smaller value n is stored to recognize the regular area as a rectangle, thereby simplifying the management.

Figure 19C:
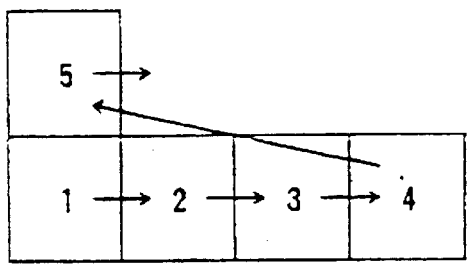

Next, 1 is added to the vertical counter m (step S41) and to the current patch number to set the next patch as the current patch (step S42). Then, control is returned to the process in step S33, and the processes similar to the above described processes are repeated. Thus, the next row is scanned as shown in FIG. 19C.

Figure 19D:
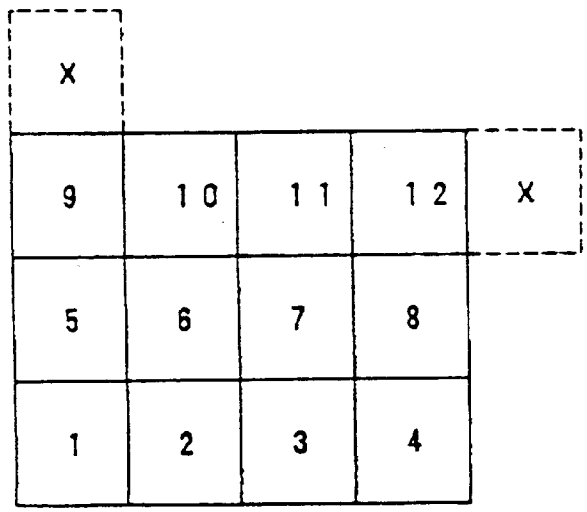

If the patch next to the patch assigned the number 12 is not adjacent to the patch 12 or 9 as shown in FIG. 19D, or does not have the same attribute as the patches, the process in step S43 is performed. That is, it is recognized that regular patches exist in the range of m rows by n columns and the regularity management numbers are assigned to the patches. A regularity number comprises a structure identification number uniquely assigned to a regular portion and an internal identification number uniquely assigned to each of the patches. In the example shown in FIG. 19D, a patch having the regularity of 3 rows by 4 columns is detected.

If the patch numbers are left on the same plate, the processes shown in FIG. 18 are repeated for the next patch. That is, the similar processes are performed from the patch 13 in ascending order in the example shown in FIG. 19D.

Figure 20A:
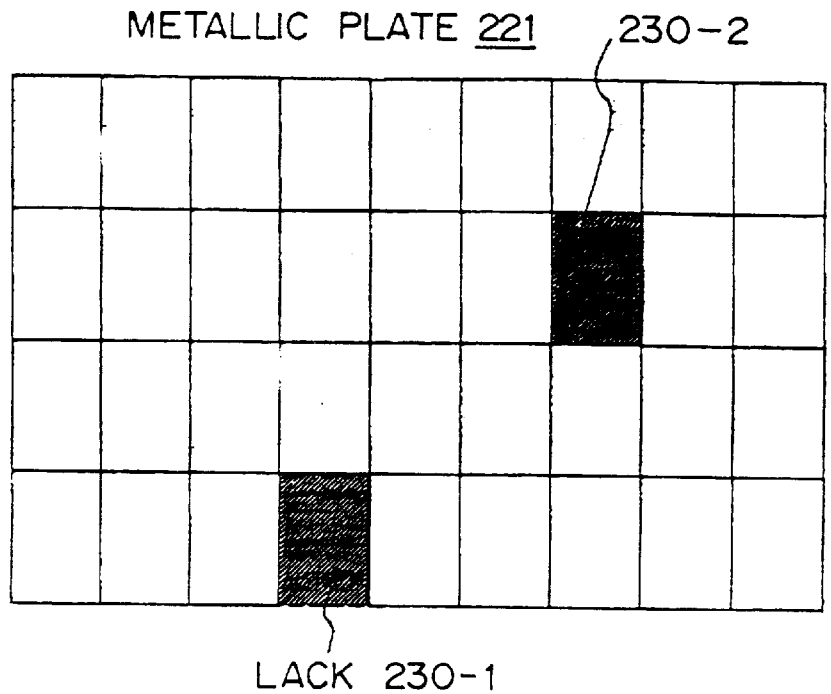
FIGS. 20A and 20B show the patch number assigning process using a dummy patch as a variation according to the second embodiment.
Figure 20B:
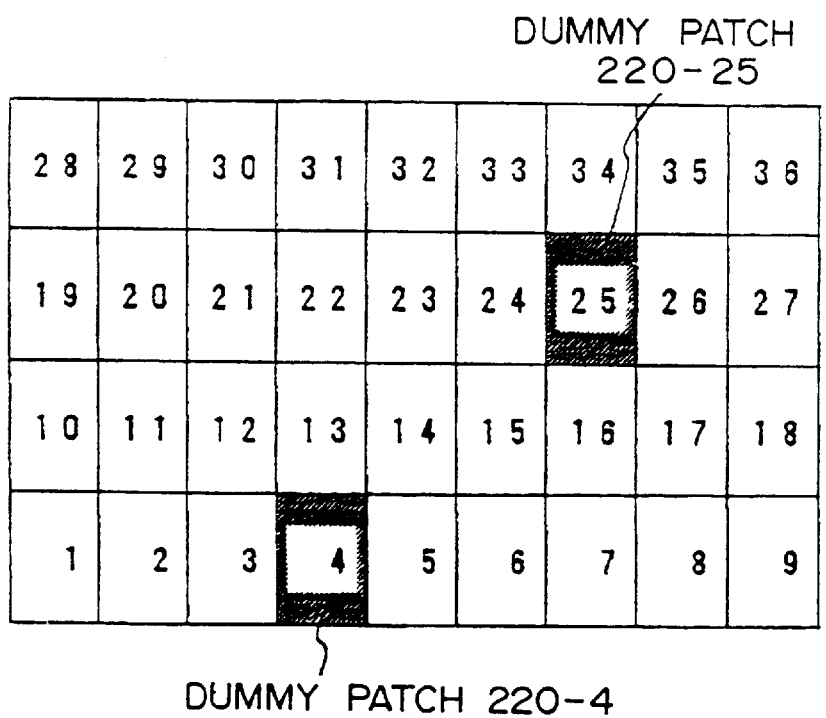

FIGS. 20A and 20B show the patch number assigning process using a dummy patch as a variation of the second embodiment.

The example shown in FIG. 20A indicates the case where lack portions 230-1 and 230-2 exist in the metallic plate 221 to be analyzed. In this case, the regular area as shown in FIGS. 19A through 19D is divided into smaller portions, thereby diminishing the effect of reducing the amount of computation.

According to the present example, the lack portions 230-1 and 230-2 shown in FIG. 20A are also provided with the patch numbers similar to those of normal patches in ascending order as dummy patches 220-4 and 220-25 as shown in FIG. 20B to treat the patches as if there were no lack portions 230-1 and 230-2.

This is attained by transferring the computation result by the computation result transfer unit 216 for the portions, excluding the dummy patches 220-4 and 220-25, after the mutual impedance computing unit 215 computes the mutual impedance among the patches whose relative positions are unique.

Thus, the amount of computation can be successfully reduced even if there is a lack portion on the metallic plate to be analyzed.

Figures 21A, 21B:
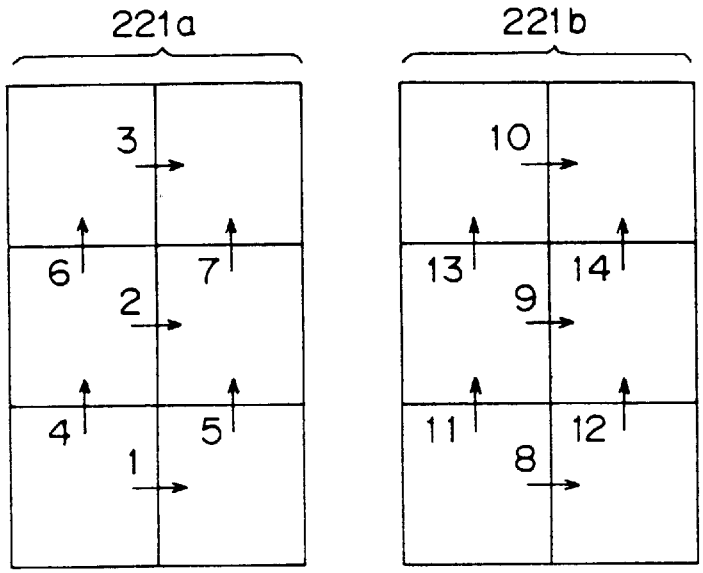
FIGS. 21A and 21B show the computing and transferring processes for the mutual impedance according to the second embodiment.

FIGS. 21A and 21B show the mutual impedance computation and transfer processes according to the second embodiment.

FIGS. 21A and 21B illustrate an example of computing the mutual impedance among the patches on the two plates at a superposed position. The mutual impedance is likewise computed among the patches on the adjacent two plates.

Assume the mutual impedance among the dipoles assigned patch numbers 1 through 14 as shown in FIG. 21A on the two metallic plate 221a and 221b shown in FIG. 21A.

In this example, the mutual impedance between the dipole i and dipole j (i and j indicate optional patch numbers) are represented by $Z_{i,j}$.

When the mutual impedance $Z_{i,j}$ is computed for the metallic plate 221a, the computation result can be transferred to the mutual impedance at the same relative position (in this example, mutual impedance $Z_{2,2}$ and $Z_{3,3}$).

When the mutual impedance $Z_{4,4}$ is computed, the computation result can be transferred to the mutual impedance ($Z_{5,5}$, $Z_{6,6}$, and $Z_{7,7}$) at the same relative position.

Similar processes are performed on the two metallic plates 221a and 221b.

That is, the result of the computation of the mutual impedance $Z_{1,8}$ between the dipoles 1 and 8 between the two metallic plates 221a and 221b can be transferred and applied to the mutual impedances $Z_{2,9}$ and $Z_{3,10}$ for the same relative positions.

Likewise, the mutual impedance $Z_{1,11}$ between the dipoles 1 and 11 can also be used as the mutual impedance $Z_{2,13}$ between the dipoles 2 and 13 at the same relative positions.

As described above, after the mutual impedance between the patches is computed and transferred by the patch number assigning unit 212, electromagnetic field intensity computing unit 213, inter-patch regularity detecting unit 214, mutual impedance computing unit 215, and computation result transfer unit 216 shown in FIG. 15, the electric current computing unit 217 generates simultaneous equations in the moment method as shown in FIG. 21B according to the above described mutual impedance and the wave sources $V_1$ through $V_{14}$ read as the input data from the data input unit 210, and then computes the unknown electric current $I_1$ through $I^{14}$ in each unit.

Then, the entire process performed by the electromagnetic field intensity computing apparatus 200 according to the second embodiment is explained below by referring to FIG. 22.

Figure 22:
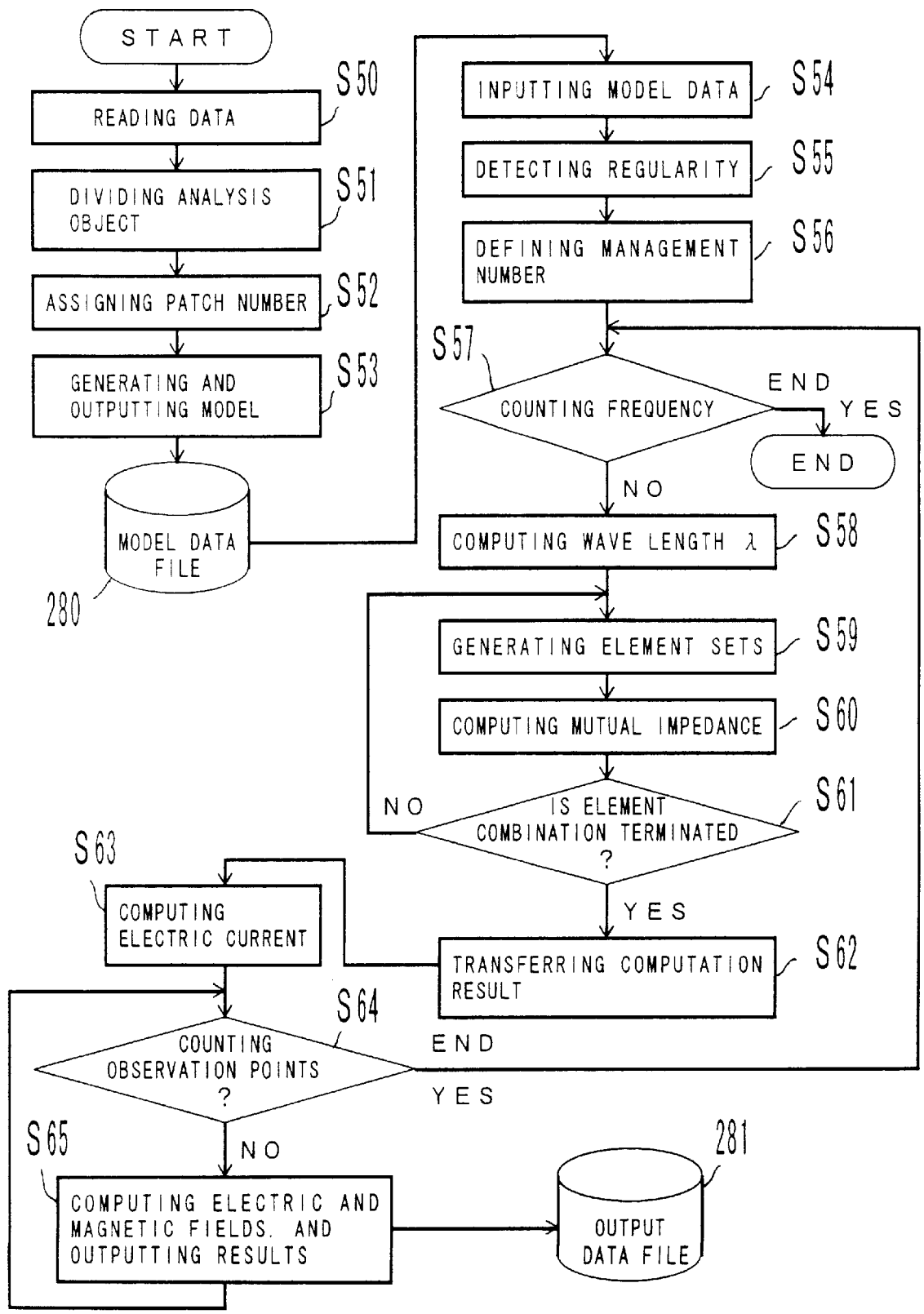
FIG. 22 is a flowchart showing the entire process performed by the electromagnetic field intensity computing apparatus 200.

FIG. 22 is a flowchart showing the entire process performed by the electromagnetic field intensity computing apparatus 200.

In FIG. 22, the data of the electric circuit device generated by the CAD, etc., to be analyzed is input (step S50). Then, an analysis object is modelled using wires and surface patches for a portion to which the moment method is applied (step S51). At this time, the surface patches are assigned patch numbers in series in ascending order (step S52). Furthermore, necessary model data is generated or converted to output the result to a model data file 280 (step S53).

Then, the model data is received from the model data file 280, and the metallic elements and other data (frequency, etc.) are set as a structure and array (step S54). Next, the regularity is detected as shown in FIG. 19 (step S55), and the regularity management number is defined for a structure having the detected regularity (step S56). At this time, a patch number and a point definition start position are redefined, if necessary, in consideration of the overlapping plates at a superposed position.

Then, the following processes are repeated for a predetermined frequency.

First, it is determined by counting the processed frequencies whether or not the processes for all entered frequencies have been completed (step S57).

If they have (yes in step S57), the process of computing the electromagnetic field intensity is completed. If there are any unprocessed frequencies (no in step S57), the frequency to be processed next is selected from unprocessed frequencies, and the following processes are performed on the selected frequency.

That is, the wave length λ of the elected frequency is computed (step S58).

Then, to sequentially compute the mutual impedance $Z_{ij}$, a set of element i (i=1~m) and element j (j=1~m) is generated from m metallic elements (step S59). Using the simultaneous equations in the moment method, the mutual impedance $Z_{ij}$ is computed (step S60).

In step S59, an independent plate, two plates at a superposed position, or two adjacent plates are determined, and a set of patches whose relative positions are unique is extracted after the determination, and the computation is performed in step S60 on only the set of the patches whose extracted relative positions are unique.

Then, it is determined whether or not the computation of the mutual impedance has been completed on all sets of elements whose relative positions are unique (step S61).

If they have not (no in step S61), the processes in steps S59 and S60 are repeated until the computation is completed.

If the computation has been completed for all sets (yes in step S61), the computation result in step S60 is transferred to the mutual impedance among the elements having the same relative positions (step S62). The computation result is not collectively transferred but can be transferred individually for each computation.

Then, the following simultaneous equation in the moment method is derived with the electric current Ii flowing through the metallic elements processed as an unknown number using the computed mutual impedance $Z_{ij}$ and the wave source Vi provided as input data. The electric current Ii flowing through the metallic element is obtained by solving the following simultaneous equation (step S63).

$$[Zij][Ii]=[Vi]$$

Then, it is determined by counting the processed observation points whether or not all entered observation points have been processed (step S64).

If they have not been processed yet, the electromagnetic field intensity provided by the computed electric current Ii at the observation point is computed by a predetermined equation (step S65). Then, the computation result is stored in an output data file 281, and control is returned to the process in step S64. The processes in steps S64 and S65 are repeated until the electric and magnetic field computation has been completed for all observation points.

Since the computation of the mutual impedance Z., in step S60, computation of the electric current in step S63, and electric and magnetic computation in step S65 are well-known, they are briefly described below.

The electric field E at any observation point can be obtained by the following equation according to the electric current distribution through the object.

$$E = -j\omega \overline{A} + \frac{1}{j\omega k^2} \overline{A}$$

where, $$\overline{A} = \frac{\mu}{4\pi} \int_s \overline{J_s} \frac{e^{-jkr}}{r} ds: \text{vector potential}$$

$$k = \frac{2\pi}{\lambda} = \frac{2\pi f}{c} (=\beta): \text{wave number}$$

$J_S$: electric current
S: area containing electric current distribution
r: distance between electric current distribution and observation points The following equation is used to likewise obtain the magnetic field H at any observation point using a vector potential.

$$H = \frac{1}{\mu} rot \overline{A}$$

For a simple explanation, the description above relates only to the case where the moment method is used for the analysis of the electromagnetic wave. However, the present invention is not limited to the case where the moment method is used for all portions of the electric circuit device, but is applicable to the case where the moment method is used for only a portion of the electric circuit device.

Described below is an example of the system to which the second embodiment is applied.

Figure 23:
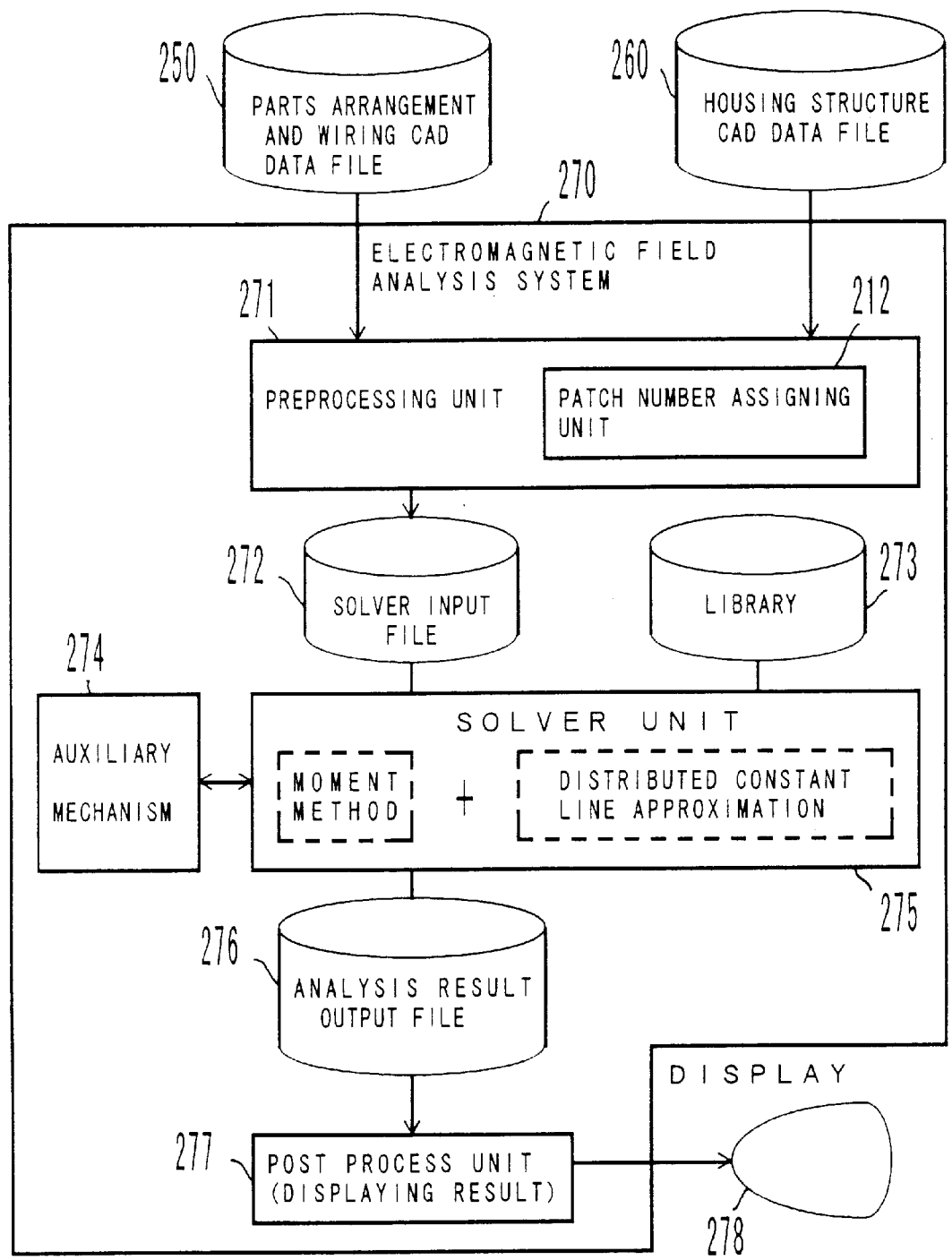
FIG. 23 shows an example of the configuration of the system to which the second embodiment is applied.

FIG. 23 shows an example of the system to which the second embodiment is applied.

In FIG. 23, a parts arrangement and wiring CAD data file 250 stores data such as the outline of a printed board generated by an electronic-system CAD system, parts driver/receiver pin information, wiring line, veer, etc.

A housing structure CAD data file 260 stores the housing structure data in the format of the NASTRAN that is a standard interface in the analysis field generated in the structure-system CAD system.

An electromagnetic field analysis system 270 comprises a preprocessing unit 271; solver input file 272; library 273; auxiliary mechanism 274; solver unit 275; analysis result output file 276; and post process unit 277.

The preprocessing unit 271 receives the data relating to the printed board from the parts arrangement and wiring CAD data file 250, converts the data into solver input data, and outputs the data to the solver input file 272. The structure data of a housing whose level should be analyzed is entered from the housing structure CAD data file 260, converted into solver input data, and output to the solver input file 272.

In converting the data into the solver input data, various cable routes are generated to the printed board or to the outside of the housing. The printed board wiring information and housing structure are changed. The preprocessing unit 271 has the function of specifying the printed board mounting position in the housing. The preprocessing unit 271 also comprises the patch number assigning unit 212 for assigning the above described patch numbers.

The solver unit 275 is a module for analyzing the electromagnetic field intensity through the moment method or distributed constant line approximation method for each type of analysis object according to the input data from the solver input file 272 and the library information about the parts used on the printed board received from the library 273. It outputs the analysis result to the analysis result output file 276. At the portion to which the moment method is applied, the amount of computation can be reduced according to the second embodiment.

The post process unit 277 receives the analysis result data from the analysis result output file 276, and displays the data on a display 278 in the specified format. For example, the data can be displayed on the display 278 in the following formats.

1. frequency vector view
2. radiation pattern view
3. electromagnetic field map
4. impedance spectrum view
5. electric current distribution view
6. electric current spectrum view
7. worst net pattern view The auxiliary mechanism 274 has the solver suspending and restarting function temporarily terminating the solver unit 275, confirming the intermediate result, and resuming the process. It further provides the state indicating function indicating to what extent the solver unit 275 has proceeded with its process.

The electromagnetic field analysis system 270 practically analyzes a printed board, cable, and housing to obtain useful information about the electromagnetic radiation and radiation mechanism, such as the coupling effect of the printed board and cable, shield effect from a metallic plate, electric current distribution on a plate surface, etc.

According to the second embodiment of the present invention as described above, the amount of computation is considerably reduced based on the regularity of given structure data when the electromagnetic field intensity of an electric circuit device is computed in the moment method. Therefore, the electromagnetic field intensity of the electric circuit device can be computed at a high speed.

Then, the electromagnetic field intensity computing apparatus 300 according to the third embodiment of the present invention is described by referring to FIGS. 24 through 31.

FIG. 24 is a block diagram showing the configuration of the electromagnetic field intensity computing apparatus 300 according to the third embodiment of the present invention.

In FIG. 24, the electromagnetic field intensity computing apparatus 300 comprises a CPU, memory, etc., and computes the electromagnetic field intensity of an electric circuit device to be analyzed in the moment method.

The electromagnetic field intensity computing apparatus 300 comprises a data input unit 310; computation method selecting unit 311; first mutual impedance computing unit 312; second mutual impedance computing unit 313; electric current computing unit 314; and electromagnetic field computing unit 315.

The data input unit 310 inputs the structure information about the electric circuit device to be analyzed.

When the electromagnetic field intensity of an electric circuit device to be analyzed is computed in the moment method, the computation method selecting unit 311 evaluates the electric length of the elements whose mutual impedance is computed, and the distance between the elements, and selects either the first mutual impedance computing unit 312 or second mutual impedance computing unit 313 for the computation of the mutual impedance. The electric length is based on the wave length ($\lambda$) of an electromagnetic wave.

The computation method selecting unit 311 selects the first mutual impedance computing unit 312 when the element length of a monopole is equal to or shorter than about 0.05 $\lambda$ ($\lambda$ indicates a wave length) and the distance is equal to or larger than 10 times the element length, and otherwise selects the second mutual impedance computing unit 313 to compute the mutual impedance.

When the mutual impedance used in the simultaneous equation in the moment method is computed, the first mutual impedance computing unit 312 computes the mutual impedance based on a predetermined approximation for the mutual impedance obtained according to the characteristics of the computation object for the mutual impedance where the electric length of elements is short and the elements are distant from each other.

When the mutual impedance to be computed does not meet the condition that the electric length of the elements is short and the elements are distant from each other, the second mutual impedance computing unit 313 does not use the above described approximation, but computes the mutual impedance by the normal equation.

Practically, in the computation expression for use in computing the mutual impedance between the monopoles in the moment method, the computation elements in exp $(-jkr)/r$ (where $j=(-1)^{1/2}$; k indicates the wave number; r indicates the distance between monopoles) are constant in the integral area of the monopoles. The mutual impedance is computed by the approximation obtained from the equation outside the integration.

More practically, assume that the mutual impedance between the first monopole and the second monopole is $Z_{00}$, the length of the first monopole is $d1=|z_1-z_0|$ (where the electric current distribution is 0 at $z_1$ and 1 at $z_0$), the length of the second monopole is $d2=|t_1-t_0|$ (where the electric current distribution is 0 at $t_1$ and 1 at $t_0$), r indicates the distance, k indicates a wave number, and $\psi$ indicates the angle between the first monopole and second monopole. On the condition that the monopole lengths d1 and d2 are sufficiently shorter than the wave length and the distance r is sufficiently longer than the lengths of the monopoles d1 and d2, the following equation is set.

$$Z_{00}=(\eta/4\pi \sin kd_1 \sin kd_2)\times(1/kr)\times[\sin (kr)[\cos \psi[1$$
$$-\cos k(z_0-z_1)][1-\cos k(t_0 t_1)]-\sin k(z_0-$$
$$z_1) \sin k (t_0-t_1)]+j \cos (kr)[\cos \psi[1-\cos k(z_0$$
$$-z_1)][1-\cos k(t_0-t_1]-\sin k(z_0-z_1) \sin k(t_0-t_1)]]$$

(where $\eta=(\mu_0/\epsilon_0)^{1/2}$, $\mu_0$: permeability in vacuum, $\epsilon_0$: dielectric constant in vacuum)

Using the approximation above, the mutual impedance is computed.

The electric current computing unit 314 computes the electric current flowing through each unit of the electric circuit device by solving the simultaneous equations in the moment method derived from the obtained mutual impedance.

The electromagnetic field computing unit 315 computes the electromagnetic field intensity of the electric circuit device from the calculation result of the electric current computing unit 314 and outputs the result.

When the elements (wires and surface patches) are very small with the length of the monopoles equal to or shorter than 0.001$\lambda$ ($\lambda$: wave length) and are distant from each other in computing the mutual impedance used in the moment method, digits are lost frequently in computing because the exponential function of exp $(-jkr)/r$ is contained in the integration of the monopole. This elongates the computation time.

The electromagnetic field intensity computing apparatus according to the third embodiment comprises the first computing unit 312 for computing data with exp $(-jkr)/r$ assumed to be constant in an integral area and the second computing unit 313 for performing other normal operations, and appropriately uses these two computing units depending on the application conditions relating to the element length and distance.

Therefore, a high-speed operation can be realized without deterioration in computation precision even in normal double-precision computation.

The approximation in which the exponential function in the above described exp $(-jkr)/r$ is assumed to be constant in the integral area is described below by referring to FIG. 25A.

FIGS. 25A–25D illustrates the process of computing the mutual impedance between monopoles.

A monopole refers to a half of a dipole. Adding the mutual impedances $Z_{00}$, $Z_{01}$, $Z_{10}$, and $Z_{11}$ obtained in FIGS. 25A through 25D provides the mutual impedance $Z_{mn}$ between the dipoles m and n by, for example, the equation shown in FIG. 28.

In FIG. 25A, 320-1 and 321-1 are monopoles, and 322-1 and 323-1 are the electric current distributions of the monopoles. The mutual impedance $Z_{00}$ is obtained between them. The symbols are defined as follows.

length of monopole 320-1: $d_1=|z_1-z_0|$ (where the electric current distribution is 0 at $z_1$ and 1 at $z_0$)

length of monopole 321-1: $d_2=|t_1-t_0|$ (where the electric current distribution is 0 at $t_1$ and 1 at $t_0$)

distance: $r=(z^2+t^2-2zt \cos\psi+h^2)^{1/2}$ (There is a plane containing the monopole 320-1 and a plane containing the monopole 321-1 and they are parallel to each other. "h" indicates the distance between the two planes.)

Figure 25A:
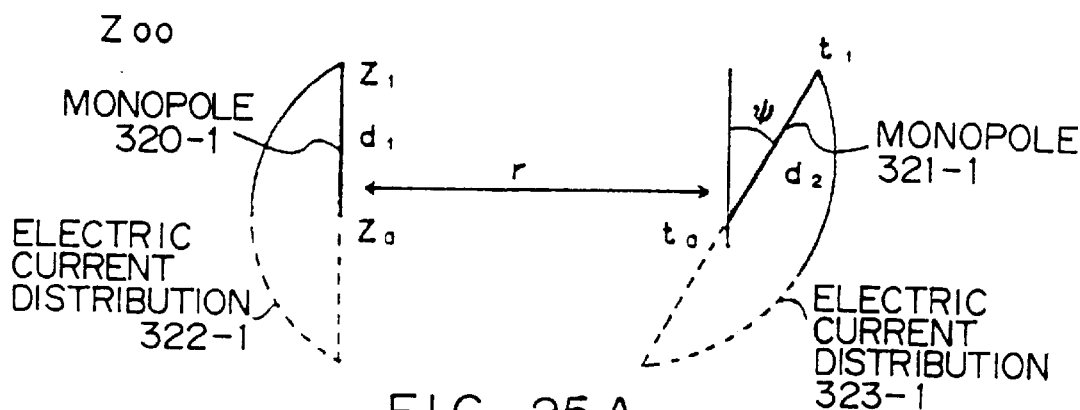
FIGS. 25A through 25D show the process of computing the mutual impedance between monopoles.

The exact equation of the impedance between the monopoles shown in FIG. 25A is as follows.

(1) Exact equation of the mutual impedance (normal equation)

$$Z_{00} = (j\omega\mu/4\pi \sin kd_1 \sin kd_2)$$

$$\times \left[ \int\int \sin k(-z+z_1)\sin k(-t+t_1)\cos\psi \right.$$

$$\times (\exp(-jkr)/r)dzdt - \int\int \cos k(-t+t_1)$$

$$\left. \times (\exp(-jkr)/r)dzdt \right]$$

where $\int\int$ indicates the integration from to to t, and from zo to $z_1$ (2) Conditions of approximation Assuming that (exp(-jkr)/r) in the integration is nearly constant, it can be put out of the integration.
 where k=2π/λ, k: wave number, λ: wave length The monopole length $d_1$ and $d_2$ is smaller enough than the wave length λ, and the distance r is larger enough than the monopole length $d_1$ and $d_2$. As compared with the variation of z from $z_0$ to $z_1$ and the variation of t from $t_0$ to $t_1$, the variation of (exp (-jkr)/r) is small, and can be almost constant outside the integration.

(3) Approximation of mutual impedance $$Z_{00} \approx (j\omega\mu/4\pi \sin kd_1 \sin kd_2) \times \exp(-jkr)/r \times \left[ \right.$$

$$\cos\psi \int\int \sin k(-z+z_1)\sin k(-t+t_1)dzdt -$$

$$\left. \int\int \cos k(-z+z_1)\cos k(-t+t_1)dzdt \right]$$

The integration can be simplified by the following integral equation.

$$\int\int \sin k(-z+z_1)\sin k(-t+t_1)dzdt =$$

$$\int_{z_0}^{z_1} \sin k(-z+z_1)dz \int_{t_0}^{t_1} \sin k(-t+t_1)dt =$$

$$|(1/k)\cos k(z-z_1)|_{z_0}^{z_1} \times |(1/k)\cos k(t-t_1)|_{t_0}^{t_1} =$$

$$(1/k^2)[1-\cos k(z_0-z_1)] \times [1-\cos k(t_0-t_1)]$$

$$\int\int \cos k(-z+z_1)\cos k(-t+t_1)dzdt =$$

$$\int_{z_0}^{z_1} \cos k(-z+z_1)dz \int_{t_0}^{t_1} \cos k(-t+t_1)dt =$$

$$|(1/k)\sin k(z-z_1)|_{z_0}^{z_1} \times |(1/k)\sin k(t-t_1)|_{t_0}^{t_1} =$$

$$(1/k^2)\sin k(z_0-z_1)\sin k(t_0-t_1)$$

Thus, the impedance $Z_{00}$ can be finally approximated as follows.

Figure 25B:
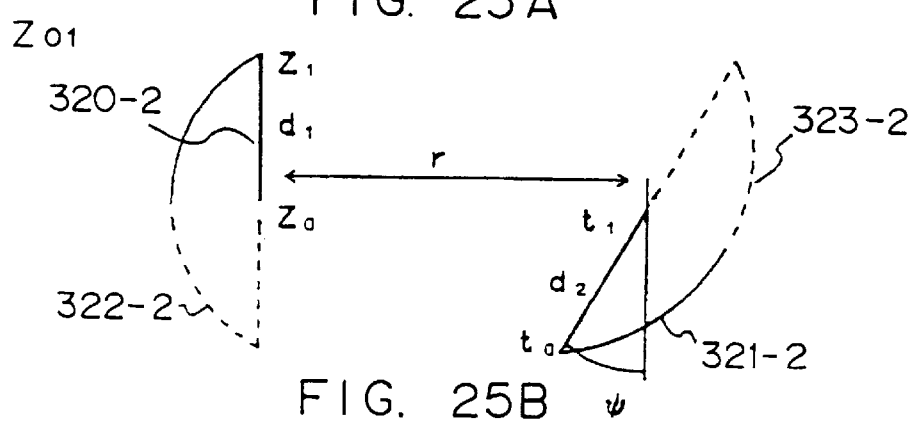
Figure 25C:
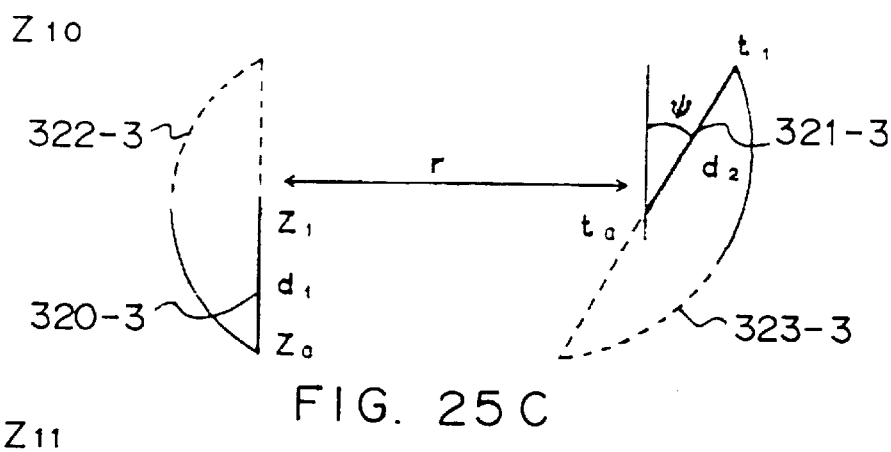
Figure 25D:
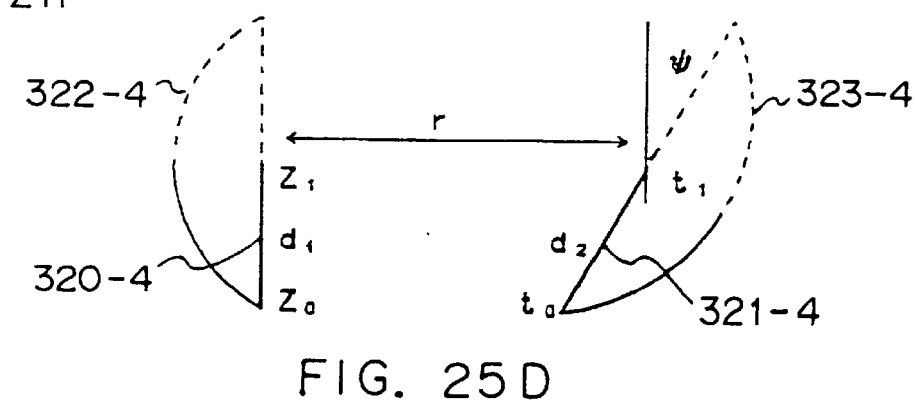

Likewise, $Z_{01}$, $Z_{10}$, and $Z_{11}$ shown in FIGS. 25B, 25C, and 25D are obtained.

As described above, the approximation of the $Z_{00} \approx (j\omega\mu/4\pi \sin kd_1 \sin kd_2) \times$ $(1/k^2) \times (\exp(-jkr)/r) \times [\cos \psi[1-\cos k(z_0-z_1)][1-\cos k(t_0-t_1)]-\sin k(z_0-z_1)\sin k(t_0-t_1)]$ $= (j\omega\mu/4\pi \sin kd_1 \sin kd_2) \times (1/k^2) \times (1/r) \times$ $[\cos(kr)[\cos \psi[1-\cos k(z_0-z_1)] \times [1-\cos(t_0 \times t_1)]-$ $\sin k(z_0-z_1)\sin k(t_0-t_1)]-j \sin (kr)[\cos \psi[1-\cos k(z_0-z_1)] \times$ $[1-\cos k(t_0-t_1)]-\sin k(z_0-z_1)\sin k(t_0-t_1)]]$ $=(\eta/4\pi\sin kd_1 \sin kd_2) \times (1/kr) \times [\sin(kr)[\cos \psi[1-\cos k(z_0-z_1)] \times$ $[1-\cos k(t_0-t_1)]-\sin k(z_0-z_1)\sin k(t_0-t_1)]+j \cos (kr)[\cos \psi[1-\cos k(z_0-z_1)]$ $[1-\cos k(t_0-t_1)]-\sin k(z_0-z_1)\sin k(t_0-t_1)]]$ impedance can be obtained on the condition that the elements are short and distant from each other. The approximation is very effective when the length of the element is equal to or shorter than 0.05 λ and the distance between the elements is equal to or 10 times as long as the length of the elements.

Therefore, the approximation is not limited to the case where digits are lost with the length of the elements being equal to or shorter than 0.001 λ, but can be used in processing elements other than very small ones, thereby performing computation at a high speed.

The electric current computing unit 314 derives the simultaneous equations in the moment method from the thus obtained mutual impedance to compute the electric current flowing through the electric circuit device. The electromagnetic field computing unit 315 computes the electromagnetic field intensity of the electric circuit device using the computation result, and outputs the computed electromagnetic field intensity represented in, for example, a chart.

The operations of the electromagnetic field intensity computing apparatus 300 according to the third embodiment are described below by referring to FIGS. 26 and 27.

Figure 26:
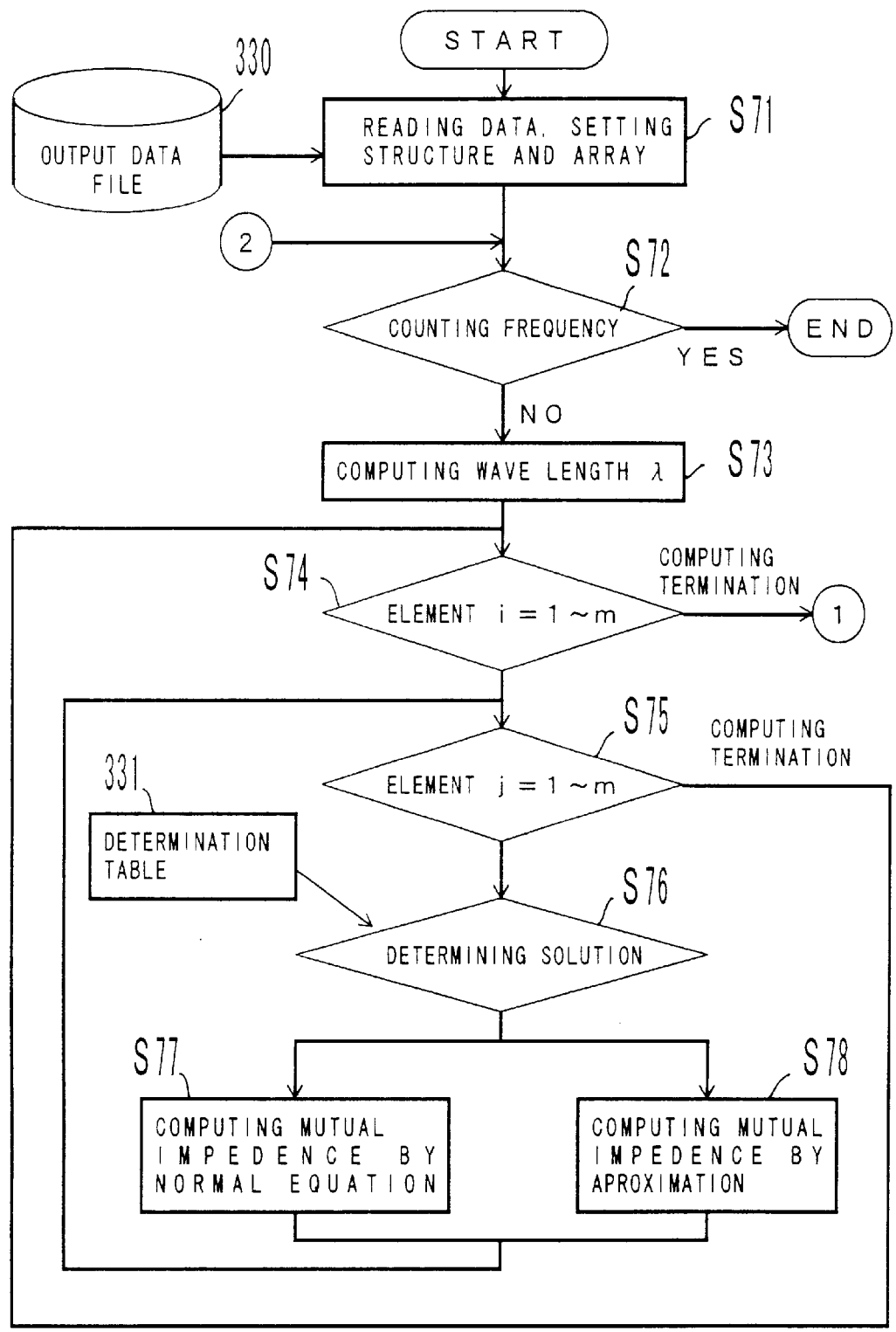
FIG. 26 is a flowchart (1) showing the process performed by an electromagnetic field intensity computing apparatus 300.
Figure 27:
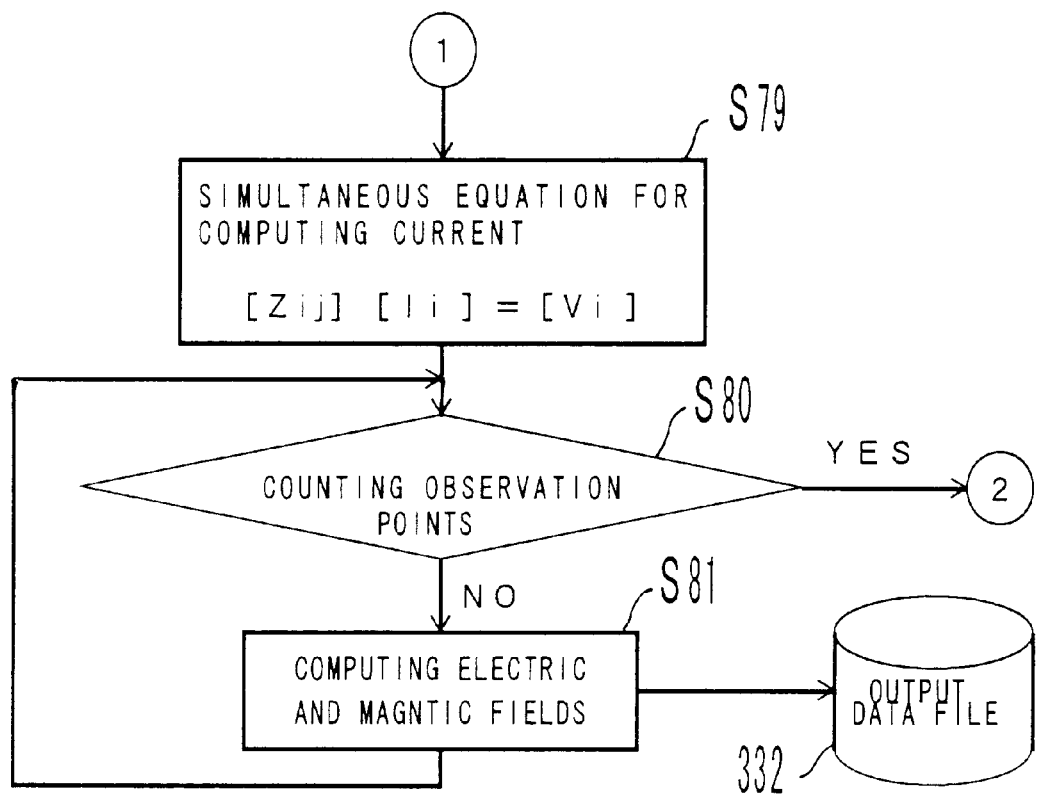
FIG. 27 is a flowchart (2) showing the process performed by an electromagnetic field intensity computing apparatus 300.

FIGS. 26 and 27 are flowcharts (1) and (2) showing the processes performed by the electromagnetic field intensity computing apparatus 300.

In FIG. 26, an input data file 330 is a storage device for managing and storing the structure information about the electric circuit device to be analyzed in a mesh form.

A determination table 331 is used when determination data for use in selecting a mutual impedance computing method.

An output data file 332 shown in FIG. 27 stores the computed electromagnetic field intensity.

The determination table 331 stores the information used in determining which is used, the first computing unit 312 or the second computing unit 313 shown in FIG. 24, using as a retrieval key the representative value for the electric length of two metallic elements and the electric length of the distance between the two metallic elements. The determination table 331 also stores the information for use in determining which equation is to be used when either an exact equation or an approximation is used in the mutual impedance computation by the first computing unit 312.

The computing method can be determined by comparing the electric length and distance with a predetermined threshold. A representative value for the electric length of the two metallic elements can be a smaller value of the two electric lengths, an average value of the two electric lengths, or a square root of a product obtained from the two electric lengths, etc. The electric length is represented by the wave length A of an electromagnetic wave.

In FIG. 26, when the electromagnetic field intensity computing apparatus 300 is activated, it reads from the input data file 330 the structure information about the electric circuit device divided in a mesh form, and sets metallic elements and other data (frequency, etc.) as a structure and array (step S71).

After counting the processed frequency, it is determined whether or not all entered frequencies have been processed (step S72).

If they have (yes in step S72), then the electromagnetic field intensity computing process is completed.

If unprocessed frequencies still exist (no in step S72), then the frequency to be processed next is selected from among the unprocessed frequencies and the wave length λ of the selected frequency is computed (step S72).

Then, element i (i=1~m) and element j (j=1~m) are selected from m metallic elements to sequentially compute the mutual impedance Zij. The mutual impedance computing process in steps S76 through S78 described below are repeated for all sets of these elements (steps S74 and S75).

That is, the electric length of the distance between the two metallic elements selected in computing the mutual impedance Zij is specified, and the representative value of the electric length of the two metallic elements is computed. Using the two electric lengths and representative value as retrieval keys, the determination table 331 is searched. Then, it is determined whether the mutual impedance Zij is computed by a normal equation or the approximation according to the present embodiment (step S76).

If the mutual impedance is computed by a normal equation, control is passed to step S77, and it is computed by a normal equation using a real number with double-precision.

If the mutual impedance is computed by an approximation, control is passed to step S78, and it is computed by the approximation.

If the processes in steps S76 through S78 are repeated for one of the elements i on the elements j 1 through m. Then, similar processes are repeated for another element i (by, for example, adding 1 to the element i processed as described above).

If the computation has been completed for all sets of the elements i and j, control is passed from the process in step S74 to the processes in and after step S79.

That is, using the computed mutual impedance Zij and the wave source Vi read from the input data file 330, the following simultaneous equation is derived in the moment method to obtain the electric current Ii flowing through the metallic element (step S79).

[Zij][Ii]=[Vi]

where the electric current Ii flowing through the metallic element is unknown.

After counting the processed observation points, it is determined whether or not all entered observation points have been processed (step S80).

If they have (yes in step S80), then control is returned to the process in step S72, and the similar processes are repeated for the frequency to be processed next.

If they have not (no in step S80), then the electromagnetic field intensity of the computed electric current Ii on a given observation point can be computed by a predetermined equation (step S81). The computation result is stored in the output data file 332, and control is passed to the process in step S80. The processes in steps S80 and S81 are repeated until the electric and magnetic fields can be computed for all observation points.

The electric current computation in step S79 and the electric and magnetic field computation in step S81 can be performed by the conventional method and therefore the detailed explanation is omitted here.

Since, according to the third embodiment, the mutual impedance Zij used in the simultaneous equation in the moment method is computed in consideration of the characteristics of the computation object for the mutual impedance on the condition that the electric length of the elements are short and the elements are distant from each other and the mutual impedance is computed based on a predetermined approximation, the computation time can be prevented from being prolonged.

Using the approximation, the computation for the exponential integral is not required, thereby reducing lost digits and maintaining the precision of data.

Since the approximation is performed with precision using a multiple-precision real number and a multiple-length integer by an equation simpler than the conventional high-precision computation, the computation can be performed at a considerably high speed.

The approximation for use in the mutual impedance computation among the monopoles in each case shown in FIGS. 25A through 25D are as follows.

In the following equations, the lengths of the monopoles are d1 and d2 with the distance r>>d1, d2 and the wave length λ>>d1, d2.

The mutual impedance $Z_{00}$ between the monopole $(z_0-z_1)$ 320-1 and the monopole $(t_0-t_1)$ 321-1 shown in FIG. 25A is computed as follows.

[Exact Equation]

$$Z_{00} = (j\omega\mu/4\pi \sin kd_1 \sin kd_2)$$

$$\times \left[\int\int \sin k(-z+z_1)\sin k(-t+t_1)\cos\psi\right.$$

$$\times (\exp(-jkr)/r)dzdt - \int\int \cos k(-z+z_1)\cos k(-t+t_1)$$

$$\left.\times (\exp(-jkr)/r)dzdt\right]$$

where $\int\int$ indicates the integral from $t_0$ to $t_1$ and from $z_0$ to $z_1$.

[Approximation]

$Z_{00} \approx (\eta/4\pi \sin kd_1 \sin kd_2) \times (1/kr) \times$ $[\sin(kr)[\cos\psi[1-\cos k(z_0-z_1)] \times$ $[1\times\cos k(t_0-t_1)]-$ $\sin k(z_0-z_1)\sin k(t_0-t_1)]+$ $j\cos(kr)[\cos\psi[1-\cos k(z_0-z_1)]\times$ $[1-\cos k(t_0-t_1)]-$ $\sin k(z_0-z_1)\sin k(t_0-t_1)]]$ The mutual impedance $Z_0 o$ between the monopole $(z_0-z_1)$ 320-2 and the monopole $(t_0-t_1)$ 321-2 shown in FIG. 25B is computed as follows.

[Exact Equation]

$$Z_{01} = (j\omega\mu/4\pi \sin kd_1 \sin kd_2)$$

$$\times \left[\int\int \sin k(-z+z_1)\sin k(t-t_0)\cos\psi\right.$$

$$\times (\exp(-jkr)/r)dzdt + \int\int \cos k(-z+z_1)\cos k(t-t_0)$$

$$\left.\times (\exp(-jkr)/r)dzdt\right]$$

where $\int\int$ indicates the integral from $t_0$ to $t_1$ and from $z_0$ to $z_1$.

[Approximation]

$Z_{01} \approx (\eta/4\pi \sin kd_1 \sin kd_2) \times (1/kr) \times$ $[\sin(kr)[\cos\psi[1-\cos k(z_0-z_1)] \times$ $[1-\cos k(t_1-t_0)]-$ $\sin k(z_0-z_1)\sin k(t_1-t_0)]+$ $j\cos(kr)[\cos\psi[1-\cos k(z_0-z_1)]\times$ $[1-\cos k(t_1-t_0)]-$ $\sin k(z_0-z_1)\sin k(t_1-t_0)]]$ The mutual impedance $Z_{10}$ between the monopole $(z_0-z_1)$ 320-3 and the monopole $(t_0-t_1)$ 321-3 shown in FIG. 25C is computed as follows.

[Exact Equation]

$Z_{10} = (j\omega\mu/4\pi\sin kd_1\sin kd_2)$ $\times\left[\int\int\sin k(z-z_0)\sin k(-t+t_1)\cos\psi\right.$ $\times(\exp(-jkr)/r)dzdt - \int\int\cos k(z-z_0)\cos k(-t+t_1)$ $\times(\exp(-jkr)/r)dzdt]$ where $\int\int$ indicates the integral from $t_0$ to $t_1$ and from $z_0$ to $z_1$.

[Approximation]

$Z_{10} \approx (\eta/4\pi\sin kd_1\sin kd_2)\times(1/kr)\times$ $[\sin(kr)[\cos\psi[1-\cos k(z_1-z_0)]\times$ $[1-\cos k(t_0-t_1)]-$ $\sin k(z_1-z_0)\sin k(t_0-t_1)]+$ $j\cos(kr)[\cos\psi[1-\cos k(z_1-z_0)]\times$ $[1-\cos k(t_0-t_1)]-$ $\sin k(z_1-z_0)\sin k(t_0-t_1)]]$ The mutual impedance $Z_{11}$ between the monopole $(z_0-z_1)$ 320-4 and the monopole $(t_0-t_1)$ 321-4 shown in FIG. 25D is computed as follows.

[Exact Equation]

$Z_{11} = (j\omega\mu/4\pi\sin kd_1\sin kd_2)$ $\times\left[\int\int\sin k(z-z_0)\sin k(t-t_0)\cos\psi\right.$ $\times(\exp(-jkr)/r)dzdt - \int\int\cos k(z-z_0)\cos k(t-t_0)$ $\times(\exp(-jkr)/r)dzdt]$ where $\int\int$ indicates the integral from $t_0$ to $t_1$ and from $z_0$ to $z_1$.

[Approximation]

$Z_{11} \approx (\eta/4\pi\sin kd_1\sin kd_2)\times(1/kr)\times$ $[\sin(kr)[\cos\psi[1-\cos k(z_1-z_0)]\times$ $[1-\cos k(t_1-t_0)]+$ $\sin k(z_1-z_0)\sin k(t_1-t_0)]+$ $j\cos(kr)[\cos\psi[1-\cos k(z_1-z_0)]\times$ $[1-\cos k(t_1-t_0)]-$ $\sin k(z_1-z_0)\sin k(t_1-t_0)]]$ In the above listed equation, $\eta$ indicates $(\mu_0/\epsilon_0)^{1/2}$.

Figure 28:
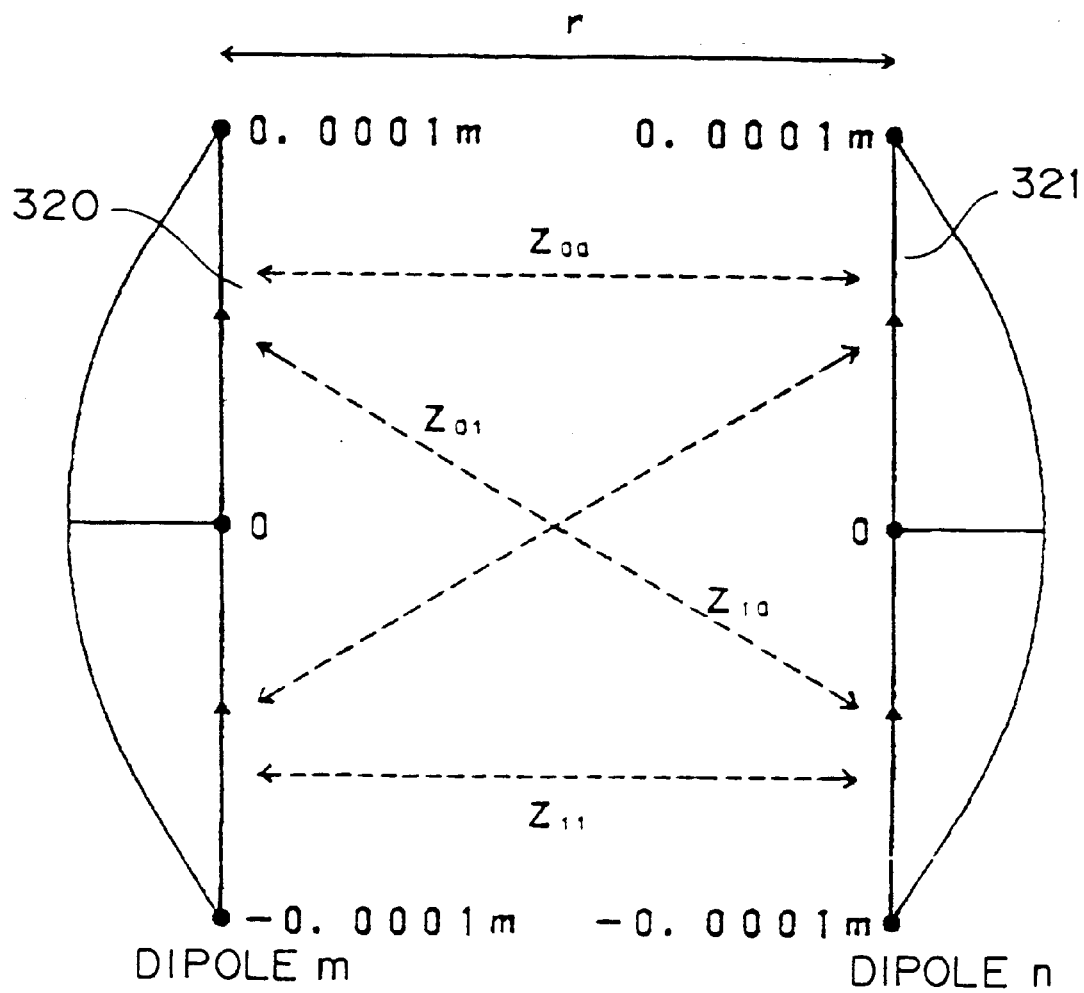
FIG. 28 shows a model of computing the mutual impedance between two dipoles.

FIG. 28 shows a model of a computation example of the mutual impedance between two dipoles.

Concerning the dipole model shown in FIG. 28, FIGS. 29, 30, and 31 show the normal computation, conventional high-precision computation (multiple-precision real number or multiple length integer), and the computation results obtained by the approximation according to the third embodiment.

The computation results shown in FIGS. 29 through 31 show computation examples where the frequency is 30 MHz, that is, $\lambda=10$ m. The length of the monopoles 320 and 321 are 0.0001 m. The mutual impedance $Z_{mn}$ between the two metallic wire dipoles m and n is $Z_{00}+Z_{01}+Z_{10}+Z_{11}$.

FIG. 29 shows the result of normal computation by the conventional exact equation using a real number of double-precision. The time required for the computation is 6 seconds. The computation and those shown in FIGS. 30 and 31 are performed by the same processing device.

As shown in FIG. 29, digits may be lost in the computation with r set to a value equal to or larger than 0.05 m, thereby deteriorating the precision.

That is, when the computation results for the real numbers shown in FIG. 29 are compared with those shown in FIG. 30, no significant differences are detected in the range from r=0.0001 to r=0.03. However, when r is equal to or larger than 0.05, the computation results shown in FIG. 29 indicate larger differences from those shown in FIG. 30 with the increase of the value of r, even indicating a difference in the number of digits. In normal computation, if the distance r has reached a predetermined value, the precision of computation is lowered by lost digits.

FIG. 30 shows the result of the high-precision computation by the conventional exact equation using a multiple-length integer with a fixed decimal point. As shown in FIG. 30, the computation is excellent in precision, but requires 380 seconds for computation.

FIG. 31 shows the computation result obtained by the approximation according to the third embodiment of the present invention. The computation is performed by an approximation with the distance r set to a value equal to or larger than 0.001 without an exponential integral. Therefore, the required precision can be maintained without lost digits, etc., and the computation requires only 4 seconds. This is a considerable improvement.

The present invention is not limited to a case where the moment method is applied to all portions of an electric circuit device to be processed, but can be applied to a case where the moment method is applied to a portion of the electric circuit device.

As described above, the electromagnetic field intensity of an electric circuit device can be computed at a high speed with high precision according to the third embodiment in the electromagnetic field intensity computing apparatus for computing the electromagnetic field intensity of the electric circuit device in the moment method. The computation is performed by an approximation obtained through the characteristics of an object to be computed for a mutual impedance on the condition that the electric length of elements is short and the elements are distant from each other.

The fourth embodiment of the present invention is described by referring to FIGS. 32 through 37.

FIG. 32 is a block diagram showing the configuration of the electromagnetic field intensity computing apparatus 400 according to the fourth embodiment.

In FIG. 32, the electromagnetic field intensity computing apparatus 400 comprises a CPU, memory, etc., and computes the electromagnetic field intensity of the electric circuit device to be analyzed by the moment method.

The electromagnetic field intensity computing apparatus 400 comprises a data input unit 410, a model generating unit 420, and an electromagnetic field intensity computing unit 430.

The data input unit 410 inputs the structure information of an electric circuit device to be analyzed.

The model generating unit 420 models the cable pigtail portion related to the fourth embodiment according to the structure information about the electric circuit device received from the data input unit 410.

The model generating unit 420 comprises a cable pigtail portion extracting unit 421, a model selecting unit 422, an exact modelling unit 423 using a polygonal model, and a simple modelling unit 424 using a wire.

The cable pigtail portion extracting unit 421 extracts a pigtail portion at the end of a coaxial cable according to the structure information about the electric circuit device received from the data input unit 410.

The model selecting unit 422 selects a modelling process by the exact modelling unit 423 or a modelling process by the simple modelling unit 424 according to the specification in the input data or by an external input from the operator, etc.

By the exact modelling unit 423, an axial cable shield unit near the end of the cable is approximated to a polygonal cylinder, according to the structure information about a pigtail portion extracted by the cable pigtail portion extracting unit 421. It also generates a model by connecting a pigtail lead portion to an approximated polygonal unit, and connecting the polygonal unit to the housing of the electric circuit device or to a clamp patch.

The simple modelling unit 424 generates a model by connecting the coaxial cable shield unit to the pigtail lead unit at the cable terminal using a wire through which an electric current flows vertically to the coaxial cable according to the structure information about the pigtail unit extracted by the cable pigtail portion extracting unit 421, and by connecting the coaxial cable shield unit with the housing of the electric circuit device or a clamp patch.

The electromagnetic field intensity computing unit 430 computes the electromagnetic field intensity of an electric circuit device by the moment method according to the information modelled by the model selecting unit 422.

Generating a model connected to a pigtail lead line by approximating a big cylindrical coaxial cable using a polygon near the pigtail portion allows an electric current flowing through the lead line to be analyzed by the moment method, thereby exactly computing the electromagnetic field intensity.

Generating a model by connecting a wire representing the vertical electric current between the coaxial cable shield unit and pigtail lead line realizes a model for easily inputting data in a short computation time.

According to the fourth embodiment, the optimum model can be generated depending on the situation by preparing and selecting an exact model using a polygonal model and a simple model using a wire. Furthermore, the modelling process can be validated.

Figure 33A:
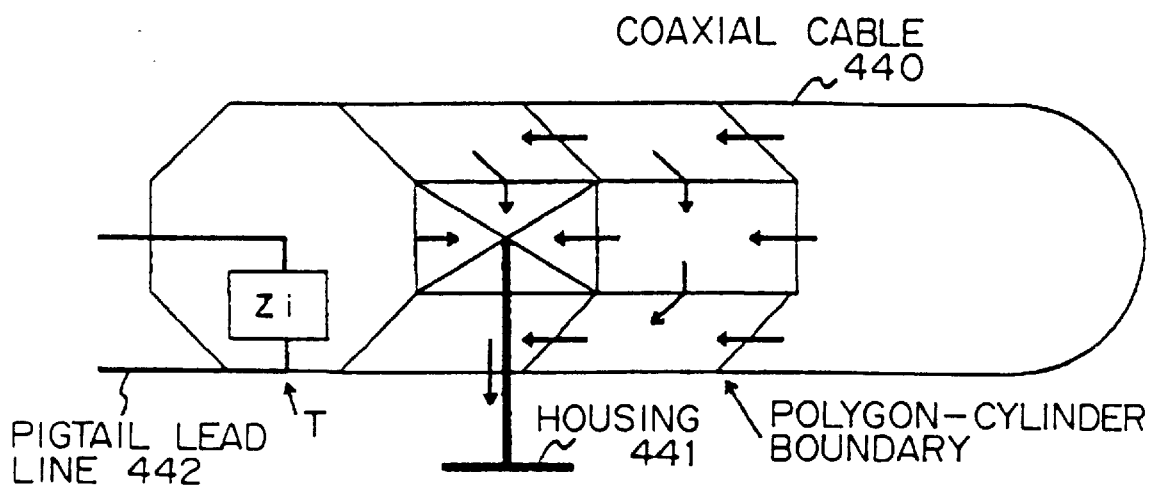
FIGS. 33A through 33C show examples of a precise modelling process according to the fourth embodiment.
Figure 33B:
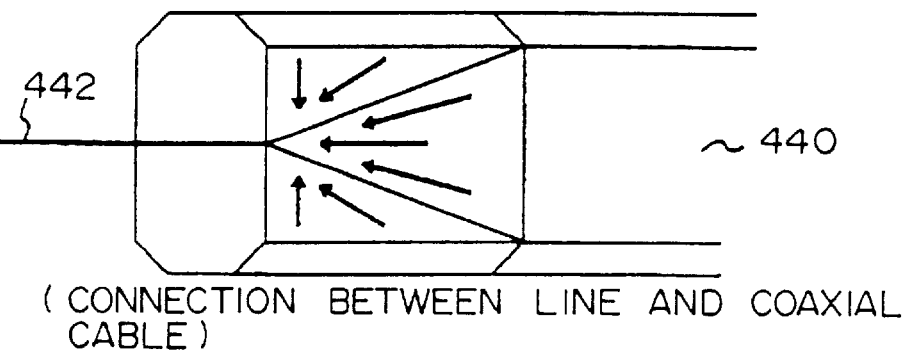
Figure 33C:
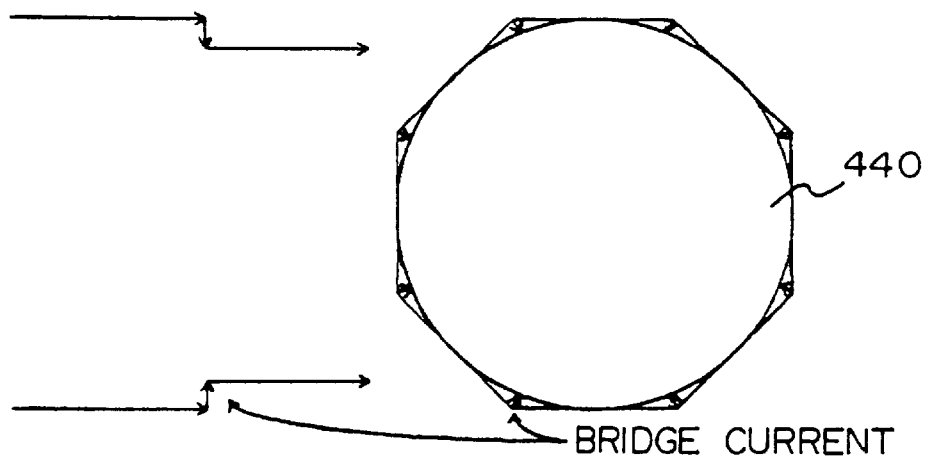

FIGS. 33A through 33C show an example of exactly modelling the fourth embodiment.

The exact modelling unit 423 shown in FIG. 32 approximates a coaxial cable 440 near the pigtail portion using a polygonal cylinder as shown in FIG. 33A. In FIG. 32, Zi indicates an impedance in the coaxial cable 440. One side of the approximated polygonal model is connected to a housing 441 by the wire. A pigtail lead line 442 of the transmission line is connected to the coaxial cable 440 at the portion T in FIG. 32.

The connection between the pigtail lead line 442 and coaxial cable 440 shown in FIG. 33A is modelled as shown in FIG. 33B. This is a modelling process using triangular surface patches. That is, when the moment method is applied, a normal side portion of a polygonal pillar is represented by rectangular surface patches as shown in FIG. 33A while an electric current is concentrated at a portion connecting the pigtail lead line 442. Therefore, the triangular surface patches are desired as shown in FIG. 33B.

FIG. 33C is a front view of the polygonal model shown in FIG. 33A. As shown in FIG. 33C, a step is generated at the boundary between the polygon and the cylinder of the coaxial cable 440. That is, an area encompassed by a polygon and its inscribed circle (cylinder) is generated, and a bridge current flows toward the center of the cylinder in the area. Since the bridge current at the boundary is assumed to be even and vertical to the electric current flowing through the polygon/cylinder, it is not counted in the computation of the mutual impedance.

Refer to the following document concerning the above descried bridge current.

M. A. TILSTON, K. G. BALMAIN, "A MULTIRADIUS, RECIPROCAL IMPLEMENTATION OF THE THIN-WIRE MOMENT METHOD", IEEE Trans. Antennas Propagat., vol. AP-38, No. 10, pp. 1636–1644, October 1990.

Thus, the approximation using a polygon enables a vertical electric current to be properly represented and connection can be set to each unit.

Figure 34B:
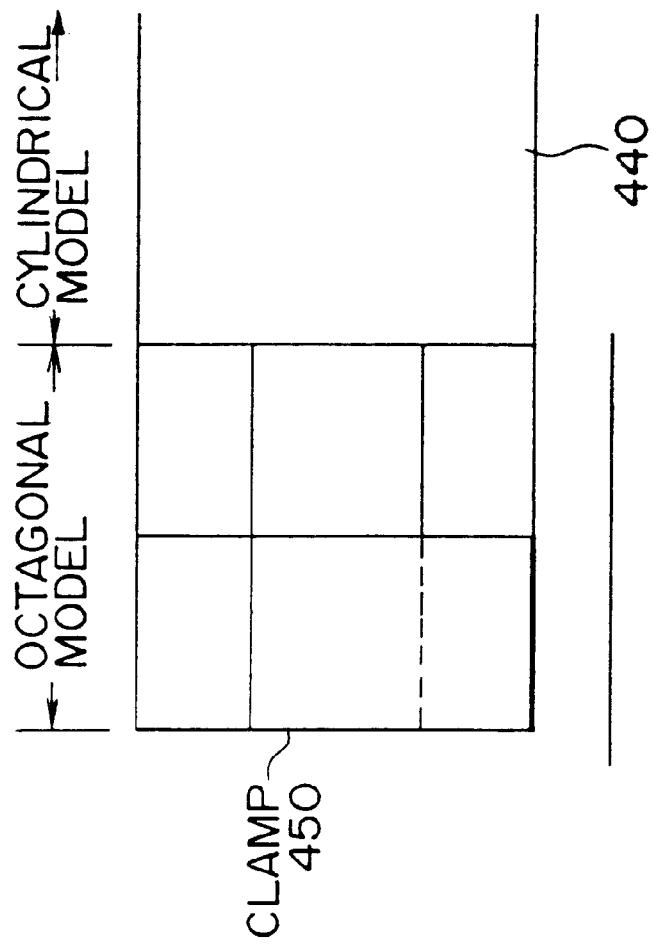
FIGS. 34A and 34B show examples of a direct connection to the housing using a clamp.
Figure 34A:
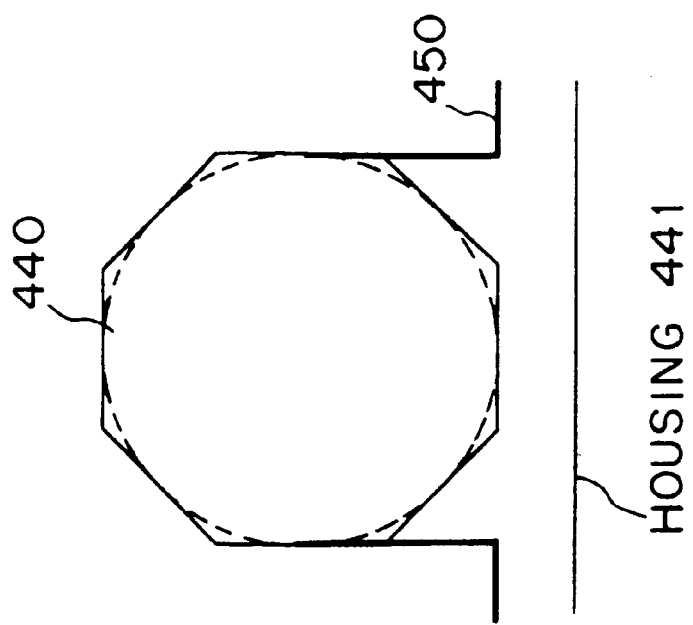

FIGS. 34A and 34B show examples of direct connections for a housing using a clamp. FIG. 34A is a front view while FIG. 34B is a side view.

In FIGS. 34A and 34B, the coaxial cable 440 is an octagonal model generated in the exact modelling process and directly connected to the housing 441 by a clamp 450. As shown in FIG. 34B, the clamp 450 is also approximated by a polygon as an object of the moment method, thereby realizing a precise computation.

Figure 35A:
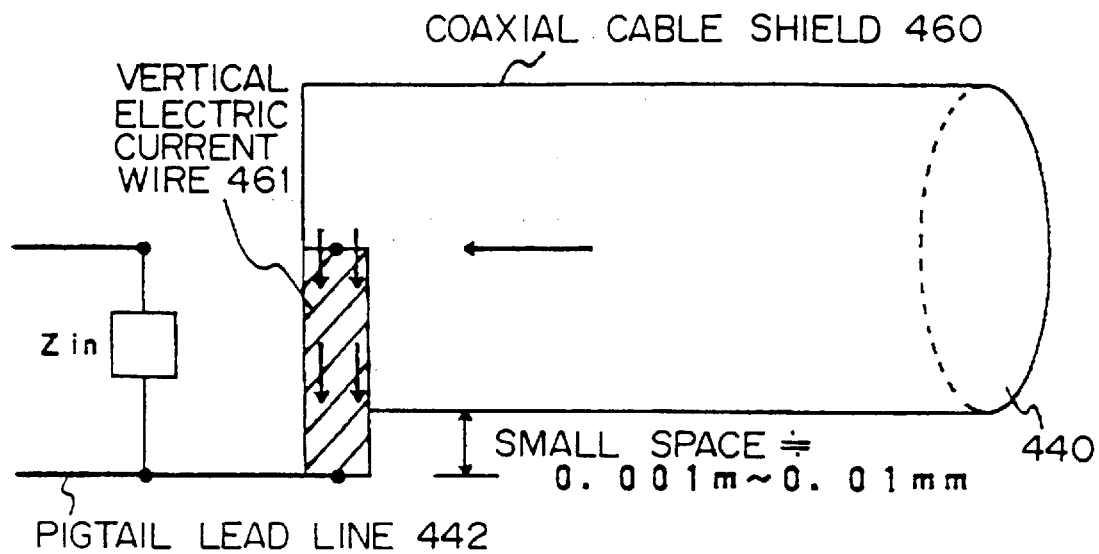
FIGS. 35A and 35B show examples of a simple modelling process according to the fourth embodiment.
Figure 35B:
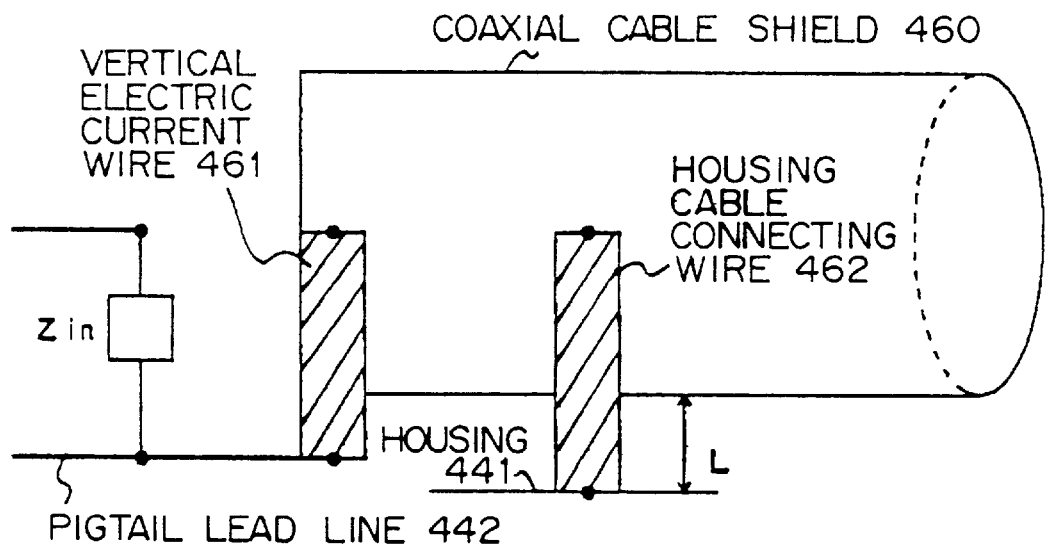

FIGS. 35A and 35B show an example of the simple modelling process according to the fourth embodiment.

The simple modelling unit 424 shown in FIG. 32 models a coaxial cable pigtail portion as shown in FIGS. 35A and 35B.

The exact modelling process as shown in FIGS. 33A through 34B is expected to yield a considerably high precision, but processes a number of surface patches and has complicated input of data.

On the other hand, when the simple modelling process is performed using only wires as shown in FIGS. 35A and 35B, the computation time is short and data input can be simplified.

In the simple modelling process, a coaxial cable shield 460 is connected to the pigtail lead line 442 through a vertical electric current wire 461 with a small clearance of, for example, 0.001 m through 0.01 m as shown in FIG. 35A. Thus, the pigtail lead line 442 is connected to the coaxial cable shield 460, and the vertical electric current can be properly represented.

As shown in FIG. 35B, the coaxial cable shield 460 is connected to the housing 441 through a housing cable connecting wire 462. When the coaxial cable 440 is directly connected to the housing 441, the length of the housing cable connecting wire 462 is shortened (for example, 0.001 m through 0.01 m), and the diameter of the wire is made equal to that of the coaxial cable shield 460.

When a lead line is applied, the actual lead length and diameter are used.

FIG. 36 is a flowchart showing the operations of the electromagnetic field intensity computing apparatus 400 according to the fourth embodiment.

In FIG. 36, an input data file 470 manages the structure information, etc., about the electric circuit device to be analyzed. An output data file 480 stores computation results for electromagnetic field intensity.

When the electromagnetic field intensity computing apparatus 400 is activated, it first reads the structure information about the electric circuit device from the input data file 470, and sets metallic elements and other data (frequency, etc.) as a structure and an array (step S91).

Then, according to the input structure information about the electric circuit device, a model is generated and converted to compute the electric wave radiation from a pigtail portion (step S92). This process is described later by referring to FIG. 37.

Then, it is determined by counting the processed frequency whether or not the process has been completed for all entered frequencies (step S93).

If it has (yes in step S93), the electromagnetic field intensity computing process terminates.

When unprocessed frequencies exist (no in step S93), one frequency to be processed next is selected from among the unprocessed frequencies, and the wave length I of the selected frequency is computed (step S94).

Then, a set of element i (i=1 through m) and element j (j=1 through m) is generated from m metallic elements to sequentially compute the mutual impedance Zij (step S95), and the mutual impedance Zij is computed for use in the simultaneous equation in the moment method (step S96).

Then, it is determined whether or not the computation of the mutual impedance Zij has been completed for all element sets (step S97).

If it has not (no in step S97), then the processes in step S95 and S96 are repeated.

If it has (yes in step S97), then the following simultaneous equation in the moment method is derived using the computed mutual impedance Zij and the wave source Vi read from the input data file 470.

$$[Zij][Ii]=[Vi]$$

where the electric current Ii flowing through the metallic elements is unknown. The electric current Ii flowing through the metallic elements is obtained by solving the above described equation.

Then, after counting the processed observation points, it is determined whether or not the process has been completed for all entered observation points (step S99).

If it has not (no in step S99), then the electromagnetic field intensity of the computed electric current Ii is computed by a predetermined equation (step S100). The computation result is stored in the output data file 480, and then control is returned to the process in step S99 and the processes in steps S99 and S100 are repeated until the electric and magnetic fields have been computed for all the observation points.

If the above described processes have been completed for all the observation points (yes in step S99), then control is returned to step S93 and the similar processes are repeated for the next unprocessed frequency.

The mutual impedance Zij in step S96 and the electric and magnetic fields in step S98 are computed by the conventional methods and the detailed explanation is omitted here.

FIG. 37 is a flowchart showing in detail the model generating and converting process in step S92 shown in FIG. 36.

In FIG. 37, a pigtail portion at the end of a coaxial cable is extracted according to the input structure information about the electric circuit device (step S110).

Then, an exact model or a simple model using a wire is selected according to input data or external specification (step S111). If an exact model is selected, control is passed to step S112. If a simple model using a wire is selected, control is passed to step S116.

If an exact model is selected, a polygon is generated as a polygonal model enclosing the cylinder of the coaxial cable 440 shown in FIG. 33A (step S112). The polygon can be a hexagon, octagon, etc. It may be selected according to the external input.

Next, the polygon is connected to the cylinder coaxial portion (step S113).

Then, the transmission line is connected to the polygon (step S114). That is, as shown in FIG. 33A, the pigtail lead line 442 is connected to one side of the polygonal model of the coaxial cable 440. The polygon is also connected to the housing 441. Otherwise, if the coaxial cable 440 is directly connected to the housing 441 with a clamp, the housing 441 is connected to the clamp patch (the clamp 450 approximated using a polygon) as shown in FIGS. 34A and 34B (step S115).

If a simple model using a wire has been selected in step S111, then the vertical electric current wire 461 is generated as shown in FIGS. 35A and 35B (step S116). Then, the vertical electric current wire 461 is connected to the coaxial cable shield 460 (step S117). The vertical electric current wire 461 is also connected to the transmission line (pigtail lead line 442) (step S118). Furthermore, the housing cable connecting wire 462 is generated to connect the coaxial cable shield 460 to the housing 441 (step S119).

The above described modelling process is performed on all cable pigtail portions extracted from the input data.

According to the fourth embodiment of the present invention, the moment method can be applied not only to all portions of an electric circuit device but also to only a portion of the device.

As described above, the electric wave radiation from a pigtail portion can be simulated with high precision in computing the electromagnetic field intensity by the moment method according to the fourth embodiment of the present invention, thereby computing the electromagnetic field intensity of an electric circuit device at a high speed and with high precision.

What is claimed is:

1. An electromagnetic field intensity computing apparatus for computing electromagnetic field intensity of an electric circuit device, comprising:

data input means for inputting structure information about the electric circuit device to be analyzed;

cable pigtail portion extracting means for extracting a pigtail portion at an end of a coaxial cable according to the structure information about the electric circuit device received from said data input means;

modelling means for generating a model using a polygon model by approximating using a polygonal cylinder a coaxial cable shield unit near the end of the cable according to the structure information about the pigtail portion extracted by said cable pigtail portion extracting means, connecting a pigtail lead unit to an approximated polygon, and connecting the polygon to a housing of the electric circuit device; and electromagnetic field intensity computing means for computing the electromagnetic field intensity of the electric circuit device in a moment method according to the information modelled by said modelling means.

2. An electromagnetic field intensity computing apparatus for computing electromagnetic field intensity of an electric circuit device, comprising:

data input means for inputting structure information about the electric circuit device to be analyzed;

cable pigtail portion extracting means for extracting a pigtail portion at an end of a coaxial cable according to the structure information about the electric circuit device received from said data input means;

wire modelling means for generating a model in a way that a coaxial cable shield unit is connected to a pigtail lead unit through a wire through which an electric current flows perpendicularly to a coaxial cable at an end of the cable, and the coaxial cable shield unit is connected to a housing of the electric circuit device through a housing cable connecting wire; and electromagnetic field intensity computing means for computing the electromagnetic field intensity of the electric circuit device in a moment method according to the information modelled by said wire modelling means.

3. An electromagnetic field intensity computing apparatus for computing electromagnetic field intensity of an electric circuit device, comprising:

data input means for inputting structure information about the electric circuit device to be analyzed;

cable pigtail portion extracting means for extracting a pigtail portion at an end of a coaxial cable according to the structure information about the electric circuit device received from said data input means;

first modelling means for generating a model using a polygon model by approximating using a polygonal cylinder a coaxial cable shield of at a portion near the end of the cable according to the structure information about the pigtail portion extracted by said cable pigtail portion extracting means, connecting a pigtail lead unit to an approximated polygon, and connecting the polygon to a housing or a clamp patch of the electric circuit device;

second modelling means using a wire for generating a model in a way that a coaxial cable shield unit is connected to a pigtail lead unit through a wire through which an electric current flows perpendicularly to a coaxial cable at an end of the cable, and the coaxial cable shield unit is connected to the housing or the clamp patch of the electric circuit device; and electromagnetic field intensity computing means for computing the electromagnetic field intensity of the electric circuit device in a moment method according to the information modelled by said first and second modelling means.

4. An electromagnetic field intensity computing method for computing electromagnetic field intensity of an electric circuit device, comprising the steps of:

inputting structure information about the electric circuit device to be analyzed;

extracting a pigtail portion at an end of a coaxial cable according to the input structure information about the electric circuit device;

generating a model using a polygon model by approximating using a polygonal cylinder a coaxial cable shield unit near the end of the cable according to the structure information about the extracted pigtail portion, connecting a pigtail lead unit to an approximated polygon, and connecting the polygon to a housing of the electric circuit device; and computing the electromagnetic field intensity of the electric circuit device in a moment method according to the modelled information.

5. A computer-readable storage medium used to direct a computer for computing an electromagnetic field intensity of an electric circuit device to perform the functions of:

extracting a pigtail portion at an end of a coaxial cable according to the input structure information about the electric circuit device;

generating a model using a polygon model by approximating using a polygonal cylinder a coaxial cable shield unit near the end of the cable according to the structure information about the extracted pigtail portion, connecting a pigtail lead unit to an approximated polygon, and connecting the polygon to a housing of the electric circuit device; and computing the electromagnetic field intensity of the electric circuit device in a moment method according to the modelled information.

\* \* \* \* \*